US008283046B2

(12) United States Patent
Takayama

(10) Patent No.: US 8,283,046 B2
(45) Date of Patent: Oct. 9, 2012

(54) FERROUS SINTERED MULTILAYER ROLL-FORMED BUSHING, PRODUCING METHOD OF THE SAME AND CONNECTING DEVICE

(75) Inventor: Takemori Takayama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 747 days.

(21) Appl. No.: 12/223,083

(22) PCT Filed: Jan. 30, 2007

(86) PCT No.: PCT/JP2007/052060
§ 371 (c)(1),
(2), (4) Date: Jul. 22, 2008

(87) PCT Pub. No.: WO2007/086621
PCT Pub. Date: Aug. 2, 2007

(65) Prior Publication Data
US 2010/0227188 A1    Sep. 9, 2010

(30) Foreign Application Priority Data

Jan. 30, 2006 (JP) .................................. 2006-021523

(51) Int. Cl.
B32B 15/16    (2006.01)
B32B 15/18    (2006.01)
B22F 7/04     (2006.01)
B22F 3/12     (2006.01)
F16C 33/12    (2006.01)

(52) U.S. Cl. ............ 428/565; 428/682; 75/241; 75/246; 384/912; 384/913; 419/8; 419/15; 419/47; 419/28; 419/55; 29/898.14

(58) Field of Classification Search ........................ None
See application file for complete search history.

(56) References Cited

U.S. PATENT DOCUMENTS 3,708,281 A * 1/1973 Andreotti ........................ 420/92
4,344,795 A * 8/1982 Endo et al. ...................... 75/230
4,485,147 A * 11/1984 Nishino et al. ................ 428/550
6,322,902 B1 * 11/2001 Takayama et al. ............ 428/550

(Continued)

FOREIGN PATENT DOCUMENTS

JP        51-83005        7/1976

(Continued)

OTHER PUBLICATIONS

Korean Examination Report (in English language) issued Aug. 16, 2010 in corresponding Korean Patent Application No. 7016180.

(Continued)

Primary Examiner — John J Zimmerman
(74) Attorney, Agent, or Firm — Wenderoth, Lind & Ponack, L.L.P.

(57) ABSTRACT

A ferrous sintered multilayer roll-formed bushing having a ferrous sintered sliding material layer which is sinter-bonded to a back metal steel, wherein the ferrous sintered sliding material layer is produced in such a manner that a Fe—C—Cu—Sn based sintered sliding material mixed powder containing at least carbon of 0.40 to 15 wt %, Cu of 13 to 40 wt % and Sn of 0.5 to 10 wt % is preliminarily sinter-bonded to said back metal steel and then finally sinter-bonded by a liquid-phase sintering at high temperatures higher than 1000° C. after bending into a roll.

35 Claims, 32 Drawing Sheets

Sintering ability of Fe (ASC300)-Cu, -Sn, -C based sintered body

- B1 0Cu
- B2 5Cu
- B3 10Cu
- B4 20Cu
- B5 30Cu
- B8 30Cu, 2Sn
- B6 30Cu, 0.6C
- B7 30Cu, 1.2C
- B9 Fe16Al
- B10 Fe16Al, 25Cu
- B11 Fe16Al25Cu

U.S. PATENT DOCUMENTS

| | | |
|---|---|---|
| 6,616,726 B2 * | 9/2003 | Chikahata et al. ............... 75/246 |
| 7,040,601 B2 * | 5/2006 | Chikahata et al. ............. 251/368 |
| 7,553,445 B2 * | 6/2009 | Miyasaka ........................ 419/38 |
| 2005/0158571 A1 * | 7/2005 | Takayama et al. ............. 428/544 |
| 2006/0032328 A1 * | 2/2006 | Chikahata et al. ............... 75/243 |
| 2006/0159376 A1 * | 7/2006 | Takayama et al. ............ 384/276 |
| 2008/0146467 A1 * | 6/2008 | Takayama .................... 508/105 |

FOREIGN PATENT DOCUMENTS

| | | |
|---|---|---|
| JP | 58-157951 | 9/1983 |
| JP | 4-254556 | 9/1992 |
| JP | 5-86404 | 4/1993 |
| JP | 8-109450 | 4/1996 |
| JP | 11-172305 | 6/1999 |
| JP | 3168538 | 5/2001 |
| JP | 2004-360731 | 12/2004 |
| WO | 2005/012585 | 2/2005 |

OTHER PUBLICATIONS

International Search Report issued May 29, 2007 in the International (PCT) Application of which the present application is the U.S. National Stage.

* cited by examiner

FIG.20
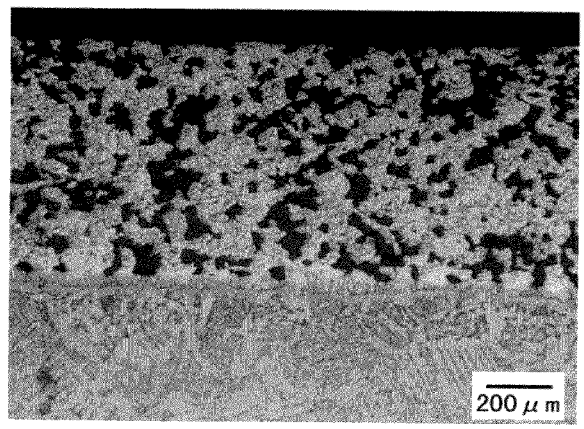
(a)
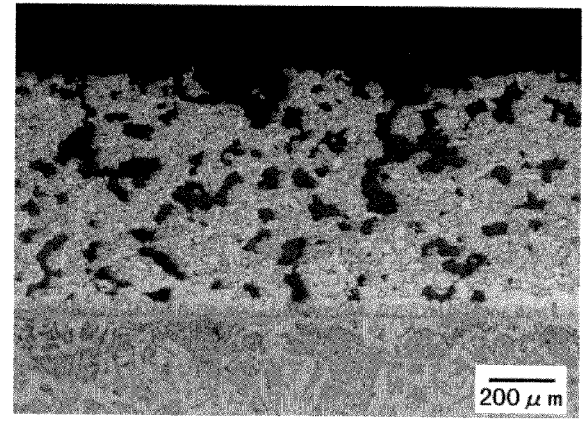
(b)

FIG.22
(a)
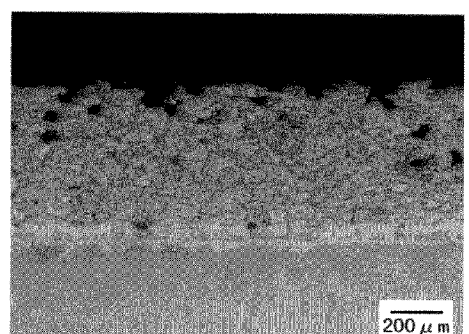
(d)
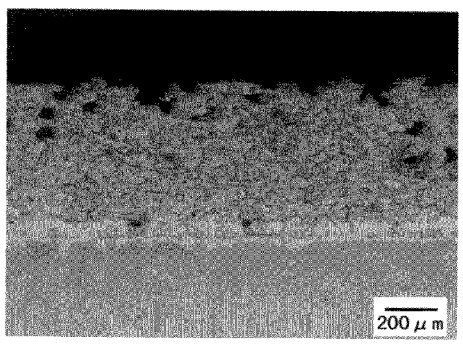
(b)
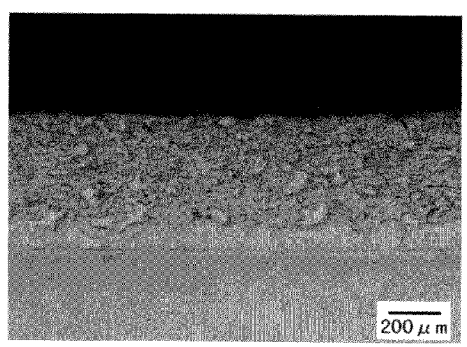
(e)
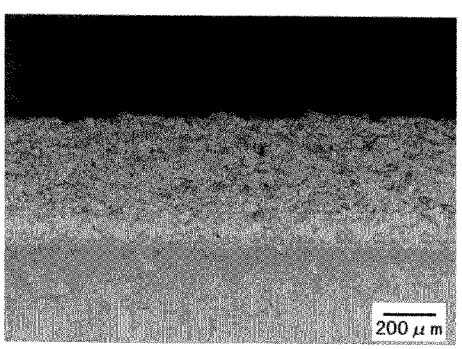
(c)

FIG.29
(a) 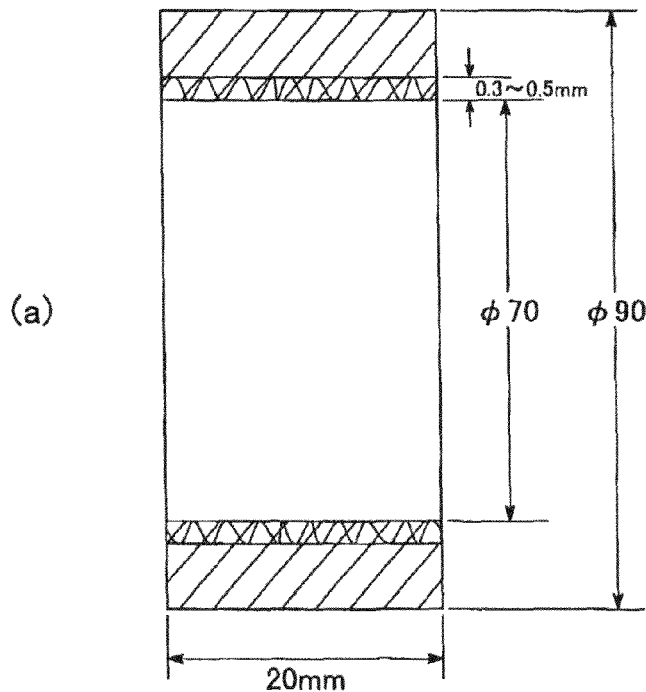
(b) 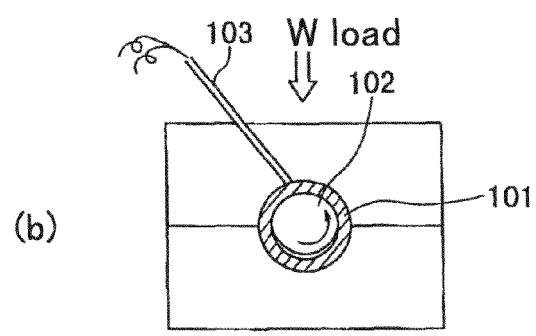

FIG.30
Sectional drawings of connecting device of one embodiment
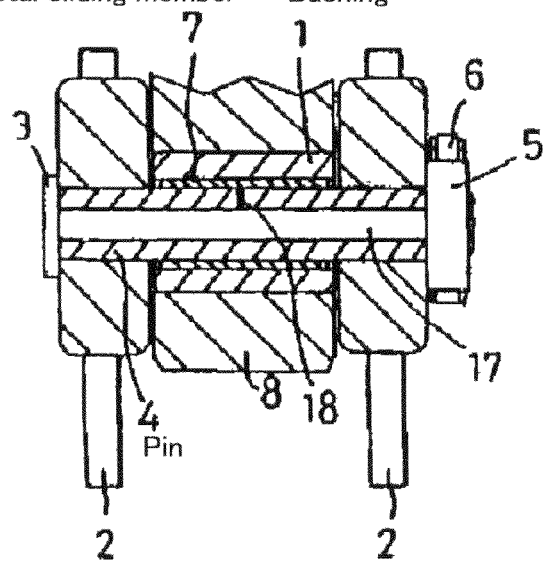
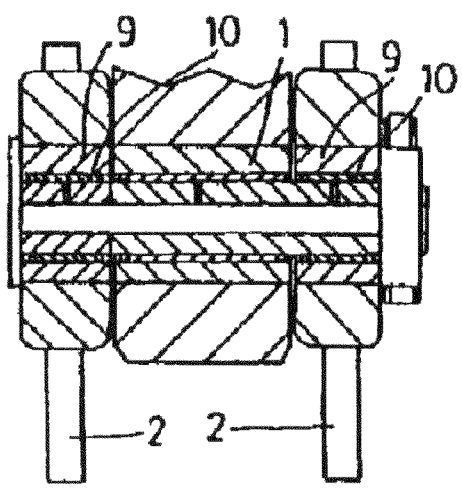
(a)  (b)
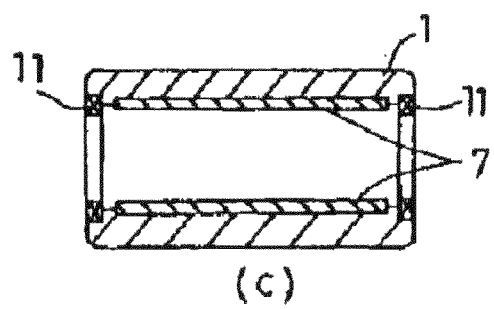
(c)
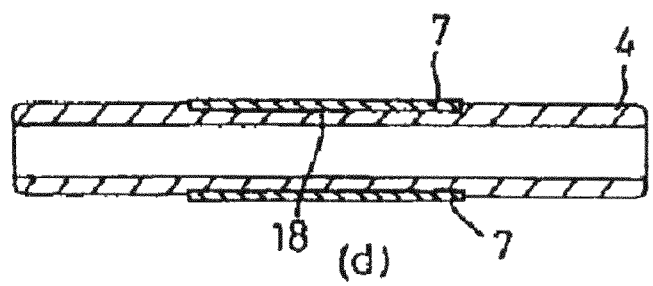
(d)

FIG.31
Sectional drawing of connecting device
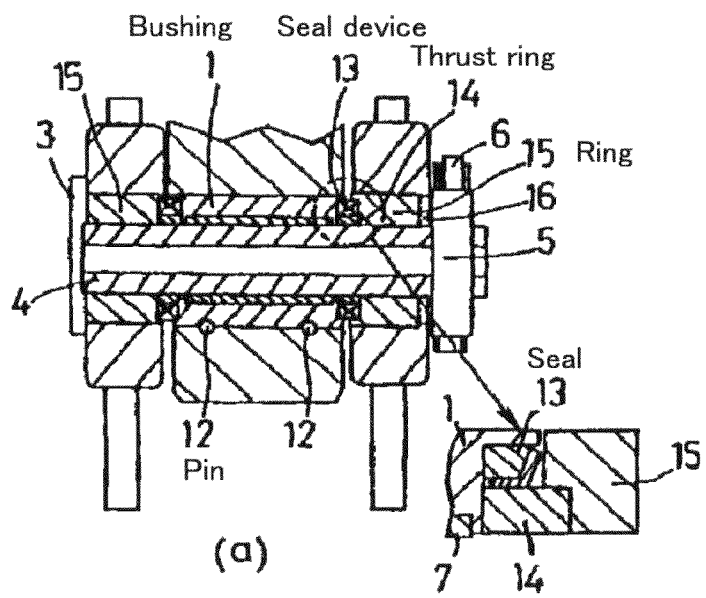
(a)
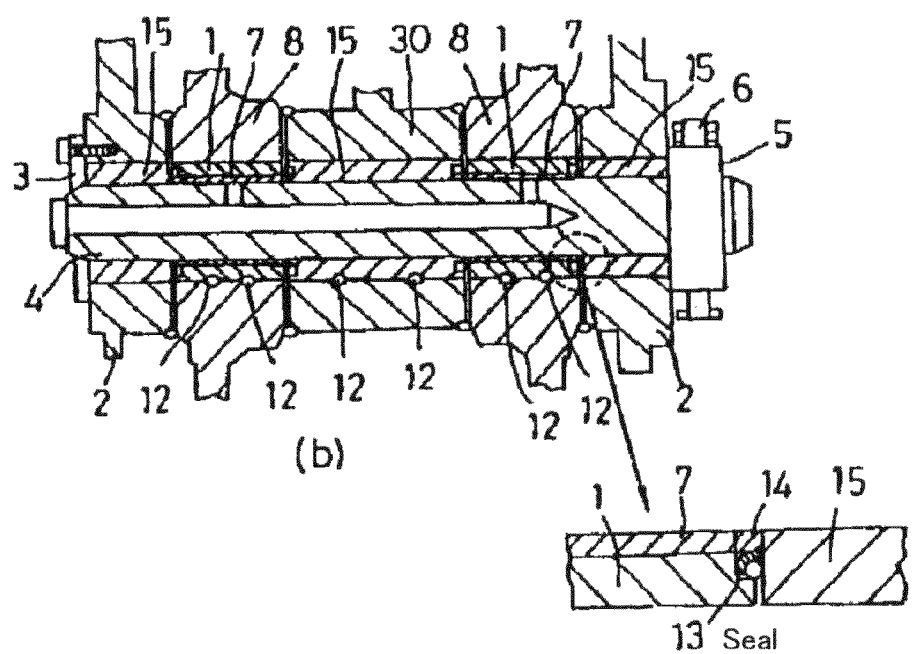
(b)

FERROUS SINTERED MULTILAYER ROLL-FORMED BUSHING, PRODUCING METHOD OF THE SAME AND CONNECTING DEVICE

FIELD OF THE INVENTION

The present invention relates to a ferrous sintered multilayer roll-formed bushing, a producing method of the same and a connecting device. More particularly, the present invention relates to a ferrous sintered multilayer roll-formed bushing intended to have low coefficient of friction, having excellent seizing resistance and abrasion resistance and providing self-lubricating property so as to prolong a lubrication interval or eliminate the necessity of lubricating, a producing method of the same and a connecting device.

BACKGROUND OF THE INVENTION

As a radial bearing equipped on a connecting device of a construction machine which operates under severer lubricating conditions such as high bearing stress, low-speed sliding and oscillating, a steel bearing of which at least the sliding surface is carburized or induction hardened is commonly used. Especially, in order to prevent occurrence of abnormal noise and improve seizing resistance at sliding, the steel bearing having the sliding surface on which plural of oil sumps such as lubrication grooves or dimples are formed has been used.

Recently, in view of the demand for easy maintenance, in order to extend a lubricating interval of the bearing, a high strength sintered oil retaining bearing; an oil retaining bearing in which a cylindrical high-strength brass material is subjected to a hole drilling and the formed holes are filled with porous graphite; and a self-lubricating sliding material in which a solid lubricant such as graphite, $MoS_2$, $WS_2$ and the like is dispersed in a sintered sliding material have been widely put to practical use.

As an exemplary self-lubricating copper based sliding material, a material in which a copper based sintered material containing a solid lubricant such as graphite, $MoS_2$, $WS_2$ and the like dispersed in the parent phase thereof is hot-pressed (SL alloy, manufactured by Toshiba Tungaloy Co., Ltd.) is given.

A ferrous sintered alloy having a structure in which free graphite of 1 to 5% is dispersed in a ferrous base which forms a solid solution with carbon of 1.2 wt % or less has excellent sliding performance. And, a sintered alloy for sliding material is known in which graphite particles are subjected to a suitable silver plating to form an iron-copper hardened layer 5 to 10 µm in thickness around free graphite in a ferrous sintered alloy and to disperse graphite blended with a raw powder as the free graphite without diffusing in the base (for example, referring to patent literature 1).

The above sintered alloy for sliding material has good initial sliding performance; however, has a serious problem in which abrasion loss increases remarkably with increase in hour of use. From the viewpoint, in the patent literature 1, a graphite powder blended with a raw powder is subjected to a copper plating so as to have a suitable thickness and a sintering temperature is strictly selected such that the copper plate layer does not disperse in and form a solid solution with ferrous particles so as to form an iron-copper hardened layer around the graphite particle. However, since the thickness of the copper plate layer is constrained and the sintering temperature is restricted to low temperatures so that the copper plate layer will not melt, sufficient sintering strength required to be used under high bearing stress whereby sufficient abrasion resistance and coefficient of friction can not be obtained.

A high strength self-lubricating sintered sliding material improved in abrasion resistance has been known (for example, referring to Patent literature 2). In the self-lubricating sintered sliding material, a mixed powder of a ferrous metal powder having a grain size of 45 µm or less and a solid lubricant granulated to have a grain size of 0.03 to 1 mm, such as graphite and $MoS_2$, in an amount of 10 to 80% by volume is formed and sintered at 1050° C. in order to reduce association of the granulated solid lubricant. And, a copper alloy based infiltrating agent is infiltrated at the sintering in order to reduce concentrating of stress on the granulated solid lubricant.

The above self-lubricating sintered sliding material, however, does not have sufficient sintering strength because the sintering temperature is restricted to 1050° C. in order to prevent a reaction of the granulated graphite with the ferrous base at the sintering. And, a local penetration easily occurs on the ferrous base between the granulated graphite because of long particle spacing of the solid lubricant. And, the infiltration of the copper alloy based infiltrating agent leads to close pores of the sliding material, and, therefore, to inhibit lubricating performance of the retained lubricating oil. As the results, sufficient abrasion resistance and seizing resistance cannot be obtained.

Further, a slipping bearing has been known, in which a ferrous sintered alloy layer comprising a mixed powder of copper powder of 10 to 30 wt %, graphite powder of 0.1 to 6.5 wt %, molybdenum disulfide powder of 0.1 to 7.0 wt % and rest of iron is sinter-bonded to a steel back metal (for example, referring to Patent literature 3).

The above slipping bearing, however, has not sufficient sintering strength because of restricted sintering temperatures. The Patent literature 3 shows a method for adding the solid lubricant and an amount of the lubricant mainly, however, little research about a metal phase (ferrous) base excellent in seizing resistance.

One of oil retaining slipping bearings available for use under high load and having no solid lubricant dispersed therein is produced in such a manner that a compact of mixed powder prepared by blending atomized ferrous powder, copper powder or copper alloy powder, graphite powder, various types of high speed steel powder, ferromolybdenum powder and copper alloy powder (KOBAMEETO, manufactured by CABOT Supermetals K.K.) is sintered at temperatures at which the copper powder or copper alloy powder is melted and then cooled. This cooling process leads to precipitate copper phase or copper alloy phase which is dispersed in and forms a solid solution with the ferrous base. As the results, copper particles or copper alloy particles are dispersed in the iron-carbon alloy base in which martensite exists. And, an abrasion resistant ferrous sintered alloy for oil retaining bearing is known, which contains copper of 7 to 30 wt %, has alloy particle having a specific composition as a harder phase than the iron-carbon alloy base in an amount of 5 to 30 wt % dispersed therein and has porosity of 8 to 30% by volume (for example, referring to Patent literature 4). In the abrasion resistant sintered alloy for oil retaining bearing, a large amount of copper powder or copper alloy powder is blended as raw powder for the following purposes: (1) outflow pores needed for retaining oil are formed by melting copper powder or copper alloy powder at sintering; (2) soft copper particles are dispersed in a martensite phase for improvement in conformability; and (3) the above alloy particle harder than the martensite of the base is dispersed so as to reduce plastic deformation of the base and also reduce load applied on the base at slipping sliding, whereby excellent abrasion resistance can be obtained even under high pressure.

As the alloy particles, there are given; (1) ferrous base alloy particles (high speed steel powder particles) containing C of 0.6 to 1.7 wt %, Cr of 3 to 5 wt %, W of 1 to 20 wt % and V of 0.5 to 6 wt %; (2) ferrous base alloy particles (high speed steel powder particles containing Mo and Co) containing C of 0.6 to 1.7 wt %, Cr of 3 to 5 wt %, W of 1 to 20 wt %, V of 0.5 to 6 wt % and at least one element of Mo and Co of 20 wt % or less; (3) Mo—Fe particles (ferromolybdenum) containing Mo of 55 to 70 wt %; and (4) copper base alloy particles (heat resistant and abrasion resistant alloy particles for a build up spraying, KOBAMEETO manufactured by CABOT Supermetals K.K.) containing Cr of 5 to 15 wt %, Mo of 20 to 40 wt % and Si of 1 to 5 wt % (for example, referring to Patent literature 4).

The above oil retaining slipping bearing has problems of insufficient seizing resistance and high coefficient of friction for the bushing equipped on a construction machine operated under sever sliding conditions (high bearing stress and low oscillating) because of the alloy particle dispersed in an amount of 5 to 30 wt % therein.

Patent literature 1; Japanese Patent Publication No. S58-1 57951;
Patent literature 2 Japanese Patent Publication No. H4-254 556;
Patent literature 3; Japanese Patent No. 3168538; and
Patent literature 4; Japanese Patent Publication No. H8-10 9450.

SUMMARY OF INVENTION

In a conventionally used sintered sliding material equipped on a connecting device operated under severe sliding conditions such as high bearing stress, slow speed sliding and oscillating conditions, it is impossible to prevent occurrence of abnormal noise and to prolong a lubrication interval because of its high coefficient of friction (0.15 or more) and insufficient seizing resistance and abrasion resistance. And, it is also impossible to eliminate the necessity of lubricating because of its insufficient self-lubricating ability.

Accordingly, an object of the present invention is to provide an economic ferrous sintered multilayer roll-formed bushing, a producing method of the same and a connecting device, in which a ferrous sintered sliding material layer is tightly sinter-bonded to a back metal steel, the ferrous sintered sliding material layer being intended to have low coefficient of friction, having excellent seizing resistance and abrasion resistance and providing self-lubricating property so as to prolong a lubrication interval or eliminate the necessity of lubricating.

In order to solve the above problems, a ferrous sintered multilayer roll-formed bushing according to the present invention comprises: a back metal steel; a ferrous sintered sliding material layer sinter-bonded to the back metal steel; a diffusion layer of ferrous alloy particle formed at the vicinity of the bonding boundary between the ferrous sintered sliding material layer and the back metal steel; and a Cu alloy phase formed at the vicinity of the bonding boundary and extending in the direction of the bonding boundary.

In the ferrous sintered multilayer roll-formed bushing according to the present invention, the ferrous sintered sliding material layer is preferably produced in such a manner that a Fe—C—Cu—Sn based sintered sliding material mixed powder containing C of 0.40 to 5 wt %, Cu of 8 to 40 wt % (preferably 8 to 30 wt %) and Sn of 0.5 to 10 wt % is preliminarily sinter-bonded to the back metal steel and then finally sintered after bending the back metal steel into a roll.

In the ferrous sintered multilayer roll-formed bushing according to the present invention, the ferrous sintered sliding material layer preferably has a liquid phase sintered structure comprising a solid phase state Fe—C based alloy particle which is liquid phase sintered at a temperature of 1000° C. or higher (more preferably 1050° C. or higher) and contains C of 0.45 wt % or more, as a main constitute, and also a liquid phase state Cu—Sn based alloy phase dispersed therein, in which the Fe—C based alloy particle is quench hardened and the matrix phase of the quench hardened particle has a martensite structure or a structure mainly consisting of martensite.

A ferrous sintered multilayer roll-formed bushing according to the present invention is a ferrous sintered multilayer roll-formed bushing having a ferrous sintered sliding material layer sinter-bonded to a back metal steel, in which the ferrous sintered sliding material layer is produced in such a manner that a Fe—C—Cu—Sn based sintered sliding material mixed powder containing at least C of 0.40 to 5 wt %, Cu of 8 to 40 wt % (preferably 8 to 30 wt %) and Sn of 0.5 to 10 wt % is preliminarily sinter-bonded to the back metal steel and then finally sintered after bending the back metal steel into a roll, and the ferrous sintered sliding material layer has a liquid phase sintered structure comprising a solid phase state Fe—C based alloy particle which is liquid phase sintered at a temperature (for example, 1000° C. or higher, more preferably 1050° C. or higher) higher than the preliminary sintering temperature and contains C of 0.45 wt % or more, as a main constitute, and also a liquid phase state Cu—Sn based alloy phase dispersed therein, in which the Fe—C based alloy particle is quench hardened and the matrix phase of the quench hardened particle has a martensite structure or a structure mainly consisting of martensite.

A ferrous sintered multilayer roll-formed bushing according to the present invention is a ferrous sintered multilayer roll-formed bushing having a ferrous sintered sliding material layer sinter-bonded to a back metal steel, wherein said ferrous sintered sliding material layer is produced in such a manner that a Fe—C—Cu—Sn based sintered sliding material mixed powder containing at least carbon of 0.40 to 5 wt %, Cu of 8 to 40 wt % and Sn of 0.5 to 10 wt % is preliminarily sinter-bonded to said back metal steel and then finally sinter-bonded by a liquid-phase sintering at temperatures of 1000° C. or higher, after bending into a roll, said ferrous sintered sliding material layer has a liquid phase sintering structure having a solid phase state Fe—C based alloy phase containing carbon of 0.45 wt % or more and a liquid phase state Cu—Sn alloy phase dispersed therein, and said solid phase state Fe—C based alloy phase contains one or more specific carbides of $Cr_7C_3$, $M_6C$, $M_2C$ and MC type specific carbides dispersed therein.

A connecting device according to the present invention is equipped with the aforementioned ferrous sintered multilayer roll-formed bushing, wherein said back metal steel contains carbon of 0.3 to 0.6 wt %, and said back metal steel is quench hardened at the portions at both end surfaces of said ferrous sintered multilayer roll-formed bushing and a lip seal or dust seal is arranged on the quench hardened portions.

A producing method of a ferrous sintered multilayer roll-formed bushing according to the present invention comprises steps of:

a step for preliminarily sintering a Fe—C—Cu—Sn based sintered sliding material mixed powder to a back metal steel to form a preliminary sintered layer on said back metal steel;

a step for mechanically rolling said preliminary sintered layer;

a step for bending said preliminary sintered layer and said back metal steel into a roll; and a step for finally sintering said preliminary sintered layer at temperatures (for example, 1000° C. or higher, preferably 1050° C. or higher) higher than the preliminary sintering temperature to form a ferrous sintered sliding material layer on said back metal steel, wherein said Fe—C—Cu—Sn based sintered sliding material mixed powder contains at least C of 0.3 to 5 wt %; Cu of 8 to 40 wt % (preferably, 8 to 30 wt %); and Sn of 0.5 to 10 wt %.

A producing method of a ferrous sintered multilayer roll-formed bushing according to the present invention comprises steps of:

a step for preliminarily sintering bonding a Fe—C—Cu—Sn based sintered sliding material mixed powder to a back metal steel at a temperature range of 750 to 950° C. to form a preliminary sintered layer on said back metal steel;

a step for mechanically rolling said preliminary sintered layer;

a step for bending said preliminary sintered layer and said back metal steel into a roll; and a step for finally sintering said preliminary sintered layer at temperatures of 1000° C. or higher, which is higher than the preliminary sintering temperature, to form a ferrous sintered sliding material layer on said back metal steel, wherein said Fe—C—Cu—Sn based sintered sliding material mixed powder contains at least C of 0.4 to 5 wt %; Cu of 8 to 40 wt %; and Sn of 0.5 to 10 wt %, said ferrous sintered sliding material layer after said final sintering step has a liquid phase sintering structure having a solid phase state Fe—C based alloy phase containing carbon of 0.45 wt % or more and a liquid phase state Cu—Sn alloy phase dispersed therein, and said solid phase state Fe—C based alloy phase contains one or more carbides of $Cr_7C_3$, $M_6C$, $M_2C$ and MC type carbides dispersed therein.

A producing method of a ferrous sintered multilayer roll-formed bushing according to the present invention comprises steps of:

a step for preliminarily sintering bonding a Fe—C—Cu—Sn based sintered sliding material mixed powder to a back metal steel at a temperature range of 750 to 950° C. to form a preliminary sintered layer on said back metal steel;

a step for mechanically rolling said preliminary sintered layer;

a step for bending said preliminary sintered layer and said back metal steel into a roll; and a step for finally sintering said preliminary sintered layer at 1000° C. or higher, which is higher than the preliminary sintering temperature, to form a ferrous sintered sliding material layer on said back metal steel, wherein said Fe—C—Cu—Sn based sintered sliding material mixed powder contains at least C of 0.2 to 15 wt % or 0.2 to 9 wt %; Cu of 8 to 40 wt %; and Sn of 0.5 to 10 wt %, a ferrous alloy powder to be contained in said Fe—C—Cu—Sn based sintered sliding material mixed powder contains Cu of a solid solubility limit or more and at least 2 wt % or more to 40 wt % or less and carbon of 0.2 wt % or more, said ferrous sintered sliding material layer after said final sintering step has a liquid phase sintering structure having a solid phase state Fe—C based alloy phase containing carbon of 0.2 wt % or more and a liquid phase state Cu—Sn alloy phase dispersed therein, and said ferrous sintered sliding material layer contains one or more powder particles of metal powder of Co, Cr, Mo and W; alloy powder of NiMo, CoMo and FeMo which contain Mo intermetallic compound; solid lubricant powder of graphite, BN and $CaF_2$; and powder of specific carbide, nitride and oxide which mainly consist of one or more alloy elements of Cr, Mo, W, Ti Zr and Nb dispersed therein.

A producing method of a ferrous sintered multilayer roll-formed bushing comprising steps of:

a step for preliminarily sintering bonding a Fe—C—Cu—Sn based sintered sliding material mixed powder to a back metal steel at a temperature range of 750 to 950° C. to form a preliminary sintered layer on said back metal steel;

a step for mechanically rolling said preliminary sintered layer;

a step for bending said preliminary sintered layer and said back metal steel into a roll; and a step for finally sintering said preliminary sintered layer at 1000° C. or higher, which is higher than the preliminary sintering temperature, to form a ferrous sintered sliding material layer on said back metal steel, wherein said Fe—C—Cu—Sn based sintered sliding material mixed powder contains at least C of 0.4 to 5 wt %; Cu of 8 to 40 wt %; and Sn of 0.5 to 10 wt %, a ferrous alloy powder to be contained in said Fe—C—Cu—Sn based sintered sliding material mixed powder contains Cu of a solid solubility limit or more and at least 2 wt % or more to 40 wt % or less and carbon of 0.45 wt % or more, said ferrous sintered sliding material layer after said, final sintering step has a liquid phase sintering structure containing a solid phase state Fe—C based alloy phase containing carbon of 0.45 wt % or more and a liquid phase state Cu—Sn alloy phase dispersed therein, and said ferrous sintered sliding material layer contains one or more powder particles of metal powder of Co, Cr, Mo and W; alloy powder of NiMo, CoMo and FeMo which contain Mo intermetallic compound; solid lubricant powder of graphite, BN and $CaF_2$; and powder of nitride and oxide which mainly consist of one or more alloy elements of Cr, Mo, W, Ti, Zr and Nb dispersed therein.

It is desirable that said ferrous sintered sliding material layer after said final sintering is sinter-bonded to said back metal steel via a diffusion layer or intermediate ferrous sintered layer, said diffusion layer has a ferrous alloy phase, formed with contacting said back metal steel and also not containing said carbide, and a Cu alloy phase extending in the direction of said sintered layer sinter-bonded by said final sintering step, and said intermediate ferrous sintered layer contains carbon in an amount smaller than that of said ferrous sintered sliding material layer.

In a producing method of a ferrous sintered multilayer roll-formed bushing according to the present invention, it is desirable that said intermediate ferrous sintered layer containing at least Cu of 10 to 40 wt %; Sn of 0.5 to 10 wt % and C of 0 to 0.8 wt % is preliminarily sintered to the sliding surface of said back metal steel and said ferrous sintered sliding material layer is sinter-bonded via said intermediate ferrous sintered layer.

In a producing method of a ferrous sintered multilayer roll-formed bushing according to the present invention, it is also possible that said final sintering step contains a step for rapidly cooling after said final sintering to quench harden or quench temper said Fe—C based alloy phase to harden the Fe—C based alloy phase in said ferrous sintered sliding material layer to have a hardness of Hv500 or more.

In a producing method of a ferrous sintered multilayer roll-formed bushing according to the present invention, it is also possible that said Fe—C—Cu—Sn based sintered sliding material mixed powder is a mixed powder of ferrous alloy powder, Cu powder and at least one powder of Sn powder and Cu alloy powder or a mixed powder of the former mixed powder and graphite powder.

In a producing method of a ferrous sintered multilayer roll-formed bushing according to the present invention, it is desirable that said final sintering step is for forming a liquid phase sintering structure comprising a solid phase state Fe—C based alloy particle containing C of 0.45 wt % or more and a liquid phase state Cu—Sn based alloy phase at said final sintering and then for rapidly cooling to quench harden said Fe—C based alloy particle.

In a producing method of a ferrous sintered multilayer roll-formed bushing according to the present invention, it is desirable that said ferrous sintered sliding material layer after said final sintering contains said Fe—C based alloy in a content of 65% by volume or more.

As described above, according to the present invention, an economical ferrous sintered multilayer roll-formed bushing intended to have low coefficient of friction, having excellent seizing resistance and abrasion resistance and providing self-lubricating property so as to prolong a lubrication interval or eliminate the necessity of lubricating, a producing method of the same and a connecting device can be provided.

BRIEF DESCRIPTION OF THE DRAWINGS

FIGS. 20A and 20B are photographs showing sectional structures of C12 alloy and C14 alloy which are cooled under $N_2$ gas after the final sintering at 1130° C. for 30 minutes without rolling after the preliminary sintering respectively;

FIGS. 22A to 22E are photographs showing sectional structures of alloys in which a preliminary sintering layer of C3 to C5, C7 and C11 alloys are rolled at a rolling reduction of about 60%, finally sintered and then cooled under $N_2$ gas respectively;

FIG. 29A is a drawing showing a test piece in which a ferrous sintered multilayer roll-formed bushing of Example 8 is worked into a bushing examined for bearing test; and FIG. 29B is a drawing schematically showing an experiment apparatus for bearing test;

FIGS. 30A, 30B, 30C and 30D are drawings showing a connecting device according to one embodiment of the present invention;

FIGS. 31A and 31B are sectional drawings showing the connecting device;

BEST MODE OF CARRYING OUT THE PRESENT INVENTION

Figure 1:
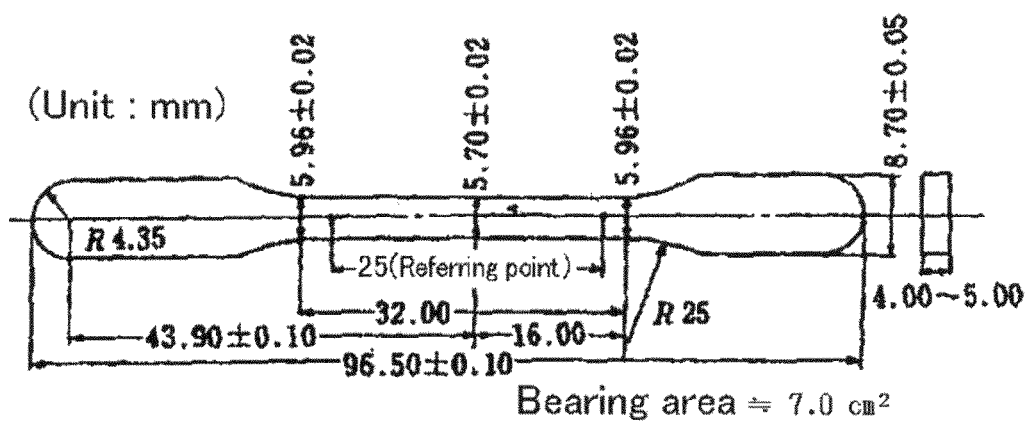
FIG. 1 is a drawing showing a test piece produced by using a ferrous sintered sliding material mixed powder according to Example 1 examined for tensile strength.

The present invention relates to a roll-formed bushing in which a Fe—Cu—Sn based sintered sliding material containing a ferrous alloy phase having one or more carbides of cementite, $Cr_7C_3$, $M_6C$, $M_2C$ and MC type specific carbides precipitated therein, a Cu—Sn alloy phase and further graphite of solid lubricant dispersed therein is sinter-bonded to a back metal steel, and a producing method of the same.

The present invention relates to a ferrous sintered multilayer roll-formed bushing produced in such a manner in which a ferrous sintered sliding material demonstrating excellent seizing resistance and abrasion resistance even under severe lubricating conditions such as high bearing stress, low-speed sliding and oscillating, for example, an operating condition of a connecting device of a construction machine, is preliminarily sinter-bonded to a back metal steel and then finally sintered after bending the back metal steel into a roll, and a producing method of the same.

More particularly, the ferrous sintered multilayer roll-formed bushing has the following characteristics:

(1) a ferrous alloy particle, in which one or more carbides of cemetite, $Cr_7C_3$, $M_6C$, $M_2C$ and MC type specific carbides effective for improvement in seizing resistance and abrasion resistance are dispersed in a matrix phase of a martensite structure, forms a main constituent; and (2) a ferrous sintered sliding material containing CuSn based alloy capable of providing excellent sintering bonding ability with the back metal steel and adhesion resistance dispersed therein is sinter-bonded to the back metal steel.

In addition, it relates to a producing method in which a mixed powder of the ferrous sintered sliding material is sinter-bonded to the back metal steel preliminarily, the back metal steel is rolled, bent into a roll and then sintered finally at a temperature higher than the preliminary sintering bonding temperature.

The present invention relates to a ferrous sintered multilayer roll-formed bushing having improved adhesion resistance and abrasion resistance capable of prolonging a lubrication interval and a producing method of the same. So, in order to provide properties excellent in seizing resistance and abrasion resistance even under severe lubricating conditions such as high bearing stress, low-speed sliding and oscillating, for example, an operating condition of a connecting device of a construction machine, it has the following characteristics:

(1) a ferrous alloy powder containing one or more carbides of cementite, $Cr_7C_3$, $M_6C$, $M_2C$ and MC type specific carbides effective for improvement in seizing resistance and abrasion resistance precipitated therein is used as a base constituent;

(2) a powder or mixed powder of Cu based alloy powder excellent in adhesion resistance is added in order to obtain sintering bonding ability with the back metal steel; and (3) a ferrous sintered sliding material containing a solid lubricant (containing graphite), which is easily impregnated with lubricating oil and easily forms self-lubricating film excellent in lubrication onto the sliding surface, precipitated therein (a solid-lubricating Fe—C—Cu—Sn based or Fe—C—Cu—Sn-graphite based sintered sliding material) is sinter-bonded to a back metal steel preliminarily, the back metal steel is rolled, bent into a roll and then liquid phase sintered again at a temperatures higher than 950° C.

The ferrous sintered multilayer roll-formed bushing according to the present invention is produced in such a manner that a mixed powder of a Fe—C—Cu—Sn based sintered sliding material containing at least C of 0.4 to 5 wt %, Cu of 8 to 40 (30) wt % and Sn of 0.5 to 10 wt % is set on the back metal steel (for example, dispersed), sinter-bonded preliminarily at a low temperature range lower than 1000° C., the back metal steel is mechanically applied with pressure (for example, rolling or pressing), sintered again at the low temperature region, bent into a roll-formed bushing and then finally sintered at a high temperature range higher than 1000° C. At the sintering, a liquid phase sintered structure comprising a solid phase state Fe—C based alloy particle containing carbon of 0.45 wt % or more, as a main constituent, and a liquid phase state Cu—Sn based alloy is formed. At the cooling step after the sintering step or at another step, a hardening heat treatment is subjected so that the matrix phase of the Fe—C based alloy particle is quench hardened resulting in producing a multilayer ferrous sintered roll-formed bushing having a martensite or a structure mainly consisting of martensite.

The multilayer ferrous sintered roll-formed bushing produced by sinter-bonding the mixed powder of Fe—C—Cu—Sn based sintered sliding material onto the back metal steel has high rigidity as a radial bearing (bushing) owing to the back metal and makes it possible to prevent ejecting of the bushing at the operation and also prevent cracking of the sintered sliding layer under the bending stress at offset load. In addition, it becomes possible to reduce used amount of expensive sintered sliding material and thus to increase economical efficiency.

The ferrous sintered multilayer roll-formed bushing according to the invention is a ferrous sintered multilayer roll-formed bushing having a ferrous sintered sliding material layer sinter-bonded onto the back metal steel. The ferrous sintered sliding material layer contains at least C of 0.4 to 15 wt % or 0.4 to 9 wt %, Cu of 8 to 40 wt % and Sn of 0.5 to 10 wt % and is produced in such a manner that a mixed powder of Fe—C—Cu—Sn based sintered sliding material is preliminarily sinter-bonded onto the back metal steel and then finally sinter-bonded by a liquid phase sintering at a temperature higher than 1000° C. after bending the back metal steel into a roll. A ferrous alloy powder contained in the mixed powder of Fe—C—Cu—Sn based sintered sliding material contains Cu of a solid solubility or more and at least 2 wt % to 40 wt % and carbon of 0.2 wt % or more. The ferrous sintered sliding material layer has a liquid phase sintered structure in which a solid phase state Fe—C based alloy phase containing C of 0.2 wt % or more and a liquid phase state Cu—Sn based alloy phase are dispersed. The ferrous sintered sliding material layer contains one or more particle powders of metal powders of Cr, Co, Mo and W having a very small solid solubility with Cu; alloy powders of NiMo, CoMo and FeMo containing Mo intermetallic compound; solid lubricant powders of graphite, BN and $CaF_2$; and powders of specific carbide, nitride and oxide mainly consisting of one or more alloy elements of Cr, Mo, W, V, Ti and Zn.

The ferrous sintered multilayer roll-formed bushing according to the invention is a ferrous sintered multilayer roll-formed bushing having a ferrous sintered sliding material layer sinter-bonded onto the back metal steel. The ferrous sintered sliding material layer contains at least C of 0.4 to 15 wt %, Cu of 8 to 40 wt % and Sn of 0.5 to 10 wt % and is produced in such a manner that a mixed powder of Fe—C—Cu—Sn based sintered sliding material is preliminarily sinter-bonded onto the back metal steel and then finally sintered by a liquid phase sintering at a temperature of 1000° C. or higher, which is higher than the preliminary sintering temperature, after bending the back metal steel into a roll. A ferrous alloy powder contained in the mixed powder of Fe—C—Cu—Sn based sintered sliding material contains Cu of a solid solubility or more and at least 2 wt % or more to 40 wt % or less and carbon of 0.2 wt % or more. The ferrous sintered sliding material layer has a liquid phase sintered structure in which a solid phase state Fe—C based alloy phase containing C of 0.45 wt % or more and a liquid phase state Cu—Sn based alloy phase are dispersed. The solid phase state Fe—C based alloy phase contains one or more carbides of $Cr_7C$, $M_6C$, $M_2C$ and MC type carbides dispersed therein. The ferrous sintered sliding material layer contains one or more particle powders of solid lubricant powders of Cr, Co, Mo, W, NiMo, CoMo, FeMo, graphite, BN and CaF2; and powders of specific carbide, nitride and oxide mainly consisting of one or more alloy elements of Cr, Mo, W, V, Ti and Zr.

The ferrous sintered sliding material layer contains carbide dispersed therein. The ferrous sintered sliding material layer is sinter-bonded onto the back metal steel via a diffusion layer or an intermediate ferrous sintered layer. The diffusion layer is formed at the vicinity of a bonding boundary between the ferrous sintered sliding material layer and the back metal steel and provided with a ferrous alloy phase which does not contain the carbide and a Cu alloy phase extending in a side of the sinter-bonded sintered layer. The intermediate ferrous sintered layer does not contain the carbide or contains carbon in an amount smaller than the carbon amount of the ferrous sintered sliding material layer.

It is desirable that the intermediate ferrous sintered layer is a ferrous sintered material layer containing at least Cu of 10 to 40 wt %, Sn of 0.5 to 10 wt % and C of 0 to 0.8 wt %; the ferrous sintered material layer is prepared such that a base structure of the ferrous alloy phase in the intermediate ferrous sintered layer mainly consists of one or more elements of ferrite, perlite and bainite and has a martensite structure of a volume content of under 50%; the ferrous sintered material layer is sinter-bonded to the back metal steel; and the ferrous sintered sliding material layer is sinter-bonded to the sliding surface of the back metal steel via the intermediate ferrous sintered layer.

It is desirable that the Fe—C based alloy phase in the ferrous sintered sliding material phase is quench hardened and the matrix has a structure mainly comprising martensite or temper martensite.

It is desirable that a surface layer 0.1 mm in depth from the surface of the ferrous sintered sliding material layer contains a Cu alloy phase excellent in sliding ability at a higher content rate than that of an inside layer of the ferrous sintered sliding material layer. The surface layer 0.1 mm in depth from the surface of the ferrous sintered sliding material layer preferably has finer ferrous alloy particle formed therein than that of the inside layer.

By adding Sn principle powder or Sn matrix alloy powder to the mixed powder of Fe—C—Cu—Sn based sintered sliding material in an amount compatible with an addition amount of Cu, a sintering bonding ability of the mixed powder of Fe—C—Cu—Sn based sliding material to the back metal steel is improved. In addition, even if the Cu phase is dispersed in the mixed powder of Fe—C—Cu—Sn based sintered sliding material, the Cu—Sn based alloy phase gives an excellent sliding property.

In the preliminary sintering at the low temperature range (1000° C. or lower) at which a strong sintering of hard ferrous particles is not started, a sufficient amount of liquid phase of Cu—Sn based alloy is generated and thus wettability with the back metal steel and ferrous alloy powder is improved so that the ferrous sintered sliding material layer (a layer formed by sinter-bonding the mixed powder of Fe—C—Cu—Sn based sintered sliding material) can have sufficient strength enough for mechanical reduction (for example, rolling) and bending for forming into a roll-formed bushing.

An addition amount of Cu is set such that a sufficient amount of liquid phase is generated in the liquid phase sintering range. Referring to a HANSEN's state diagram, the lower limit of the addition amount is set to 8 wt % and the upper limit of the addition amount is set to 40 wt %. As for an addition amount of Sn, since it hardly diffuses and forms a solid solution with the ferrous alloy particles at the sintering within the low temperature range, the addition amount is set to 0.5 to 10 wt % so as to generate a Cu—Sn alloy having a Sn concentration more than Cu-5 wt % Sn with an addition amount of Cu.

Excess upper addition amount of Cu increases an amount of Cu—Sn based alloy phase at the final sintered state and thus obviously deteriorates abrasion resistance of the ferrous sintered sliding material layer. Therefore, an upper limit of addition amount of Cu and Sn is preferably set to 30 wt %, more preferably 20 wt %.

The ferrous sintered sliding material layer of the roll-formed bushing worked by the bending has insufficient strength and rigidity enough to resist sliding under high bearing stress. Accordingly, in the present invention, by applying the final sintering at 1000° C. or higher, ferrous alloy particle-ferrous alloy particle, ferrous alloy particle and Cu alloy liquid phase, and ferrous alloy particle and added graphite are allowed to form a solid solution and be diffused sufficiently. And, the rapid cooling is applied after the final sintering to quench harden the ferrous alloy particle in the sintered sliding material. As the result, a sliding property excellent in strength, bearing stress and seizing resistance can be provided.

At the same time, in order to obtain load bearing property for use under high bearing stress, it is important to improve the sintering bonding strength between the ferrous sintered sliding material layer and the back metal steel. Accordingly, in the present invention, the final sintering forms a clear diffused area at the vicinity of the bonding boundary and also forms the ferrous alloy particles and/or Cu—Sn based alloy phase (particle) growing so as to extend in the diffusion direction so that a tight sintering bonding ability can be obtained.

A lower limit of the final sintering temperature is set to 1000° C. at which graphite particles added to the mixed powder of Fe—C—Cu—Sn based sintered sliding material is rapidly diffused in the ferrous alloy powder and forms a solid solution; a sintering property of the ferrous alloy powder in the mixed powder of Fe—C—Cu—Sn based sintered sliding material is significantly exhibited; and the diffused layer at the bonding boundary begins to be formed clearly. More preferably, the lower limit of the final sintering temperature is set to 1050° C. or higher. An upper limit of the final sintering temperature is preferably set to 1200° C. at which a sintering property of the ferrous alloy particle does not become excessive or the Cu—Sn alloy does not evaporate excessively.

The rapid cooling for quench hardening the Fe—C based alloy particle is performed by a gas cooling after the final sintering in viewpoint of economical efficiency. So, the Fe—C based alloy particle preferably contains one or more alloy elements of Cr, Mo, W, V, Ni, Mn and Si which improve hardening property in a total amount of 1 wt % or more.

When the back metal steel is also quenched by the quench hardening, the ferrous sintered sliding material which is sinter-bonded to the inner surface of the back metal steel may cause cracking because of large volume expansion of the back metal steel. Therefore, it is desirable to select the steel which is not quenched. And, the rapid cooling is preferably performed by a gas cooling or a cooling in oil.

Since the ferrous alloy phase preferably has a hardness of micro Vickers' hardness of MHV 550 or more, it is desirable to form a martensite phase which forms a solid solution with carbon of at least 0.3 wt % or more.

An amount of the quench hardened Fe—C based alloy particle is at least 65% by volume. In viewpoint of more improvement in abrasion resistance as described above, it is preferably 75% or more by volume, more preferably 90% or more by volume at which abrasion resistance is substantially saturated. An upper limit content of the Fe—C based alloy particle is preferably 98% by volume. This brings a tight bonding of almost all of the Fe—C based alloy particle. An upper limit amount of the Fe—C based alloy particle comes close to nearly 100% by volume on the sliding surface when it is considered that Cu element forms a solid solution with the Fe—C based alloy particle at the final sintering. However, it is clear that the upper limit amount is approximately saturated in view of abrasion resistance. Referring to HANSEN' phase diagram, by a liquid phase sintering at a high temperature range of 1100° C., Cu in a maximum amount of about 10 wt % forms a solid solution with the ferrous alloy, for example. That is, a large amount of added Cu forms a solid solution with the ferrous alloy phase. So, it is desirable that a content of the Cu alloy phase which is undesired for abrasion resistance can be reduced.

In order to further improve seizing resistance and abrasion resistance of the ferrous sintered sliding material layer, it is desirable that the Fe—C based alloy powder (special steel powder) which contains carbon of at least 0.45 wt % or more (preferably, 0.6 wt % or more) and also one or more elements of cementite and/or $Cr_7C_3$, $M_6C$, MC and $M_2C$ type specific carbides precipitated in the particle and the grain boundary is contained in an amount of 30% or larger or 100% by volume of all of the Fe—C based alloy particle. In order to further reduce coefficient of friction and further improve seizing resistance and abrasion resistance, it is desirable that the specific steel particle is contained in an amount of 50% or larger or 100% by volume of all of the Fe—C ally particle.

The aforesaid patent literature 4 discloses the Fe—C—Cu sintered sliding material to which a high-speed steel powder is added in an amount of 5 to 30 wt %.

However, since the high-speed steel powder which causes the aforesaid specific carbide to precipitate is dispersed in the Fe—C—Cu sintered alloy, sufficient seizing resistance enough for a bushing of construction machine operated under severe condition (high bearing stress and low oscillating) can not be obtained. Especially, the sliding material has a problem in a high coefficient of friction. On the other hand, in the present invention, the whole of ferrous alloy particle comprises the ferrous alloy particle containing the specific carbide dispersed substantially uniformly therein in an amount of 50 wt % or more or 100 wt % and the remainder of Cu—Sn alloy phase excellent in sliding property. This can solve the problem.

In the ferrous sintered multilayer roll-formed bushing according to the present invention, the Fe—C based alloy particle preferably contains one or more elements of Cr of 5 to 25 wt %; Mo of 3 to 20 wt %; W of 3 to 20 wt %; and V of 0.5 to 7 wt %. And, the mixed powder of Fe—C—Cu—Sn based sintered sliding material preferably contains a specific steel powder (for example, Fe—C alloy powder) in an amount of 50 wt % or more, in which the specific steel powder contains one or more carbides of $Cr_7C_3$, $M_6C$, MC and $M_2C$ type specific carbides in a total amount of 5% by volume (preferably, 5 to 50% by volume) dispersed therein.

In the ferrous sintered multilayer roll-formed bushing according to the present invention, the mixed powder of Fe—C—Cu—Sn based sintered sliding material preferably contains a Fe—C based alloy powder in an amount of 50 to 100 wt % or 100 wt %, in which the Fe—C based alloy powder contains carbon of 0.45 wt % or more; one or more elements of Cr of 5 to 25 wt %, Mo of 3 to 20 wt %, W of 3 to 20 wt % and V of 0.5 to 7 wt %; and one or more carbides of $Cr_7C_3$, $M_6C$, MC and $M_2C$ type carbides in a total amount of 5 to 60% by volume dispersed therein.

It is desirable that the specific carbide which is precipitated and dispersed in the particle or grain boundary of the Fe—C based alloy powder is formed into a fine structure, having an average grain size of 10 μm or less.

It is desirable that the specific steel powder preferably contains at least carbon of 0.45 wt % or more (preferably 0.6 wt % or more); and one or more elements of Cr of 5 to 25 wt %, Mo of 3 to 20 wt %, W of 3 to 20 wt % and V of 0.5 to 7 wt % and also contains one or more of the specific carbides, which are precipitated and dispersed in a tool steel (SKD steel) and a high-speed steel (SKH steel) excellent in seizing resistance and abrasion resistance, dispersed therein. An amount of the carbides to be precipitated and dispersed in the Fe—C based alloy particle is preferably set to 5% by volume or more referring to a high-speed steel (about 10% by volume). The upper limit is preferably set to 60% by volume referring to a carbide amount of hard metal and cermet.

More particularly, when $M_6C$ carbide (carbon concentration is about 3 wt %) is dispersed, carbon of 0.15 wt % is used to form the carbide and carbon of 0.3 wt % is used to form a solid solution with the matrix martensite as described above. Therefore, a necessary lower limit of concentration of carbon in the ferrous alloy phase is preferably set to 0.45 wt %. However, it is more preferably set to 0.6 wt % because it is more desirable to disperse the specific carbide in an amount of 10% or more by volume in viewpoint of improvement in seizing resistance and abrasion resistance and low coefficient of friction.

An upper limit of content of the specific carbide can be increased to about 60% by volume referring to hard metal and cermet. Therefore, in a case of $Cr_7C_3$ carbide (C of 8.5 wt %), an upper limit of carbon concentration is preferably set to about 5.5 wt %.

Dispersing the specific carbide at high concentration is effective for improvement in seizing resistance and abrasion resistance. However, when the carbide becomes excessively coarse, the counterpart may be attacked and abraded because of its highly hardness. Accordingly, the specific carbide preferably has an average grain size of 10 μm or less. So, the specific carbide is preferably formed into a fine particle having an average grain size of 5 μm or less.

A content of carbon in the ferrous alloy powder can be adjusted by adding and mixing as graphite powder and also diffusion and solid solution formation at the final sintering at the high temperature range. However, it is desirable that the ferrous alloy powder contains carbon previously in viewpoint of improvement in the preliminary sintering bonding ability after the diffusion and possibility for finely precipitation and dispersion of the specific carbide described later.

When the ferrous alloy powder containing carbon previously is used, the mixed powder preferably contains carbon (graphite powder) of 0.1 to 3 wt %. This can prevent generation of coarse pores (coarse bubbles) at the final sintering and also promote sintering ability of the Fe—C based alloy powder. As the result, sintering ability of the ferrous sintered body at the final sintering can be improved.

It is desirable to promote sintering ability of the ferrous alloy powder by the final sintering (liquid phase sintering) at the high temperature range in viewpoint of improvement in strength and hardness. So, the mixed powder of Fe—C—Cu—Sn based sintered sliding material preferably added with one or more elements of P of 0.1 to 1.5 wt %; B of 0.05 to 1.5 wt %; C of 0.1 to 3.0 wt %; Al of 1 to 10 wt %; Si of 0.5 to 3 wt %; Mn of 1 to 20 wt %; Ti of 0.1 to 2 wt %; and Mo of 0.1 to 10 wt %.

Especially, addition of graphite, Mn and P as Cu—P master alloy and Fe—P master alloy improves sintering ability from about 1000° C. The same effect is expected by addition of B and Si.

An upper limit of addition amount of each added element is set such that the ferrous sintered material does not become too brittle and the martensite does not harden. For example, in a case of graphite, it is set such that an amount of the carbide to be dispersed does not exceed 60% by volume and cause brittleness. In a case of P; B; and Si, it is set such that phosphide; boron carbide and boride; and Cu alloy phase does not become brittle respectively. In a case of Mn, it is set such that retained austenite is not precipitated.

In the multilayer sliding material produced by diffusing the mixed powder of ferrous sintered sliding material on the back metal steel and then sintering bonding, the mixed powder is not dispersed uniformly in many cases because of its flowablity and the like. And, after the sintering bonding and mechanical reduction, unevenness of the diffusion density occurs and plural of fine slit-like grooves about 20 μm in depth are formed. And, after the final sintering, due to these problems, the surface layer may easily become porous and brittle and sufficient sliding ability may not be exhibited in some cases. Accordingly, in the present invention, it is desirable to form a decorative surface layer (a preliminarily sintered layer) produced by repeating a following process one or more time. In the process, fine powder of –#250 mesh or less excellent in sliding property is thinly diffused on the surface of the preliminarily sintered ferrous sintered sliding material layer, subjected to a mechanical reduction and then preliminarily sintered. As the fine powder for forming the decorative surface layer, the same powder or an mixed powder having similar construction as the mixed powder of ferrous sintered sliding material can be used. Or, another kinds of powder excellent in sliding property can be also used as described later.

It is desirable that the ferrous sintered sliding material layer has a surface layer containing a ferrous alloy particle (for example, using ferrous alloy powder) finer than the inside layer. This can improve conformability and bearing stress.

Since the ferrous sintered sliding material consists of hard layer containing a large amount of carbide, it is assumed that conformability with the counterpart may become very important. Therefore, in the surface layer of the ferrous sintered sliding material layer, it is desirable to increase a rate of an amount of soft Cu alloy excellent in sliding property more than the inside layer. And, it is also desirable to thinly coat a mixed powder of Fe—C—Cu—Sn based sintered sliding material containing increased content of Cu and Sn on the surface layer so as to increase a rate of Cu alloy phase of the surface layer than the inside layer. This can improve conformability.

The coated thin soft layer preferably has a thickness of 0.1 mm or less in viewpoint of conformable abrasion amount of a roll-formed bushing.

As the Cu alloy, the Cu—Sn based alloy is preferable. It is also desirable to diffuse a Cu alloy containing a large amount of Mn, Si and Al and to modify such that β phase is precipitated in the Cu alloy phase in the ferrous sintered sliding material layer after the final sintering.

In order to exhibit the same performance as the aforesaid soft coated layer, it is desirable to disperse solid lubricant powder such as fine Mo, W, ferro Mo, Co—Mo, $CaF_2$, graphite, BN and the like on the surface of the ferrous sintered sliding material layer. This can improve conformability and seizing resistance.

Almost all of the solid lubricant is significantly reacted with the Fe—C based alloy particle at the final sintering. Accordingly, in the present invention, it is desirable to use the Fe—C—Cu based alloy powder containing at least carbon of 0.45 wt % and Cu of a solid solubility or more so as to expose a liquid Cu alloy phase on the surface of the particle at the final sintering, thereby dispersing the solid lubricant particle while preventing the aforesaid reaction.

By adjusting the mechanical reduction before the final sintering (liquid phase sintering) at the high temperature range and temperatures of the final sintering, a porosity of the ferrous sintered sliding material layer can be adjusted. And, by adjusting the porosity at a suitable value (10 to 30% by volume) for an oil retaining bearing and then filling the pores with lubricating oil or lubricating compound, seizing resistance can be improved and a lubricating interval can be prolonged. In addition, by sinter-bonding the ferrous sintered sliding material layer to the back metal via a porous Fe—Cu—Sn based sintered material layer and filling the pores of the intermediate Fe—Cu—Sn based material later with the lubricating oil and lubricating compound, a lubricating interval can be further prolonged. However, when it is applied for a bushing of a construction machine of which a sliding speed is low, coefficient of friction is likely to increase. And, in a portion at which entering of sand can not be prevented, sufficient abrasion resistance can not be obtained.

In such cases, it is desirable to rise the final sintering temperature to 1000° C. or higher so as to promote sintering ability of the iron alloy powders and also to increase the density such that a porosity of the ferrous sintered sliding material layer is 10% by volume or less. This can improve strength and abrasion resistance. It is also desirable to form suitable oil grooves and oil holes (dimple-shaped) for supplying lubricating oil on the sintered sliding layer of the ferrous sintered multilayer roll-formed bushing.

Especially, in a bushing of construction machine of which an oscillating angle is small and a sliding speed is low, the oil grooves and oil holes are preferably arranged finely. However, when an area ratio of the oil grooves and oil holes become excessive, a bearing stress at the sliding portion is increased and local adhesion occurs very often, resulting in high coefficient of friction. So, the area ratio is preferably as small as possible. Accordingly, in the ferrous sintered multilayer roll-formed bushing according to the present invention, it is desirable that the ferrous sintered sliding material layer under a preliminary sintering state is subjected to a mechanical reduction to generate plural of fine cracks extending in the direction substantially perpendicular to the inner circumferential direction of the roll-formed bushing and then subjected to the final sintering so as to densify the sintered layer so that the cracks are opened to form wavelike oil grooves and oil holes. This can improve lubricating ability at the sliding surface. The fine cracks extend in a direction substantially perpendicular to a rolling direction.

In the ferrous sintered multilayer roll-formed bushing according to the present invention, the surface layer 0.1 mm in depth of the ferrous sintered sliding material layer is preferably formed with wavelike cracks opened in a direction substantially perpendicular to the inner circumferential direction by the final sintering.

The mechanical reduction for forming the cracks is preferably carried out by a rolling. An area ratio of the oil grooves and oil holes formed by the cracks is preferably 30% by area or smaller and an average distance between the crack grooves is preferably 15 mm or less. More preferably, the area ratio is 20% by area or less and the average distance is 8 mm or less.

In order to lower coefficient of friction of a bushing operated under small oscillating angle and small sliding speed conditions, it is desirable to fill the oil grooves and oil holes produced from the cracks with one or more materials of resins such as tetrafluoride resin (for example, PTFE), polyamide resin (nylon), polyacetal resin (POM) and polyethylene resin and solid lubricants of graphite, BN, $MoS_2$, $WS_2$ and the like.

The ferrous sintered sliding material layer may be sinter-bonded to the back metal steel in a plural of separately arranged islands or protruded portions form in a range within 30 to 70% by area.

In the bushing of construction machine which requires high bearing stress and also prolongation of a lubricating interval or elimination of lubricating, more oil grooves and dimple-shaped oil holes are preferably formed on the sintered sliding layer. In addition, the ferrous sintered roll-formed bushing in which the ferrous sintered sliding material is sinter-bonded to the back metal steel in a plural of separately arranged protruded portions form is more preferable. In such case, an area ratio of the protruded portions is preferably 30 to 70% by area. And, the protruded portions are preferably arranged in a hound's-tooth state or randomly. The protruded portion formed on the sliding surface preferably has a maximum length of 15 mm or less in the sliding direction, more preferably 10 mm or less.

On the contrary, in the ferrous sintered roll-formed bushing in which the ferrous sintered sliding material layer is formed with oil grooves and dimple-shaped oil holes, an area ratio of the oil grooves and oil holes is preferably 30 to 70% by area. And, the sliding material part preferably has a maximum length of 15 mm or less in the sliding direction, more preferably 10 mm or less.

As described above, it is more desirable to fill the oil grooves and oil holes with the aforesaid resins and solid lubricant.

In a bushing of construction machine operated under high bearing stress, the oil grooves may be damaged. In such case, the oil grooves is preferably adjusted so as to reach the inside of the back metal steel by a mechanical working in order to prevent the stress from concentrating on the boundary between the back metal steel and the ferrous sintered sliding material.

As for the ferrous sintered roll-formed bushing used in portions operated under high bearing stress and requiring abrasion resistance against sand, it is desirable to dinsify the ferrous sintered sliding material so as to have a porosity of 10% by volume or less, more preferably 5% by volume or less.

The matrix phase of the quench hardened Fe—C based alloy particle preferably mainly consists of a tempered martensite structure tempered one or more time at 300° C. or higher. As described above, a structure of matrix phase of the quench hardened ferrous alloy phase of the ferrous sintered sliding material layer comprises mainly martensite. However, the uppermost surface of the sliding surface may be significantly tempered by heat generated at the sliding. So, the uppermost surface portion may be temper-softened and significant large tensile strength may cause abrasion and cracking. Accordingly, in the present invention, referring to a tempering treatment of a tool steel and high-speed steel, a tempering at 300° C. or higher is preferably applied one or more time, preferably two times or more.

It is also important to increase temper softening resistance. So, the ferrous alloy phase after the tempering has preferably Vickers hardness of Hv550 or more, more preferably Hv650 or more.

Since a large amount of soft retained austenite remains in the matrix phase of the ferrous alloy quench hardened by air cooling or cooling in oil in addition to martensite, seizing resistance and abrasion resistance may be deteriorated under high bearing stress and low-sliding speed conditions. Accordingly, referring to a heat treatment of a high-speed steel, in the present invention, it is desirable to adjust an amount of retained austenite in the martensite structure of the matrix phase of the Fe—C based alloy particle to 10% by volume or less, more preferably 5% by volume.

When a concentration of solid solution of carbon in the martensite structure of the ferrous alloy matrix phase is high as 0.6 wt % or more, an amount of retained austenite significantly increases and fine heat cracks easily occur. Accordingly, referring to a concentration of solid solution of carbon in a high-speed steel (as shown "The Japan Institute of Metals", newsletter, 2(1963), p564.), the concentration is preferably set to 0.6 wt % or less.

The ferrous alloy phase (Fe—C based alloy particle) preferably contains one or more elements selected from the group consisting of Si, Al, Mn, Ni, Cr, Mo, V, W, Co, S, P, N, B, Nb, Ti and Zr in order to improve sintering ability, temper softening resistance and seizing resistance of the matrix phase of the ferrous phase in addition to the elements for producing the specific carbides.

Si is an element which is contained in a conventional iron alloy in an amount of 0.05 wt % or more and improves deoxidizing and sintering ability. And, it improves temper softening resistance at 450° C. or lower. So, Si is added in an amount of 0.5 wt % or more in many cases. However, excessive addition of Si causes brittleness because of an excessive solid solution formation of Si with the Cu alloy phase. Accordingly, an upper limit of addition amount of Si is preferably set to 5 wt %, more preferably 3 wt %.

Al is an element which improves deoxidizing and sintering ability. In many cases, Al is added in an amount of 0.01 wt % or more. Preferably, Al is added in an amount of 0.5 wt % or more because of a function for improving temper softening resistance as with Si. In addition, Al works as a ferrite stabilization element more effective than Si. In order to prevent precipitation of the ferrite phase at excessive high hardening temperatures or at sintering temperatures, an upper limit of addition amount of Al is preferably set to 10 wt %, more preferably 7 wt %.

Mn is an element which improves desulfurizing and sintering ability and is usually contained in an amount of 0.3 wt % or more. In addition, Mn improves liquid phase sintering ability of the ferrous sintered material at the high temperature range as described above and also increases an amount of retained austenite in the ferrous alloy phase. So, an upper limit of addition amount of Mn is preferably set to 15 wt %, more preferably 10 wt %.

Ni is an element which is discharged from the specific carbides and concentrated in the matrix phase of ferrous alloy phase. In addition, Ni increases an amount of retained austenite. So, an upper limit of addition amount of Ni is preferably set to 4 wt % or less, more preferably 2.5 wt %.

Cr is an element which improves sintering ability and forms carbides significantly. Usually, Cr is added in an amount of 1.0 wt % or more. In order to precipitate and diffuse $Cr_7C_3$ type carbide, Cr of 5 to 25 wt % is preferably added.

Mo is an element which improves sintering ability significantly. Mo of 0.1 wt % or more is usually added. However, Mo of 1 wt % or more is preferably added because of its remarkable temper softening resistance. In addition, in order to precipitate and diffuse $M_6C$ and $M_2C$ type carbides, Mo of 3 to 20 wt % is preferably added.

W exhibits remarkable temper softening resistance as with Mo. So, W of 1 wt % or more is preferably added. In addition, in order to precipitate and diffuse $M_6C$ and $M_2C$ type carbides, Mo of 3 to 20 wt % is preferably added.

V is an element which exhibits extremely remarkable temper softening resistance. It is usually added in an amount of 0.1 wt % or more. In addition, in order to precipitate and diffuse $V_4C_3$ (MC type) carbide, W of 0.5 to 7 wt % is preferably added.

Co is an element which is discharged from the specific carbides and concentrated in the matrix phase of ferrous alloy phase. And, Co itself does not improve temper softening resistance so much. However, Co has a function for improving temper softening resistance of Al, Cr, Mo, W and V. So, an upper limit of addition amount of Co is preferably set to 20 wt %, more preferably 10 wt %.

Ti, Nb, Zr and the like are elements which precipitate MC type carbide. So, an addition amount of each element is preferably set to 0.01 to 2.0 wt %, more preferably 1 wt % in viewpoint of cost.

P is an element which promotes liquid phase sintering ability at the high temperature range significantly as described above. P of 0.1 wt % or more is preferably added. And, an upper limit of addition amount of P is set to 1.5 wt % in viewpoint of preventing embrittlement by formation of phosphide.

S is an element which is contained in an amount of 0.005 wt % or more as impurity. It improves cutting performance and grinding performance of ferrous sintered sliding material. So, a maximum addition amount of S is preferably set to 1 wt %, more preferably 0.5 wt %.

C is an element necessary for formation of hard martensite and the specific carbides and also promoting sintering ability at the high temperature range. In order to obtain a carbon concentration (0.3 to 0.6 wt), an amount of specific carbide (5 to 50% by volume) and/or an amount of graphite particle (3 to 50% by volume), and a total amount of specific carbide and graphite particle (5 to 50% by volume) in martensite, C of 0.3 to 15 wt % is contained.

N is an element which is added at ingot making of ferrous alloy powder and the liquid phase sintering. Especially, it can be added at an after heat treatment such as soft nitriding and nitriding often carried out for preventing seizing of a die. The ferrous sintered roll-formed bushing of the present invention is preferably subjected to such an after heat treatment.

Some elements (P of 0.1 to 1.5 wt %; B of 0.05 to 1.5 wt %; C of 0.2 to 3.0 wt %; Al of 1 to 10 wt %; Si of 0.5 to 3 wt %; Mn of 1 to 20 wt %; Ti of 0.1 to 2 wt %; and Mo of 0.1 to 10 wt %) which increase sintering ability of ferrous alloy powders unavoidably form a solid solution with the Cu—Sn based alloy phase in the ferrous sintered sliding material layer, in addition to Sn. For the purpose of adjusting a melting point of Cu—Sn alloy phase at the liquid phase sintering and also adjusting strength, hardness, sliding property and corrosion resistance, alloy element is preferably added. In the present invention, one or more elements of Pb, Fe, Al, Ti, Mn, Ni, Si and P is preferably contained.

Fe is an avoidable element which is contained by a solid solution formation with Cu—Sn alloy phase from the ferrous alloy powder. A concentration of the solid solution is 1 to 3 wt %. By sintering at 1000° C., described later, Fe element of specific steel powder containing the specific carbide forms a solid solution so that the specific carbide is dispersed in the Cu—Sn alloy phase. Accordingly, it is expected that seizing resistance of the Cu—Sn alloy phase can be improved.

Al has a high oxidation ability and high reactivity with nitrogen. Accordingly, it is not used positively except for sintering under vacuum sintering atmosphere. However, Al is preferable for improvement in strength of the Cu alloy when alloying under vacuum sintering atmosphere. And, addition of Al in an amount of 2 to 12 wt % forms β phase to improve sliding property.

Ti has a high oxidation ability and high reactivity with nitrogen. Accordingly, it is not used positively except for sintering under vacuum sintering atmosphere. However, Ti is preferable for improvement in strength of the Cu alloy when alloying under vacuum sintering atmosphere. And, addition of Ti lowers a melting point of Cu alloy phase. So, it contributes sintering ability at low temperatures and addition of Ti in an amount of 0.1 wt % or more improves sintering bonding ability with a back metal steel significantly.

In addition, Ti is an element for forming carbide. So, it is expected that Ti is reacted with carbon element added to the mixed powder of ferrous sintered sliding material at the final sintering to form TiC in the ferrous sintered sliding material layer and thereby to improve seizing resistance and abrasion resistance. The upper limit of addition amount of Ti is set to 2 wt %. When Ti is added as a principle powder, coarse TiC is easily formed whereby it is necessary to take account of attackability to the counterpart sliding material.

Mn lowers a melting point significantly by alloying with Cu to improve sintering ability. And, in Cu—Sn—Mn alloy, Mn produces a hard β phase. So, it is expected to improve seizing resistance and abrasion resistance as with β phase of Cu—Al—Sn based alloy. So, Mn is preferably added in a substantial amount of Cu-5 to 30 wt % Mn.

Ni heightens a melting point by alloying with Cu and improves strength of Cu alloy, as is well known. A Cu—Sn—Ni liquid phase is an preferable element which improves wettability with the ferrous alloy powder. It is known that a Cu—Ni—Fe and Cu—Ni—Sn ternary alloys show remarkable hardenability (by spinodal decomposition). Accordingly, Ni is added such that a concentration of Ni in the Cu alloy phase is 1 to 30 wt %.

Si lowers a melting point by alloying with Cu and improves strength of Cu alloy. An addition amount of Si is preferably adjusted such that an amount of Si in Cu alloy phase is 5 wt % or less in order to prevent precipitation of brittle intermetallic compound.

P is well known as an element which improves deoxidation of Cu—Sn alloy and flowability of liquid phase. The deoxidation suppresses foaming at a process in which Cu—Sn alloy is liquid phase sintered. So, a lower limit of addition amount is set to 0.1 wt %.

Mo is an element which hardly forms a solid solution with Cu—Sn alloy phase and does not form intermetallic compound with Cu. And, it shows a remarkable carbide formation reaction with carbon element in the ferrous sintered sliding material at the final sintering. So, it forms carbide such as $Mo_2C$ and $M_6C$ at the final sintering to improve abrasion resistance and seizing resistance as with Ti. In addition, when Mo particle is used as solid lubricant by dispersing suitably at the final sintering, it is desirable to use a ferrous alloy powder containing carbon of 0.45 to 5 wt % and Cu of a solid solubility or more previously as described above.

By use of the same principle of Mo, powder particles of graphite, BN, W, Co, Cr, ferroMo and Co—Mo alloy can be dispersed. The ferrous sintered multilayer roll-formed bushing according to the present invention preferably contains one or more elements of graphite, Mo, BN, ferroMo and Co—Mo alloy particle in an amount of to 30% by volume dispersed therein. Especially, graphite is inexpensive and dispersion of graphite in an amount of 3% by volume or more clearly shows a solid lubricating ability but lowers strength of the ferrous sintered sliding material layer. So, an upper limit of addition amount is preferably set to 30% by volume such that a total content of carbon in the ferrous sintered sliding material layer is adjusted to 1.2 to 13 wt %.

In the ferrous sintered multilayer roll-formed bushing according to the present invention, metal powders of Cr, Co, Mo and W; alloy powders of NiMo, CoMo and FeMo containing Mo intermetallic compound; solid lubricant powders of graphite, BN and $CaF_2$; and powders of specific carbide powder, nitride powder and oxide powder consisting of one or more alloy elements of Cr, Mo, W, V, Ti and Zr; which are dispersed in the ferrous sintered sliding material layer, preferably has an average grain size of 1 to 50 μm. And, the powder particle is preferably dispersed in the ferrous sintered sliding material layer in an amount of 3 to 30% by volume.

It is desirable that the graphite has an average grain size within a range of 1 μm to 50 μm and the powder in an amount of 3 to 30% by volume is dispersed in the ferrous sintered sliding material layer.

Especially, it is more desirable that the powder of the graphite has an average grain size within a range of 1 μm to 20 μm and the powder in an amount of 3 to 30% by volume is dispersed in the ferrous sintered sliding material layer.

The ferrous sintered roll-formed bushing may be provided with a collar.

The mixed powder of Fe—C—Cu—Sn based sintered sliding material contains C of 1.5 to 15 t %, Cu of 10 to 40 wt % and Sn of 0.5 to 10 wt %. The mixed powder of Fe—C—Cu—Sn based sintered sliding material preferably contains graphite particle of 3 to 30% by volume and also contains one or more elements of Mo and BN aggregated and dispersed therein. The ferrous alloy powder contained in the mixed powder of Fe—C—Cu—Sn based sintered sliding material which forms a Fe—C based alloy particle in the ferrous sintered sliding material layer preferably contains Cu of a solid solubility or more and 2 wt % or more and carbon of 0.45 wt % or more. This can prevent a carburization reaction and a solution of the mixed graphite particle with Fe—C based alloy powder at the final sintering.

The graphite particle dispersed in the ferrous sintered sliding material layer preferably has an average grain size of 1 to 50 μm (more preferably 5 to 50 μm). It is also desirable to add graphite granulated into coarse powder (a grain size of 0.1 to 3 mm) to the mixed powder of ferrous sintered sliding material. However, when subjected to a mechanical reduction at the producing process, the coarse graphite is flattened to deteriorate strength of the sliding material remarkably. Accordingly, it is desirable to use fine graphite having an average grain size of 1 to 25 μm finer than the ferrous alloy powder in the mixed powder so as to prevent the flattening and also to aggregate and disperse the finer graphite powder at the final sintering.

In the ferrous sintered sliding material having pores or graphite particles dispersed therein, filling the pores with lubricating oil or lubricating compound (including grease) comprising lubricating oil and wax can improve seizing resistance and prolong a lubricating interval. In the present invention, in consideration of strength of the sintered body, a total content of the sintered pores and porous graphite particle is preferably set to 5% or more to 50% or less by volume. The lubricating compound is preferably adjusted such that a dropping point is 60° C. or higher, resulting in prolonging a lubricating interval.

A method for sinter-bonding the very hard ferrous sintered sliding material later to the back metal steel includes a method in which a cylindrical steel pipe or a cylindrical sintered body or compact and a compact which is made of sintered high-speed steel powder or sintered tool steel power and has an inner diameter substantially equal to or slightly shorter than an outer diameter of the cylindrical pipe or sintered body are prepared, the compact is inserted into the cylindrical pipe or sintered body and then sinter-bonded using change rate in dimension at the sintering; a method in which Cu alloy is infiltrated at the same time as the sintering (Japanese Patent Application No. S62-253702); and a method for sinter-bonding with applying pressure.

A producing method of the multilayer ferrous sintered sliding member in which the hard ferrous sintered sliding material layer is sinter-bonded to the back metal steel, the sintered sliding material comprising a Fe—C—Cu—Sn based sintered sliding material containing at least C of 0.4 to 5 wt %, Cu of 8 to 40 wt % (preferably 8 to 30 wt %) and Sn of 0.5 to 10 wt %, comprises steps of;

a step in which a mixed powder of ferrous alloy powder, Cu powder and at least either Sn powder or Cu alloy powder or a mixed powder of the former mixed powder and graphite powder, which constitute the Fe—C—Cu—Sn based sintered sliding material, is sinter-bonded to the back metal steel preliminarily, the step being repeated one or more times;

a step in which the preliminarily sintered layer is subjected to a mechanical reduction, the step being repeated one or more times;

a step in which the back metal steel to which the preliminarily sintered layer is sinter-bonded is bent into a roll and then finally sintered at a high temperature range (1000° C. or higher) higher than the temperature at the preliminary sintering bonding temperature resulting in formation of a liquid phase sintering structure comprising a solid phase state Fe—C based alloy particle containing C of 0.45 wt % or more, constituting the main body (65 to 98% by volume), and a liquid phase state Cu—Sn based alloy; and a step in which a rapid cooling is applied to quench harden the Fe—C based alloy particle.

The multilayer ferrous sintered sliding member is excellent in sintering ability and also hard thereby to have excellent abrasion resistance and seizing resistance. The above producing method makes it possible to supply a sliding member at a low price.

The reason in which the preliminarily sinter-bonded or preliminarily sintered ferrous sintered sliding material layer is subjected to a mechanical reduction is because the sintering is carried out at a low temperature range in which sufficient bonding ability of soft Cu, Cu—Sn alloy phase and ferrous alloy powder with the back metal steel can be obtained, without strengthen the bonding between the ferrous alloy powders or the ferrous alloy powder and the back metal steel. The mechanical reduction step carried out under a state in which workability can be shown is one feature of the present invention. In addition, the final sintering at the higher temperature range promotes a sintering ability between the ferrous alloy powders and a bonding ability between the ferrous alloy powder and the back metal steel. Accordingly, the ferrous sintered roll-formed bushing excellent in seizing resistance and abrasion resistance even under high bearing stress is produced.

In a method for producing a ferrous sintered roll-formed bushing, it is also possible that after applying the step for subjecting the ferrous sintered material layer to a mechanical reduction one or more time after the preliminary sintering step, a shirring, bending (roll bender) or press working is subjected. Or, it is also possible that both ends of a back metal steel bent into a roll are welded and then the final sintering is applied.

As the back metal steel, it is desirable to use one to the bonding surface of which an intermediate sintered material layer excellent in preliminary sintering ability, different from the Fe—C—Cu—Sn based sintering sliding material in composition, is preliminarily sinter-bonded.

For example, the preferable intermediate sintered material improving preliminary sintering ability includes a Cu—Sn based sintered material. The preferable intermediate sintered material layer improving preliminarily sintering ability and economical efficiency and also increasing an amount of retained oil includes a ferrous sintered material containing at least Cu of 10 to 40 wt %, Sn of 0.5 to 10 wt % and C of 0 to 0.8 wt %.

An addition amount of Cu and Sn is determined by considering sintering bonding ability of the back metal steel. An addition amount of C is preferably determined for the purpose of strengthening of the intermediate sintered material. However, at the preliminary sintering bonding, preliminary sintering and cooling after the final sintering, there is a problem in which coarse pro-eutectoid cementite is precipitated and thus cracking of the sintered layer at the rolling and peeling at the boundary face easily occur. In viewpoint of the problems, an upper limit of addition amount is set to 0.8 wt % at which a eutectoid structure is formed.

It is obvious that a method for sinter-bonding the Fe—Cu—Sn based sintered sliding material layer to the back metal steel via the ferrous sintered material layer not containing graphite particle dispersed therein can provide a bonding strength higher than a method for sinter-bonding the Fe—Cu—Sn based sintered sliding material layer containing graphite dispersed therein in a high concentration to the back metal steel directly because of the irregular interface between the Fe—Cu—Sn based sintered sliding material layer and the intermediate sintered layer.

The Cu—Sn based sintered material layer is incorporated in the ferrous sintered sliding material at the final sintering. The ferrous sintered material is adjusted such that the pores remain in 10 to 30% by volume of the material after the final sintering. And, by increasing an amount of lubricating oil or lubricating compound filled in the pores, a bushing of construction machine suitable for prolonging a lubricating interval is produced. In addition, this is effective in economical viewpoint because an amount of the expensive ferrous sintered material can be decreased.

In the ferrous sintered sliding material mixed powder, a liquid phase of Cu—Sn alloy is generated at the preliminary sintering at the low temperature range and reacts with a ferrous alloy to cause abnormal expansion phenomenon due to Kirkendall effect. Accordingly, in the present invention, in order to suppress the abnormal expansion phenomenon, the ferrous alloy powder for sintered sliding material is added with C of 0.45 wt % or more previously. This is one feature of the present invention. In addition, the preliminary sintering temperature is set to 1000° C. or lower, more preferably 950° C. or lower.

In order to improve seizing resistance and abrasion resistance of the ferrous sintered sliding material layer after the final sintering, a specific steel powder containing cementite and/or one or more carbides of $Cr_7C_3$, $M_6C$, MC and $M_2C$ type specific carbides finely precipitated and dispersed in the particle constitutes 50 to 100 wt % of the ferrous alloy powder. This is one feature of the present invention.

The ferrous alloy powder preferably contains a specific steel powder in an amount of 50 to 100 wt %. The specific steel powder preferably contains carbon of 0.45 wt % or more; one or more elements of Cr of 5 to 25 wt %, Mo of 3 to 20 wt %, W of 3 to 20 wt % and V of 0.5 to 7 wt %; and one or more carbides of cementite, $Cr_7C_3$, $M_6C$, MC and $M_2C$ type carbides precipitated and dispersed in an amount of 5 to 60% by volume. The specific carbide precipitated and dispersed in particle and grain boundary of the Fe—C based alloy phase is preferably formed into fine powder having an average grain size of 10 μm or less.

When the very fine specific carbide like the specific steel powder is previously precipitated and dispersed, the specific carbide does not rapidly grow and coarsen after the final sintering. Accordingly, it becomes easy to adjust a size of carbide in order to lower attack ability against the counterpart material. This is preferable feature of the present invention.

In order to suppress the abnormal expansion at the sintering and improve sintering ability at the preliminary sintering and final sintering, it is desirable that the ferrous alloy powder for the sintered sliding material is added with C of 0.45 wt % and Cu of a solid solubility or more and 2 wt % or more previously and the ferrous alloy powder preferably comprises a specific steel powder containing one or more carbides of cementite, $Cr_7C_3$, $M_6C$, MC and $M_2C$ type carbides finely precipitated and dispersed in the particle in an amount of 50 to 100 wt %.

When a ferrous alloy powder added with C and Cu previously is used, at the preliminary sintering and the final sintering at which the Cu—Sn alloy phase is completely formed into a liquid phase, the surface of the ferrous alloy powder is covered with the Cu—Sn alloy phase to prevent a reaction of solid lubricant powder such as the graphite, BN, Mo, W, ferroMo and Co—Mo, which is not reacted with the Cu—Sn alloy, with the ferrous alloy powder and the powder particle is aggregated and dispersed. Accordingly, in the present invention, the Fe—C—Cu—Sn based sintered sliding material mixed powder contains at least C of 1.5 to 15 wt %, Cu of 8 to 40 wt % (preferably 10 to 40 wt %) and Sn of 0.5 to 10 wt %. And, the Fe—C—Cu—Sn based sintered sliding material mixed powder comprises a mixed powder of a ferrous alloy powder containing C of 0.45 wt % or more and Cu of a solid solubility or more and 2 wt % or more to less than 40 wt %; graphite powder; and one or more powders of Cu powder, Sn powder and Cu alloy powder. The ferrous sintered sliding material layer is formed by liquid phase sintering the preliminary sintered phase at the final sintering step. The ferrous sintered sliding material layer has a structure comprising a ferrous alloy particle, and a Cu alloy phase, in which the structure contains blended graphite particle having an average grain size of 1 µm or larger to 50 µm or smaller aggregated and dispersed in 3 to 50% by volume (more preferably, 3 to 30% by volume).

When coarse graphite powder and BN are blended, they become deformed into a flat shape at the mechanical reduction resulting in significant deteriorating of strength of the ferrous sintered sliding material. Accordingly, in the present invention, an average grain size of the graphite powder is set to at least smaller than the ferrous alloy powder as 1 µm or larger to 20 µm or smaller to prevent the solid lubricant from forming into a flat shape. This is one feature of the present invention.

More particular method for producing ferrous sintered multilayer roll-formed bushing comprises steps of:

a first step in which a Fe—C—Cu—Sn based sintered sliding material mixed powder is dispersed on a back metal steel and then preliminarily sintered (for example, at 750 to 1000° C.) to form a preliminary sintered layer on the back metal steel;

a second step in which the preliminary sintered layer is subjected to a mechanical reduction (for example, rolling) and then preliminarily sintered (for example, at 750 to 1000° C.);

a third step in which the preliminary sintered layer and the back metal steel are bent into a roll-formed bushing, or, the preliminary sintered layer and the back metal steel are bent into a roll and then both end surfaces are weld into a roll-formed bushing;

a forth step in which the formed roll-shaped bushing is liquid phase sintered at higher temperatures (for example, 1000° C. or higher, more preferably 1050° C. or higher) higher than the preliminary sintering temperature to finally sinter the preliminary sintered layer and thus to form a ferrous sintered sliding material layer on the back metal steel; and a fifth step in which the ferrous sintered sliding material layer is rapidly cooled to quench harden the ferrous alloy phase in the ferrous sintered sliding material layer.

Another embodiment of more particular method for producing ferrous sintered multilayer roll-formed bushing comprises:

a first step in which a Fe—C—Cu—Sn based sintered sliding material mixed powder is formed into a disk-shaped or sheet-shaped compact, the compact is set on a back metal steel and then preliminarily sintered to form a preliminary sintered layer on the back metal steel;

a second step in which the preliminary sintered layer is subjected to a mechanical reduction (for example, rolling) and then preliminarily sintered (for example, at 750 to 1000° C.);

a third step in which the preliminary sintered layer and the back metal steel are bent into a roll-formed bushing, or, the preliminary sintered layer and the back metal steel are bent into a roll and then both end surfaces are weld into a roll-formed bushing;

a forth step in which the formed roll-formed bushing is liquid phase sintered at temperatures (for example, 1000° C. or higher, more preferably 1050° C. or higher) higher than the preliminary sintering temperature to finally sinter the preliminary sintered layer an thus to form a ferrous sintered sliding material layer on the back metal steel; and a fifth step in which the ferrous sintered sliding material layer is rapidly cooled to quench harden the ferrous alloy phase in the ferrous sintered sliding material layer.

Preferably, the method for ferrous sintered multilayer roll-formed bushing further comprises a step in which a fine Fe—C—Cu—Sn based sintered sliding material mixed powder of −#250 mesh or less is thinly dispersed on the surface of the preliminary sintered layer or the surface of the preliminary sintered layer is coated or covered with the fine Fe—C—Cu—Sn based sintered sliding material mixed powder of −#250 mesh or less between the first and second steps. At the first step in which the ferrous sintered sliding material mixed powder is dispersed on the back metal steel and then preliminarily sintered, it is difficult to form a uniform sliding surface depending on the dispersion condition. Accordingly, the surface of the sintered sliding material layer before subjecting to the mechanical reduction in the second step is thinly covered (dispersed or coated) with the fine Fe—C—Cu—Sn based sintered sliding material mixed powder of −#250 mesh or less having the same or similar composition of the sliding material layer to form a decorative surface layer and then the second, third and the following steps are applied. It is more desirable to use a fine ferrous alloy powder having a finer grain size than the ferrous sintered sliding material mixed powder and at least −#250 mesh or less. The decorative surface layer has a thickness of 0.3 mm or less.

The producing method may comprise further step in which the surface of the preliminary sintered layer is thinly dispersed or coated with a Cu alloy powder containing a soft Cu powder or Cu alloy powder containing at least Sn in an amount of 2 wt % or more between the first and second steps. By using the soft Cu or Cu alloy powder replaced by the ferrous sintered sliding material mixed powder, density variation and formation of notch-shaped grooves on the uppermost surface can be prevented. And, crack on the cutting surface due to shirring of the preliminary sintered steel can be also prevented.

Containing one or more elements of Sn, Si, Mn, Ni and P in a total amount of 2 to 30 wt % as the Cu alloy powder coating the surface thinly cay modify hardness, strength, sliding property and corrosion resistance of the Cu—Sn alloy layer in the ferrous sintered sliding material.

The producing method may further comprise a step in which the surface of the preliminary sintered layer is thinly dispersed, coated or covered with a solid lubricating powder containing one or more elements of Mo, W, graphite and $CaF_2$ or a Co—Mo alloy powder which improve an initial conformability of the ferrous sintered sliding material, between the first and second steps. As a material for the decorative surface layer, a Co—Mo alloy powder, a solid lubricating powder such as Mo, W, graphite and $CaF_2$ and a mixed powder of the powder and Cu alloy, which improves an initially conformability of the ferrous sintered sliding material, is preferably used.

The producing method may further comprise a step in which a mechanical reduction (for example, rolling) is subjected to the preliminary sintered layer to increase a density of the preliminary sintered layer between the second and third steps. And, at the bending process in the third step, it is also possible that at least one of roller bender and press bending machine is applied to increase a density of the preliminary sintered layer. In other words, it is desirable that after the second step, a step for subjecting to a mechanical reduction by rolling is added; at the third step in which a bending is carried out using roller bender and/or press bending machine, the preliminary sintered sliding material layer is worked so as to have a high density; and by the final sintering at the forth step and the rapid cooling at the fifth process, a high density ferrous sintered sliding material is sinter-bonded on the back metal steel.

In the added mechanical reduction step, it is preferable to reduce 30% or more, preferably 50% or more, of the thickness of the preliminary sintered sliding material layer.

It is desirable that after the bending or bending into a roll at the third step, the sintered sliding material layer on the inner surface of the roll-formed bushing in which both end surfaces are welded may be subjected to a sizing treatment or coining treatment to reduce the preliminary sintered sliding material layer mechanically and then the final sintering at the forth step and the rapid cooling at the fifth step are applied.

It is also desirable to combine the mechanical reduction step by rolling with the sizing treatment. The sizing treatment leads to improvement in roundness of the roll-formed bushing. So, the sizing treatment is a preferable way capable of facilitating finish machining of the roll-formed bushing.

At the mechanical reduction, it is possible that excessive reduction is applied to generate fine cracks on the ferrous sintered sliding material layer and then the sintered sliding material is more densified at the final sintering to open the cracks and thus to form oil grooves and oil holes.

When the ferrous sintered sliding material is densified, oil grooves and oil holes suitable for oil lubrication are preferably formed on the sliding surface. Therefore, in the ferrous sintered multilayer roll-formed bushing according to the present invention, it is desirable that a mechanical working is applied before the rapid cooling at the fifth step, preferably before the final sintering at the forth step. In the present invention, it is also possible that excessive reduction is applied to form fine cracks on the sintered skidding material layer at the mechanical reduction (rolling and press) process and then the final sintering at the forth step is applied to grow the cracks into grooves which are used as oil grooves and oil holes.

As a mechanical reduction method for forming cracks on the preliminary sintered sliding layer, a rolling is preferable. In this case, fine cracks are formed extending in a direction substantially perpendicular to the rolling direction. In a case of roll-formed bushing, the cracks are formed into a wavelike shape extending in a direction substantially perpendicular to the sliding direction. This is preferable for oil grooves and oil holes.

The sliding surface to which the crack grooves are formed is preferably subjected to a barreling work to smooth the edge of the oil grooves and oil holes.

When it is required to retain a large amount of lubricant agent on the sliding surface in order to prolong a lubricating interval, oil grooves or oil holes are preferably formed on 30 to 70% by area of the preliminary sintered layer after the preliminarily sintering step and before the final sintering step.

However, in such case, a mechanical working for forming the oil grooves and oil holes with a large area ratio causes economic problem. Accordingly, in the present invention, the Fe—C—Cu—Sn based sintered sliding material mixed powder which is preliminarily sintered on the back metal steel is preferably dispersed in a plural of islands form. Or, disk-shaped compacts made of the mixed powder are preferably arranged in 30 to 70% by area of the back metal steel. This is one feature of the present invention.

The Fe—C—Cu—Sn based sintered sliding material mixed powder which is preliminarily sintered on the back metal steel is preferably formed with oil holes or oil grooves. In the Fe—C—Cu—Sn based sintered sliding material mixed powder layer, the compacts are dispersed or arranged so as to form oil holes or oil grooves.

The ferrous sintered multilayer roll-formed bushing formed with above described various oil grooves and oil holes sometimes requires load bearing resistance against a high bearing stress. Accordingly, the ferrous sintered sliding material layer is preferably densified to have a porosity of 10% by volume or less.

The recesses, oil holes and oil grooves formed by dispersing the Fe—C—Cu—Sn based sintered sliding material mixed powder on the back metal steel in a plural of islands form or by arranging the disk-shaped compacts on the back metal steel and then sintering bonding may be filled with plastic material and/or solid lubricant material.

In the step for preliminary sintering bonding to the back metal steel and preliminary sintering, when a preliminary sintering temperature is high, the specific steel particle containing a large amount of the alloy elements is quench hardened at the cooling process. Accordingly, the preliminary sintering temperature is preferably adjusted to a range of 750 to 1000° C., more preferably 750 to 950° C. The lowest temperature is such set that the Cu—Sn alloy phase generates liquid phase and the preliminary sintering ability begins to be exhibited.

In the step for preliminary sintering bonding to the back metal steel, it is desirable to cool slowly after the preliminary sintering such that the ferrous alloy powder containing carbon is not hardened. For example, the slow cooling means includes a furnace cooling down to at least 500 to 700° C. and a method for cooling while passing a furnace adjusted in temperature to the above temperature range.

In the final sintering step, when the liquid phase sintering temperature is 1000° C. or higher, a strong bonded structure with the back metal steel begins to be exhibited. In order to improve strength of the ferrous sintered sliding material and bonding strength with the back metal steel, the final sintering temperature is preferably set to 1050° C. or higher.

The specific steel powder in the Fe—C—Cu—Sn based sintered sliding material mixed powder for forming ferrous alloy particle preferably contains C of 0.45 to 5 wt %; and also one or more elements of Cr of 5 to 25 wt %, Mo of 3 to 20 wt %, W of 3 to 20 wt % and V of 0.5 to 7 wt %.

In the ferrous sintered sliding material, the mixed powder contains carbon (graphite) of 0.1 to 3 wt % to prevent formation of coarse bubbles at the final sintering and also to improve sintering ability of the ferrous sintered body at the final sintering.

In the ferrous sintered sliding material, principle powder or alloy powder of one or more elements of P of 0.1 to 1.5 wt %, B of 0.05 to 1.0 wt %, Si of 0.5 to 3 wt %, Mn of 1 to 20 wt %, Ti of 0.1 to 5 wt % and Mo of 0.1 to 10 wt %, which improve sintering ability of the ferrous sintered sliding material layer (ferrous sintered body) at the liquid phase sintering (final sintering) at the high temperature range is preferably added.

In the quench hardened martensite structure in the ferrous alloy particle, when the uppermost surface is tempered by friction heat generated on the sliding surface, the uppermost surface is softened and also tensile residual stress is generated resulting in generation of heat crack and deterioration of seizing resistance. Accordingly, in the present invention, a tempering treatment at 300° C. or higher is preferably subjected. And, the ferrous sintered sliding material layer after the tempering treatment preferably has a hardness of Hv550 or more.

When the ferrous alloy particle comprises the specific steel powder, remarkable retained austenite exists and thus seizing resistance and abrasion resistance of the ferrous sintered sliding material layer may be deteriorated. Accordingly, referring to a tempering treatment of a high-speed steel, the tempering treatment is preferably carried out such that retained austenite phase is contained in 10% by volume of the matrix phase of the ferrous alloy particle.

Examples of the tempering treatment of the high-speed steel include a tempering treatment at 550° C. for several times, a tempering treatment at 350° C. and tempering treatment at 550° C., and a subzero cooling and tempering treatment at 550° C. In the present invention, these treatments may be carried out.

The back metal steel is selected so as not to be quench hardened by the rapid cooling treatment. In order to have sufficient press force and pull-out force required for a bushing of construction machine, the back metal steel preferably contains carbon of 0.35 wt % or more so as to have Vickers' hardness of Hv250 to 400.

The Ferrous alloy powder preferably contains one or more elements of C, Si, Al, Mn, Cr, Mo, V, W, Co, Sn, Ca, Pb, S, P, N, B, Nb, Ti and Zr in order to obtain hardening ability for hardening by the rapid cooling and temper softening resistance.

The Cu—Sn alloy phase in the ferrous sintered sliding material layer contains one or more elements of Al, Ti, Mn, Ni, Si, Sb, Bi, Ag, Mg and Ca in addition of Sn.

The ferrous sintered multilayer roll-formed bushing is formed with a collar.

The ferrous sintered sliding material layer has sintered pores and porous graphite. A total content of the sintered pores and pores graphite is 5 to 50% by volume. The sintered pores and porous graphite are filled with lubricating oil and lubricating compound. The lubricating oil and lubricating compound are filled by a conventionally used method such as a vacuum filling method. The lubricating compound preferably has a dropping point of 60° C. or less.

(Coupling Device of Construction Machine)

Hereinafter, a preferred embodiment of a connecting device according to the present invention will be described in detail with reference to the drawings.

FIGS. 30A, 30B, 30C and 30D are sectional drawings showing a coupling device of a construction machine according to one embodiment of the present invention.

The coupling device for coupling an arm body to a bucket of a hydraulic shovel shown in FIG. 30A, which is a typical coupling device of construction machine according to the embodiment, is provided with a bushing 1 pressed into the arm body 8 and a cylindrical pin 4 penetrating the inner pores of the bushing 1 and the pore of a bucket frame 2. A steel plate 3 is formed with one end of the pin 4 to prevent the pin 4 from falling. The pin 4 is fixed to the bucket frame 2 by a ring 5 and a bolt 6. When the bucket is operated, the pin 4 rotates with the bucket and slides to the bushing 1. Between the bushing 1 and the pin 4, a metal sliding material 7 having a structure capable of retaining oil and/or lubricant such as grease is arranged. By focusing seizing and abnormal abrasion at the operation on the metal sliding material 7, maintenance ability can be improved. As the metal sliding material 7, the above-described ferrous sintered sliding material layer is used.

By fine sliding caused by slight defection of the pin 4 fixed to the bucket frame 2, abnormal noise is generated from between the bucket frame 2 and the pin 4. In order to suppress the abnormal noise, as shown in FIG. 30B, a bushing 9 and a metal sliding material 10 are preferably arranged on the bucket frame 2. As the metal sliding material 10, the above described ferrous sintered sliding material layer is used.

In order to improve seizing resistance and abnormal abrasion due to local seizing as much as possible, materials of the bushing 1 and/or a sliding surface between the bushing 1 and the pin 4 comprise a metal porous sintered sliding material containing pores in 5 to 30% by volume and a quench hardened steel having a hardness of HRC 45 or more. And, the pores of the metal porous sintered sliding material are filled with lubricating oil. FIG. 30C shows an embodiment in which the inner surface of the bushing 1 is formed with grooves to which the metal sliding material 7 is integrated; and FIG. 3D shows an embodiment in which the outer surface of the bushing 1 is formed with grooves to which the metal sliding material 7 is integrated. In FIG. 30C, a seal device is shown with a reference number 11.

As shown in FIG. 31A, the pin 4 and bushing 1 are integrated by rings 15 and 16 via a seal device 13 or the seal device 13 and a thrust ring 14 to facilitate attachment and detachment to and from the main body. And, in order to change a loaded surface of the metal sliding material 7 after extended use, a mechanism in which a bushing fixing pin 12 is loosed or detached to rotate the bushing 1 while the coupling device integrated with the main body may be provided and/or another mechanism in which the ring 5 and bolt 6 are loosed or detached to rotate the pin 4 may be provided.

As shown in FIG. 31B, when the bracket portion couples the divided arm body 8 and bucket frame 2, the bushing 1 is attached to each of the divided portions of the bracket portion via the seal device 13 or the seal device 13 and the thrust ring 14, and integrated with the pin 4 by the rings 15 and 16 via the ring 30. This makes the bracket portion including the bush 1 compact and facilitates the attachment and detachment. And, in order to change a loaded surface of the metal sliding material 7 after extended use, mechanism in which a bushing fixing pin 12 is loosed or detached to rotate the bushing 1 while the coupling device integrated with the main body may be provided and/or another mechanism in which the ring 5 and bolt 6 are loosed or detached to rotate the pin 4 may be provided.

Embodiments of Method for Producing a Ferrous Sintered Multilayer Sliding Roll-Formed Bushing Hereinafter, a preferred embodiment of the method for producing a ferrous sintered multilayer sliding roll-formed bushing according to the present invention will be described in detail with reference to the drawings.

FIGS. 32A to 32H are drawings schematically showing the methods for producing various ferrous sintered multilayer roll-formed sliding bushings.

Figure 32:
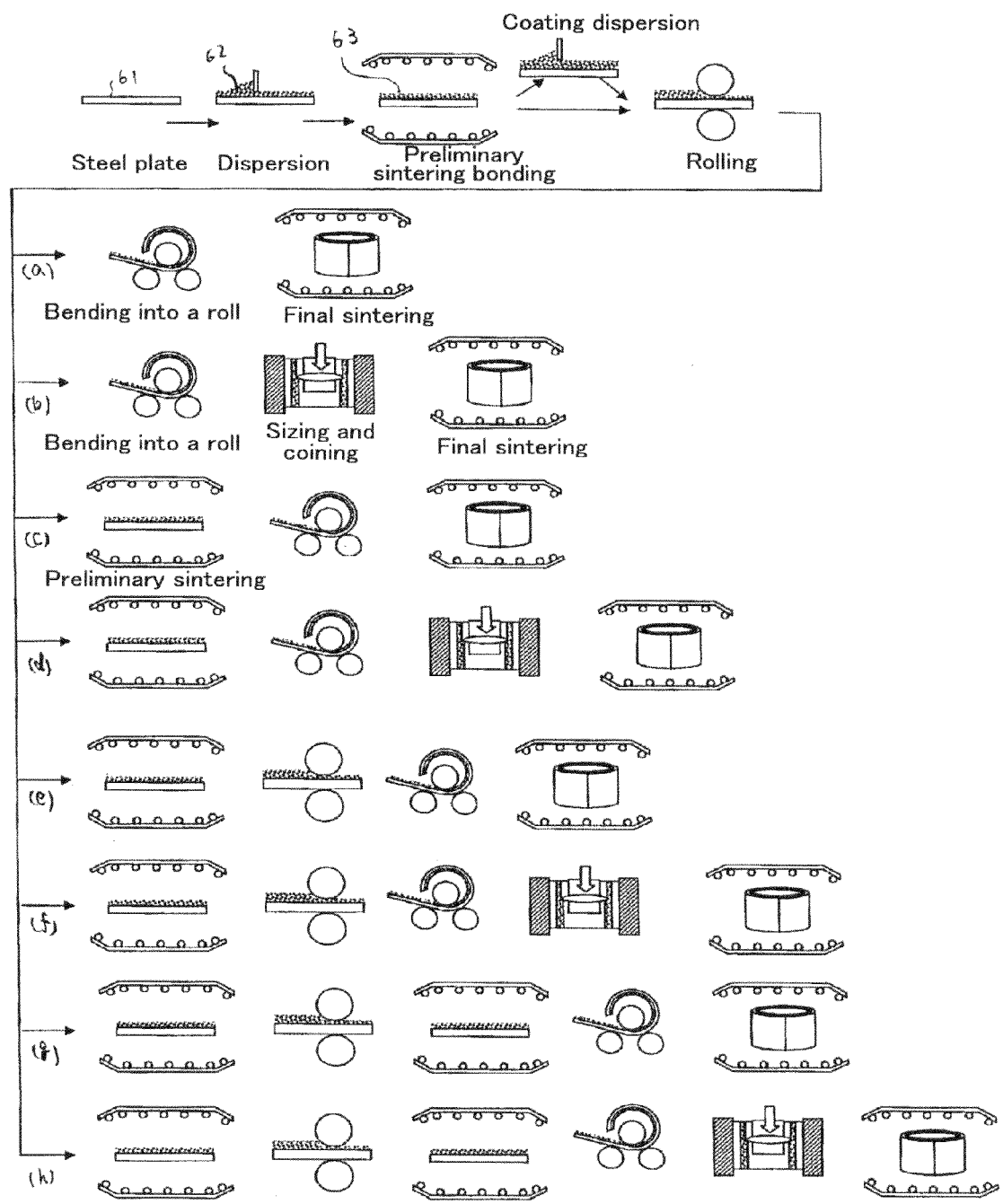
FIGS. 32A to 32H are drawing schematically showing a producing method of various ferrous sintered multilayer roll-formed bushings.

In a method for producing a ferrous sintered multilayer roll-formed bushing shown in FIG. 32A, the Fe—C—Cu—Sn based sintered sliding material mixed powder 62 is dispersed on a back metal steel 61. Then, after preliminary sintering, a preliminary sintered layer 63 is rolled by a rolling machine, bent into a roll and then finally sintered to produce the product. Between the preliminary sintering bonding and the rolling, a coating diffusion may be carried out.

In methods for producing a ferrous sintered multilayer roll-formed bushing shown in FIG. 32B to 32H, the processes before the bending are the same as the method shown in FIG. 32A, and, accordingly, will not be described.

In a method for producing a ferrous sintered multilayer roll-formed bushing shown in FIG. 32B, the product is produced in the following order; rolling, bending into a roll, sizing, coining and final sintering.

In a method for producing a ferrous sintered multilayer roll-formed bushing shown in FIG. 32C, the product is produced in the following order; rolling, preliminary sintering gain, bending into a roll and final sintering.

In a method for producing a ferrous sintered multilayer roll-formed bushing shown in FIG. 32D, the product is produced in the following order; rolling, preliminary sintering again, bending into a roll, sizing, coining and final sintering.

In a method for producing a ferrous sintered multilayer roll-formed bushing shown in FIG. 32E, the product is produced in the following order; rolling, preliminary sintering again, secondary reduction by a rolling machine, bending into a roll and final sintering.

In a method for producing a ferrous sintered multilayer roll-formed bushing shown in FIG. 32F, the product is produced in the following order; rolling, preliminary sintering again, secondary reduction by a rolling machine, bending into a roll, sizing, coining and final sintering.

In a method for producing a ferrous sintered multilayer roll-formed bushing shown in FIG. 32G, the product is produced in the following order; rolling, preliminary sintering again, secondary reduction by a rolling machine, preliminary sintering again, bending into a roll and final sintering.

In a method for producing a ferrous sintered multilayer roll-formed bushing shown in FIG. 32H, the product is produced in the following order; rolling, preliminary sintering again, secondary reduction by a rolling machine, preliminary sintering again, bending into a roll, sizing, coining and final sintering.

Embodiments in Which Ferrous Sintered Sliding Material Layer is Sintered Bonded in a Plural of Islands Form As described above, the ferrous sintered sliding material layer may be sinter-bonded in 30 to 70% by area of the back metal steel in a several islands or protruded portions form. Embodiment in which the ferrous sintered sliding material is sinter-bonded on the back metal steel in a several islands form will be described.

The ferrous sintered multilayer roll-formed bushing has a structure in which several independent projecting portions composed of the ferrous sintered sliding material layer are sinter-bonded on the back metal steel to form recesses and the recesses are arranged in a row so that lubricating oil can flow uniformly on the sliding surface.

The ferrous sintered multilayer roll-formed bushing is produced in such a manner that a sheet having various shaped pores is lapped over the back metal steel and then the Fe—C—Cu—S based sintered sliding material mixed powder is dispersed on the sheet to fill the pores with the mixed powder, sinter-bonded in the aforesaid manner and then formed into a shape of roll-formed bushing.

Figure 33:
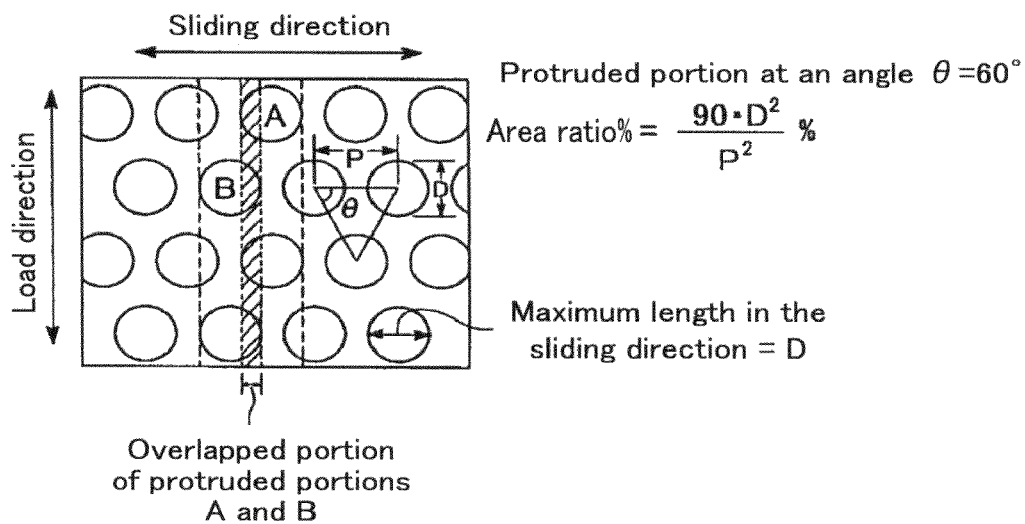
FIG. 33 is a drawing schematically showing a part of a ferrous sintered multilayer roll-formed bushing according to an embodiment of the present invention.

FIG. 33 is a drawing schematically showing a part of the ferrous sintered multilayer roll-formed bushing according to the embodiment of the present invention.

As the back metal steel used for the ferrous sintered multilayer roll-formed bushing, S45C steel plate 5 mm in thickness, 150 mm in width and 1000 mm in length is used. In order to form the projecting portions composed of the ferrous sintered sliding material layer, a stainless perforated metal sheet made of SUS304 4 mm in thickness is arranged on the steel plate and the Fe—C—Cu—Sn based sintered sliding material mixed powder is dispersed on the perforated metal sheet to fill the pores of the metal sheet therewith. As shown in FIG. 33, an area ratio of the pores is kept to 62.5% by area. For example, it is possible that the pore has various diameters of 5, 10, 15 and 20 mm and a distance between the pores is suitably adjusted (P=6, 12, 18 and 24 mm). Producing processes after the process in which Fe—C—Cu—Sn based sintered sliding material mixed powder is dispersed on the back metal steel are already described above.

Another Embodiment in Which Ferrous Sintered Sliding Material Layer is Sinter-Bonded in a Plural of Islands Form Next, another embodiment in which ferrous sintered sliding material layer is sinter-bonded in a plural of islands form will be described.

The ferrous sintered multilayer roll-formed bushing has a feature in which, in the ferrous sintered sliding material layer, a high density sintered layer and a low density sintered layer are alternately arranged to prevent leakage of oil retained in the ferrous sintered sliding material layer from the end surface of the ferrous sintered sliding material layer at not-sliding and sliding.

Figure 34:
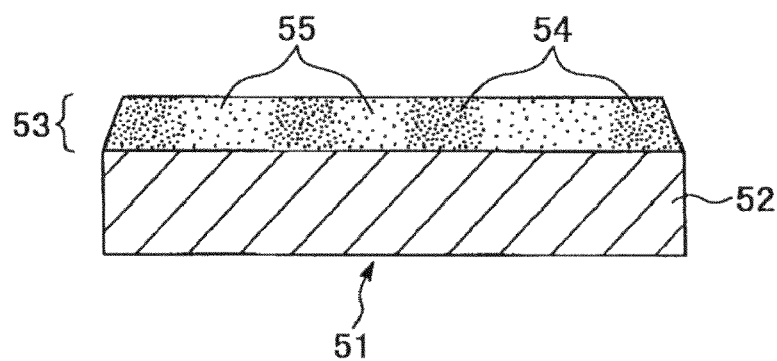
FIG. 34 is a sectional drawing schematically showing a part of a ferrous sintered multilayer roll-formed bushing according to an embodiment of the present invention.

FIG. 34 is a sectional drawing showing a part of the ferrous sintered multilayer roll-formed bushing according to the present invention.

The ferrous sintered multilayer roll-formed bushing 51 of this embodiment comprises a back metal steel 52 and a sliding lubricating layer 53 fixed on the upper surface of the back metal steel 52. The sliding lubricating layer 53 has stripe-shaped ferrous sintered sliding material layers 54 arranged in a number of parallel or cross stripes form, in which the stripe-shaped layers are formed by dispersing the ferrous sintered sliding material so as to have higher density at the end surface of the sliding portion and the inside of the sintered body, sintering and then rolling. The portion other than the stripe-shaped ferrous sintered sliding material layers 54 exists as porous state to form a porous oil retained layer 55 filled with oil containing gelling agent. The ferrous sintered sliding material layer 54 is produced by the aforesaid method.

As described, in the ferrous sintered multilayer roll-formed bushing 1, the ferrous sintered sliding material layer, which is a high density sintered body, is arranged at the end surface and the high density ferrous sintered sliding material layer is arranged at the inside in a network form so that the oil retained layer does not continue, resulting in preventing flowing of oil. Accordingly, when the ferrous sintered sliding material layer, which is a high density sintered body and forms a part of the end surface, breaks, that is, a wall for preventing flowing out of the oil from the end surface breaks, since the oil retained layers are independently dispersed in a plural of islands form, it is prevented the oil from flowing at the inside of the sintered body, resulting in small loss of oil.

Example

Hereinafter, a preferred embodiment of the multilayer ferrous sintered roll-formed bushing and the method for producing the same will be described in detail with reference to the drawings.

Example 1

(Experiment for Preliminary Sintering Ability of Various Ferrous Sintered Sliding Materials)

Three kinds of Cu alloy mixed powders shown in Table 1 were prepared. Ferrous sintered alloys having compositions shown in Table 3 were used in the embodiment. These sintered alloys were prepared in composition by using A300 (iron powder, manufactured by Kobe Steel, Ltd.), PX16 (high-speed steel powder Fe-1.1 wt % C-4 wt % Cr-5 wt % Mo-6 wt % W-2 wt % V, manufactured by Mitsubishi Steel Mfg. Co., Ltd.), KM15 (high Cr tool steel powder, Fe-0.45 wt % C-16 wt % Cr-3 wt % Mo-2 wt % V, manufactured by Mitsubishi Steel Mfg. Co., Ltd.), atomized copper powder of –#350 mesh or less (manufactured by FUKUDA METAL FOIL & POWDER CO., LTD.), atomized Cu-33 wt % Sn powder (manufactured by FUKUDA METAL FOIL & POWDER CO., LTD.), atomized Sn powder of –#250 mesh or less (manufactured by FUKUDA METAL FOIL & POWDER CO., LTD.) and graphite having an average grain size of 6 μm (KS6, manufactured by LONZA). These mixed powders were used to form into a test piece showing in FIG. 1 at a pressure of 5 ton/cm². Each test piece was vacuum sintered for 15 minutes at various temperatures within 770 to 1050° C. and then furnace cooled down to 600° C. After maintained at 600° C. for 30 minutes, each test piece was gas cooled under $N_2$ gas of 600 torr.

The reason for the furnace cooling from the sintering temperature to 600° C. is that when the sintering temperature becomes too high, the PX16 alloy and KM15 alloy are prevented from martensitic transformation and quench hardening due to the $N_2$ gas cooling from the sintering temperature and also prevented from remarkable expansion by the martensitic transformation.

TABLE 1

Composition of Cu—Sn based alloy mixed powder (wt %)

| Reference number | Cu | Cu33Sn | Sn |
|---|---|---|---|
| ① | Bal. | 12 | 4 |
| ② | Bal. | 18 | 6 |
| ③ | Bal. | 24 | 8 |

Each sintered test piece was examined in a change rate in dimension and Rockwell B hardness (HRB).

(1) Change Rate in Dimension and Sintering Ability

Figure 2:
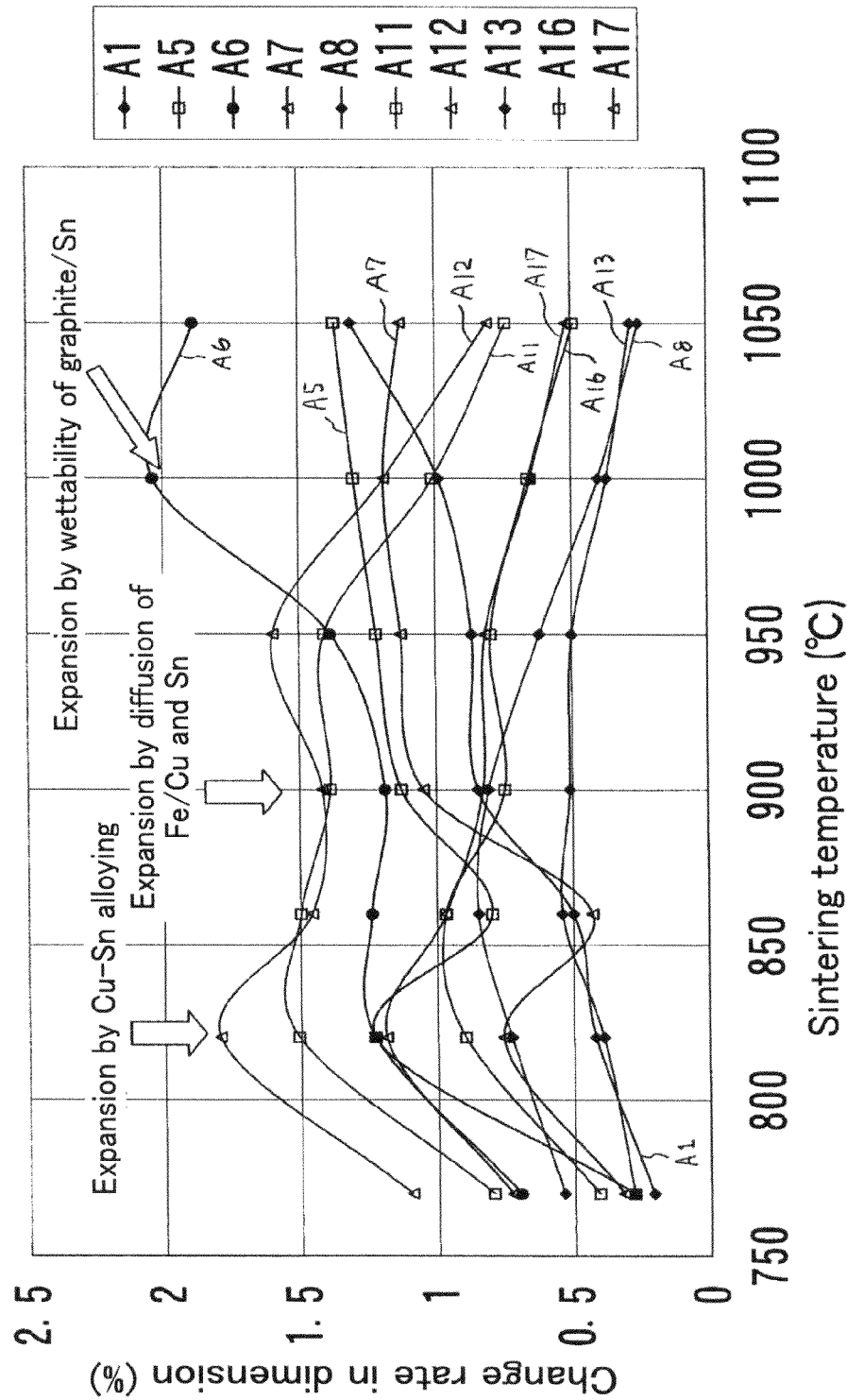
FIG. 2 is a graph showing a relation between a sintering temperature and a change rate in dimension of a Fe—Cu—Sn based sintered body.

FIG. 2 is a graph showing a relation between sintering temperatures of A1, A5 to A8, A11 to A13, A16 and A17 alloys shown in Table 2 to which the mixed powders containing changed content of Sn, shown in Table 1, are added in an amount of 28.5 wt % and change rates in dimension of the sintered bodies.

(a) In a case of sintering temperature of 860° C. or lower, all alloys show expansion associated with alloying of the Cu—Sn mixed powder.

(b) As an amount of Sn in the Cu—Sn mixed powder increases, the expansion amount becomes large and the sintered body becomes porous.

(C) In A1, A5 to A7 alloys using ferrous powder which does not contain carbon, the expansion associated with diffusion of liquid phase Cu—Sn alloy is maintained at a sintering temperature of 900° C. or higher. However, in A8, A11 to A13, A16, A17 alloys using PX16 and KM15 which contains carbon, as the sintering temperature rises 900° C. or higher, sintering ability is improved and the density is heightened.

(d) A6 alloy which uses ferrous powder not containing carbon and is blended with graphite (Gr) of 0.5 wt % shows remarkable expansion at a sintering temperature of 950° C. or higher. However, in a sintering temperature of 1000° C. or higher, all of the graphite forms a solid solution with the ferrous powder to improve sintering ability. The sintered body begins to be shrunk.

The results (a) to (d) shows that, in low sintering temperatures, excessive addition of Sn promotes expansion of the sintered body and makes the preliminary sintering and the mechanical reduction by rolling after the preliminary sintering difficult. Accordingly, referring to at least a relation in which an amount of Cu and Sn in the ferrous sintered body is less than Cu-16 wt % Sn, more preferably, a Cu—Sn binary phase diagram, it is desirable to satisfy a relation in which an amount of Cu is 13 wt % or less at which a large amount of brittle intermetallic compound is not precipitated at the cooling process after the preliminary sintering.

Figure 3:
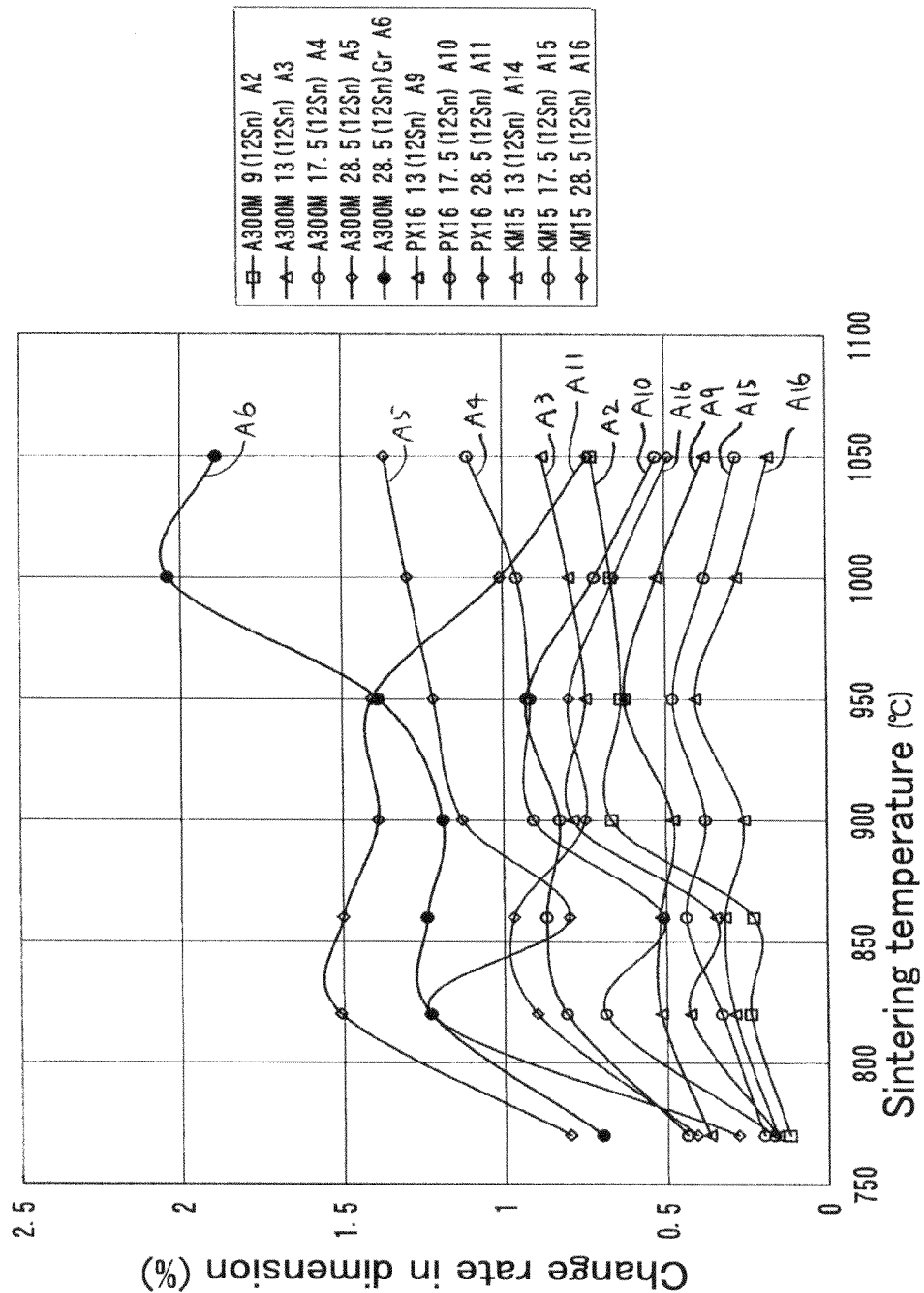
FIG. 3 is a graph showing a relation between a sintering temperature and a change rate in dimension of a Fe—Cu—Sn based sintered body.

FIG. 3 is a graph showing a change rate in dimension of each sintered body of A2 to A6, A9 to A11, A14 to A16 alloys prepared such that an addition amount of mixed powder of Cu-12 wt % Sn is adjusted to 9 to 28.5 wt %.

TABLE 2

Composition (wt %) and change rate in dimension (%) of Fe—Cu—Sn based sintered alloy mixed powder 5 ton/cm2

| No. | A300M | PX16 | KM15 | ① | ② | ③ | Other | Size of sintered body | 770° C. | 820° C. | 860° C. | 900° C. | 950° C. | 1000° C. | 1050° C. |
|---|---|---|---|---|---|---|---|---|---|---|---|---|---|---|---|
| A1 | Bal. | | | 28.5 | | | | 96.54 | 0.21 | 0.42 | 0.50 | 0.85 | 0.87 | 0.99 | 1.31 |
| A2 | Bal. | | | 9 | | | | 96.55 | 0.12 | 0.24 | 0.23 | 0.67 | 0.64 | 0.67 | 0.73 |
| A3 | Bal. | | | 13 | | | | 96.56 | 0.16 | 0.43 | 0.35 | 0.79 | 0.75 | 0.80 | 0.88 |
| A4 | Bal. | | | 17.5 | | | | 96.58 | 0.17 | 0.69 | 0.51 | 0.91 | 0.92 | 0.96 | 1.11 |
| A5 | Bal. | | | 28.5 | | | | 96.56 | 0.28 | 1.23 | 0.80 | 1.13 | 1.22 | 1.30 | 1.37 |
| A6 | Bal. | | | 28.5 | | | 0.5Gr | 96.57 | 0.70 | 1.23 | 1.24 | 1.19 | 1.39 | 2.04 | 1.89 |
| A7 | Bal. | | | | | 28.5 | | 96.56 | 0.32 | 0.76 | 0.43 | 1.05 | 1.13 | 1.19 | 1.13 |
| A8 | | Bal. | | 28.5 | | | | 96.66 | 0.54 | 0.73 | 0.85 | 0.81 | 0.62 | 0.40 | 0.25 |
| A9 | | Bal. | | 13 | | | | 96.64 | 0.37 | 0.52 | 0.52 | 0.48 | 0.63 | 0.53 | 0.38 |
| A10 | | Bal. | | 17.5 | | | | 96.65 | 0.44 | 0.81 | 0.87 | 0.83 | 0.93 | 0.72 | 0.53 |
| A11 | | Bal. | | 28.5 | | | | 96.66 | 0.80 | 1.51 | 1.50 | 1.39 | 1.41 | 1.01 | 0.74 |
| A12 | | Bal. | | | | 28.5 | | 96.66 | 1.10 | 1.80 | 1.46 | 1.42 | 1.60 | 1.19 | 0.81 |
| A13 | | | Bal. | 28.5 | | | | 96.7 | 0.28 | 0.39 | 0.54 | 0.51 | 0.50 | 0.37 | 0.28 |
| A14 | | | Bal. | 13 | | | | 96.69 | 0.16 | 0.29 | 0.32 | 0.26 | 0.41 | 0.28 | 0.18 |
| A15 | | | Bal. | 17.5 | | | | 96.71 | 0.20 | 0.38 | 0.44 | 0.38 | 0.48 | 0.38 | 0.28 |
| A16 | | | Bal. | 28.5 | | | | 96.7 | 0.41 | 0.90 | 0.97 | 0.75 | 0.80 | 0.66 | 0.49 |
| A17 | | | Bal. | | | 28.5 | | 96.67 | 0.73 | 1.19 | 0.97 | 0.83 | 0.82 | 0.65 | 0.52 |

From FIG. 3, the following is founded.

(e) As a blending quantity of the Cu—Sn mixed powder increases, the expansion becomes evident.

(f) The same results as the aforesaid (a) to (c) are obtained.

(2) Relation Between Sintering Temperatures and Hardness (HRB)

Figure 4:
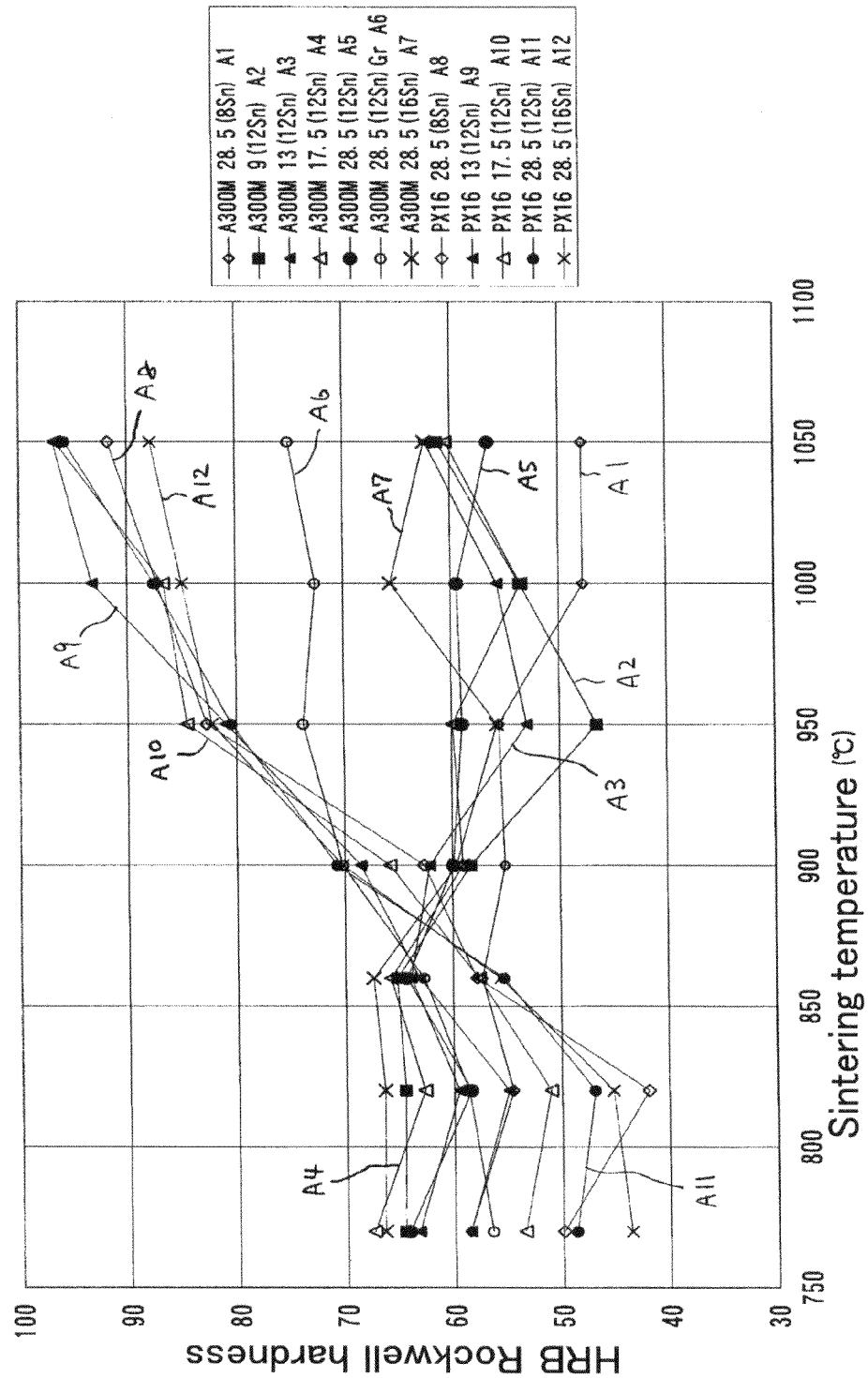
FIG. 4 is a graph showing a relation between a sintering temperature and a Rockwell B hardness of a Fe—Cu—Sn based sintered body.

FIG. 4 is a graph showing a relation between the hardness (Rockwell hardness HRB) of A1 to A12 alloys shown in Table 2 and sintering temperatures.

In A1 to A5 and A7 alloys mainly composed of iron powder A300M shown in Table 2, sintering at temperatures of 900° C. or higher lowers the hardness of the sintered bodies because of expansion of the sintered body. In A6 alloy added with graphite, by sintering at temperatures of 900° C. or higher, although the expansion of the sintered becomes large, the blended graphite begins to form a solid solution with the iron powder to increase the hardness of ferrous particle in the sintered body, resulting in giving strength.

In A8 to A12 alloys mainly composed of PX16 specific steel powder containing carbon previously, by sintering at temperatures of 850° C. or higher, the sintering ability is improved and hardness of the sintered body is rapidly increased so as to heighten the strength of the sintered body. However, sintering at temperatures of 850° C. or lower causes remarkable expansion, as shown in FIGS. 2 and 3, whereby the sintered body has hardness (strength) lower than that of A1 to A7 alloys.

Figure 5:
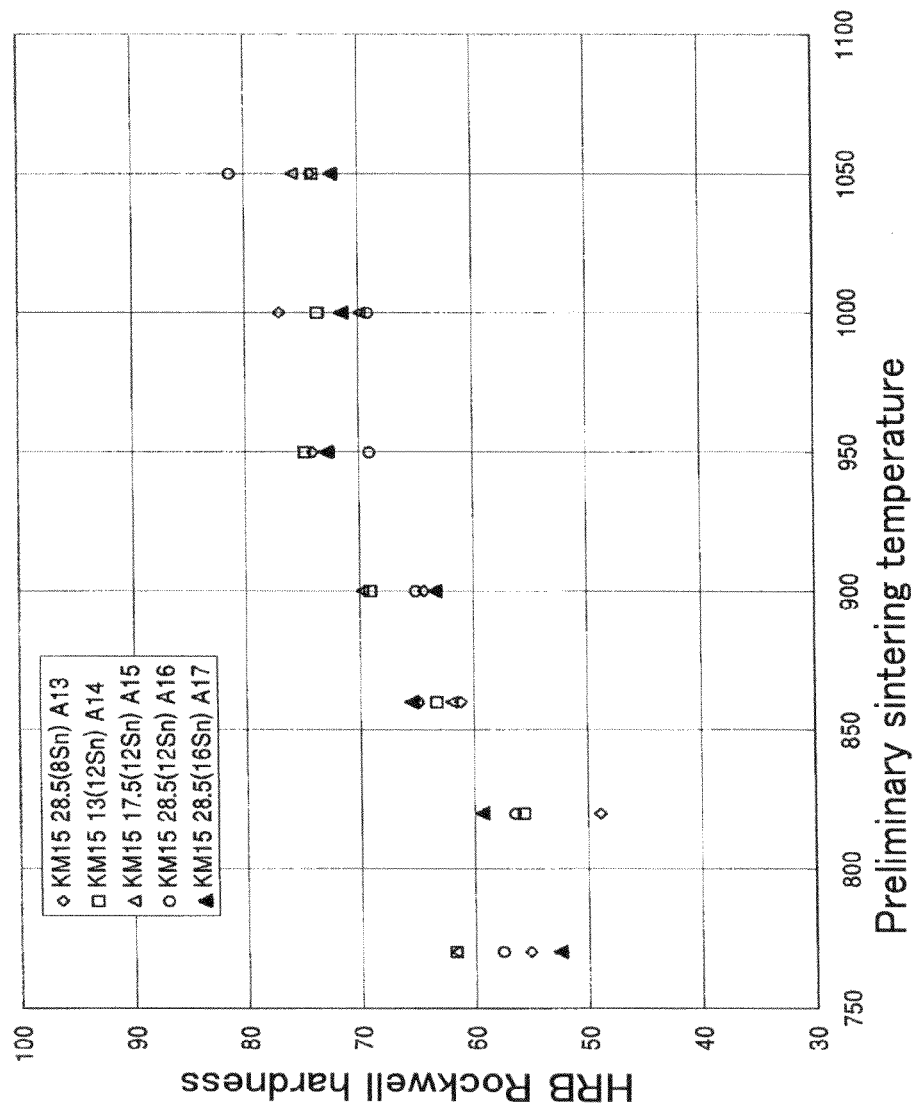
FIG. 5 is a graph showing a relation between a preliminary sintering temperatures and a Rockwell B hardness of a Fe—Cu—Sn based sintered body.

FIG. 5 is a graph showing a relation between hardness (Rockwell hardness HRB) of each sintered body of A13 to A17 alloys mainly composed of KM15 specific steel containing carbon previously and sintering temperatures.

They show the same pattern as the A8 to A12 alloys. Especially, they are superior in sintering ability at temperatures of 850° C. or lower to the A8 to A12 alloys.

Example 2

(Experiment for Final Sintering Ability of Various Ferrous Sintered Sliding Materials)

Tables 3-1 and 3-2 show compositions of mixed powders for ferrous sintered sliding material alloys used in the example.

Theses sliding material were prepared were prepared in composition by using ASC300 (iron powder, manufactured by Hoganas), M2 (high-speed steel powder, Fe-0.8 wt % C-4 wt % Cr-5 wt % Mo-6 wt % W-2 wt % V, manufactured by Mitsubishi Steel Mfg. Co., Ltd.), SUS440C (Fe-1.1 wt % C-17 wt % Cr, manufactured by NIPPPON ATOMIZED METAL POWDER CORRPORATION), electrolytic copper powder (CE25, manufactured by FUKUDA METAL FOIL & POWDER Co., Ltd.), TiH of –#350 mesh or smaller, electrolytic Mn, Ni, phosphor iron (25 wt % P), Mo having an average grain size of 5 μm, Fe-16 wt % Al-25 wt % Cu of #200 mesh or smaller and Fe-16 wt % Al, in addition to the powders used in Example 1. These mixed powders were formed into the test piece at a pressure of 5 ton/cm². Each test piece was vacuum sintered for one hour at various temperatures within 1000 to 1200° C. and then cooled down under N₂ gas of 600 torr. Then, each test piece was measured in a change rate in dimension to examine sintering ability of each alloy.

TABLE 3-1

Composition of ferrous sintered alloy mixed powder used in Example 2 (wt %)

| No. | Fe (ASC300) | Fe16Al | Fe16Al25Cu | M2 | SUS440C | Fe50Al | 0.9C / 1.0C C (KS6) | Cu | 1~25 μm Other1 |
|---|---|---|---|---|---|---|---|---|---|
| B1 | 100 | | | | | | | | |
| B2 | Bal. | | | | | | | 5 | |
| B3 | Bal. | | | | | | | 10 | |
| B4 | Bal. | | | | | | | 20 | |
| B5 | Bal. | | | | | | | 30 | |
| B6 | Bal. | | | | | | 0.6 | 30 | |
| B7 | Bal. | | | | | | 1.2 | 30 | |
| B8 | Bal. | | | | | | | 30 | 2Sn |
| B9 | | 100 | | | | | | | |
| B10 | | Bal. | | | | | | 25 | |
| B11 | | | 100 | | | | | | |
| B12 | | | 100 | | | | | 5 | |
| B13 | | | 100 | | | | | 10 | |
| B14 | | | Bal. | | | | | 15 | |
| B15 | | | 90 | | | | | 10 | 10Mo |
| B16 | | | 90 | | | | | 10 | 5Mo5Ni |
| B17 | | | 97 | | | | | 10 | 3TiH |
| B18 | | | 97 | | | | | 10 | 3Mn |
| B19 | | | 97 | | | | | 10 | 3Sn |
| B20 | | | Bal. | | | | 1.2 | 15 | |
| B14 | | | Bal. | | | | | 15 | |
| B20 | | | | 85 | | | 1.2 | 15 | |
| B21 | | | | 85 | | | 2 | 15 | |
| B22 | | | | 85 | | | 3 | 15 | |
| B23 | | | | 85 | | | 4 | 15 | |
| B24 | | | | 85 | | | 5 | 15 | |
| B25 | | | | 85 | | | 6 | 15 | |
| B26 | | | | 85 | | | 7 | 15 | |
| B27 | | | | 85 | | | 9 | 15 | |

TABLE 3-2

|     |         |           | 0.9C | 1.0C    |        | 1~25 μm |     |          |
|-----|---------|-----------|------|---------|--------|---------|-----|----------|
| No. | ASC300  | Fe16Al25Cu| M2FP | SUS440C | Fe50Al | C (KS6) | Cu  | Other    |
| B28 |         | Bal.      |      |         |        | 0       | 25  |          |
| B29 |         | Bal.      |      |         |        | 0       | 25  | 2FeP     |
| B30 |         | Bal.      |      |         |        | 0       | 25  | 3Sn      |
| B31 |         | Bal.      |      |         |        | 1.2     | 25  | 3Sn      |
| B32 |         | Bal.      |      |         |        | 0       | 25  | 2TiH     |
| B33 |         | Bal.      |      |         |        | 1.2     | 25  | 2TiH     |
| B34 |         | Bal.      |      |         |        | 0       | 25  | 5Mo      |
| B35 |         | Bal.      |      |         |        | 0       | 25  | 3Sn5Mo   |
| B36 |         | Bal.      |      |         |        | 0       | 25  | 2Si      |
| B37 |         | Bal.      |      |         |        | 1.2     | 25  | 2Si      |
| B38 |         | Bal.      |      |         |        | 0       | 25  | 10Mn, 2Fe|
| B39 |         | Bal.      |      |         | 10     | 0       | 25  | 2FeP     |
| B40 |         | Bal.      |      |         | 10     | 0       | 25  | 10Mn, 2Fe|
| B41 |         |           |      | Bal.    |        | 0       | 25  |          |
| B42 |         |           |      | Bal.    |        | 0       | 25  | 2FeP     |
| B43 |         |           |      | Bal.    |        | 0       | 25  | 3Sn      |
| B44 |         |           |      | Bal.    |        | 1.2     | 25  | 3Sn      |
| B45 |         |           |      | Bal.    |        | 0       | 25  | 2TiH     |
| B46 |         |           |      | Bal.    |        | 1.2     | 25  | 2TiH     |
| B47 |         |           |      | Bal.    |        | 0       | 25  | 5Mo      |
| B48 |         |           |      | Bal.    |        | 0       | 25  | 3Sn5Mo   |
| B49 |         |           |      | Bal.    |        | 0       | 25  | 2Si      |
| B50 |         |           |      | Bal.    |        | 1.2     | 25  | 2Si      |
| B51 |         |           |      | Bal.    |        | 0       | 25  | 10Mn     |
| B52 |         |           |      | Bal.    | 10     | 0       | 25  |          |
| B53 |         |           |      | Bal.    | 10     | 0       | 25  | 10Mn     |
| B54 | Bal.    |           | 15   |         |        | 0       | 25  |          |
| B55 | Bal.    |           | 15   |         |        | 0.6     | 25  |          |
| B56 | Bal.    |           | 15   |         |        | 1.2     | 25  |          |
| B57 | Bal.    |           |      | 15      |        | 1.2     | 25  |          |
| B58 |         | Bal.      | 15   |         |        | 0       | 15  |          |
| B59 |         | Bal.      | 15   |         |        | 1.2     | 15  |          |
| B60 |         | Bal.      | 30   |         |        | 0       | 20  |          |
| B61 |         | Bal.      | 60   |         |        | 0       | 20  |          |
| B62 |         | Bal.      |      | 15      |        | 0       | 15  |          |
| B63 |         | Bal.      |      | 15      |        | 1.2     | 15  |          |
| B64 |         | Bal.      |      | 30      |        | 0       | 20  |          |
| B65 |         | Bal.      |      | 60      |        | 0       | 20  |          |

Figure 6:
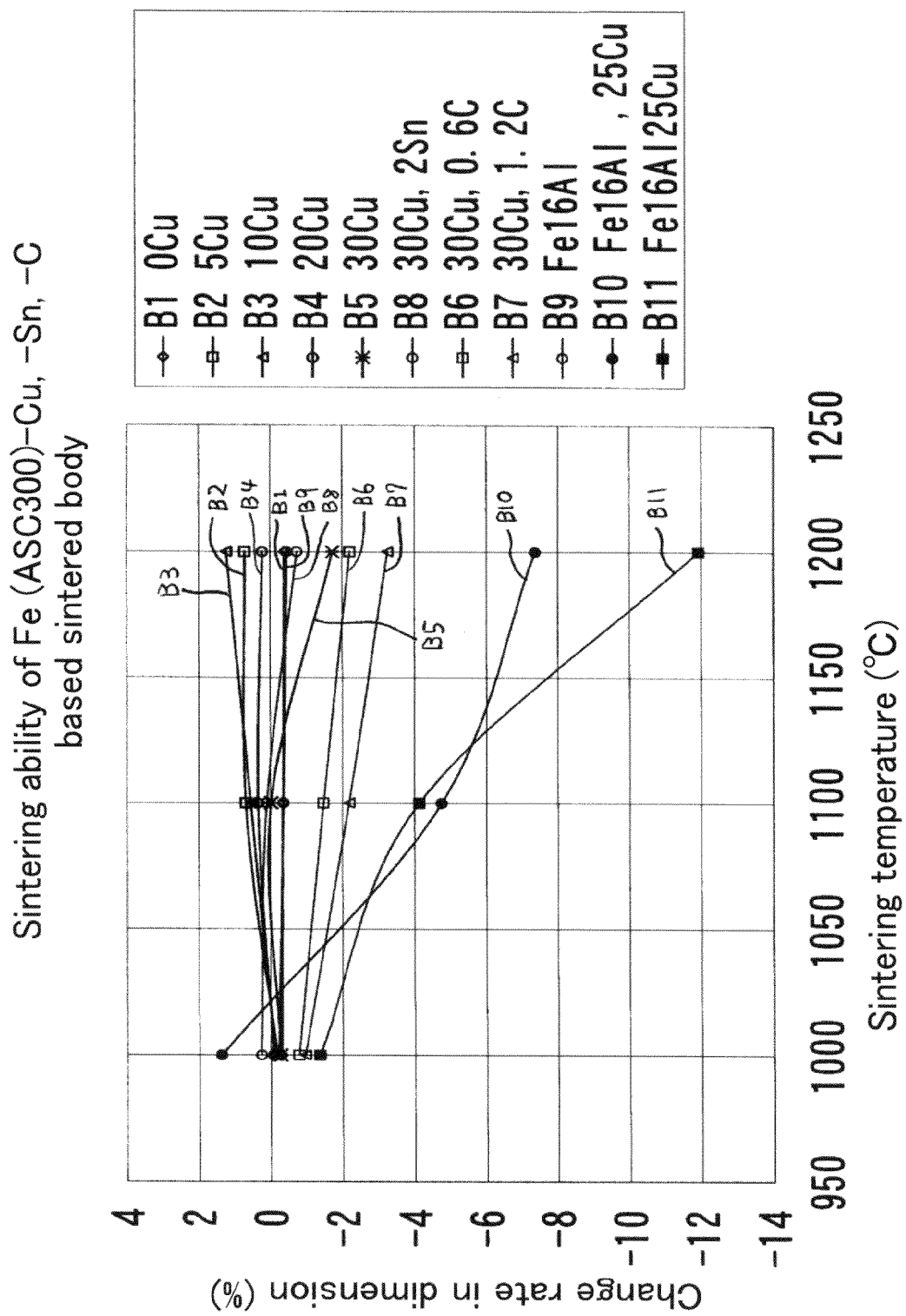
FIG. 6 is a graph showing a relation between a sintering temperature and a change rate in dimension of a Fe(ASC300)-Cu, —Sn or —C based sintered body.

FIG. 6 is a graph showing a relation between sintering temperatures and change rates in dimension of B1 to B11 alloys.

The graph shows that B1 to B5 Fe—Cu based alloys expand remarkably at 1100° C. higher than 1086° C. at which Cu is transformed into liquid phase and are not densified sufficiently even at 1200° C.

By comparison of B5 alloy with B8 alloy in a change rate in dimension, it is shown that an addition of Sn of 2 wt % generates Cu liquid phase from low sintering temperatures and expansibility of the sintered body is increased.

By comparison of B5 alloy with B6 and B7 alloys in a change rate in dimension, it is shown that an addition of carbon suppresses expansion at 1100° C. at which expansion of B1 to B5 alloys is observed, and increased addition amount of carbon improves sintering ability rapidly and densifies the sintered body.

It is also shown that although B9 alloy (Fe-16 wt % Al alloy powder) shows the same change rate in dimension as B1 iron powder, a change rate in dimension of the alloy (B10) which is B9 alloy added with Cu powder of 25 wt % shows more promoted sintering ability by a high-temperature sintering at 1000° C. or higher than either B4 alloy or B5 alloy for example.

It is also shown that Fe-16 wt % Al-25 wt % Cu alloy powder (B11) containing Cu of 25 wt % larger than a solid solubility limit (about 20 wt %) of Cu with Fe-16 wt % Al does not show expansion phenomenon at 1000° C., the sintering ability is improved and density of the sintered body is heightened.

Figure 7:
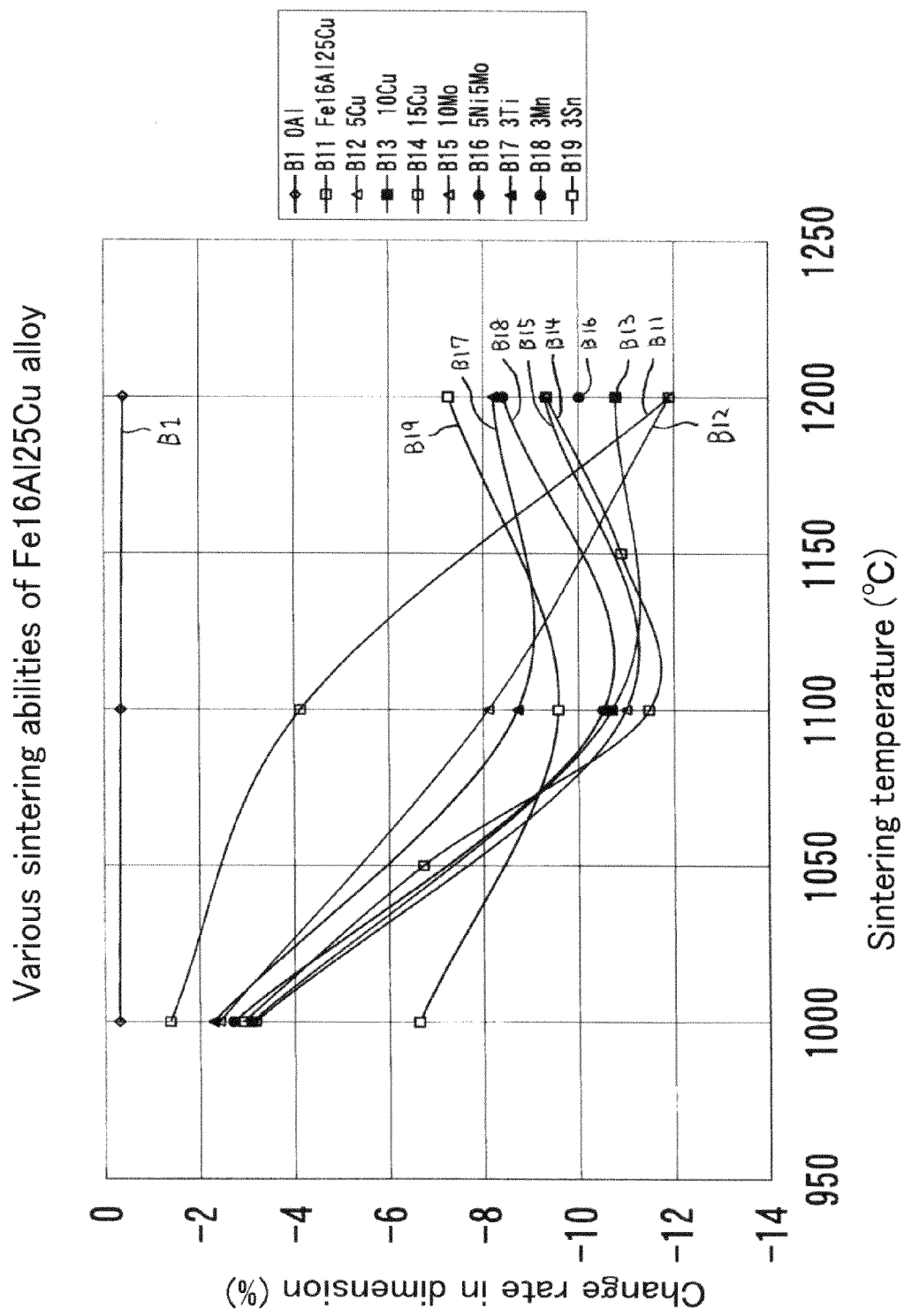
FIG. 7 is a graph showing a relation between a sintering temperature and a change rate in dimension of a Fe16Al25Cu alloy.

FIG. 7 is a graph showing a change rate in dimension of B11 to B19 alloys shown in Table 3-1 after sintering.

By comparison of B11 to B14 alloys, it is shown that an addition of Cu powder to Fe-16 wt % Al-25 wt % Cu alloy promotes sintering ability at 1150° C. or lower; on the contrary, an addition of Cu of 5 wt % or more causes over sintering at temperatures of 1200° C. or higher, resulting in low sintering density.

By comparison of B13 alloy with B15 to B19 alloys in a change rate in dimension, it is shown that addition of each Mo, multiple Ni—Mo, Ti and Mn does not inhibit remarkable sintering ability and an addition of Sn causes promotion of sintering ability from lower temperatures. So, Sn is used as an effective element for lowering sintering temperature.

Figure 8:
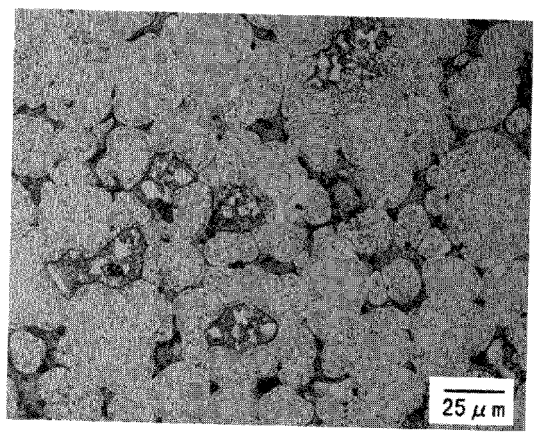
FIG. 8 is a photograph showing a sintered structure of B15 alloy shown in Table 3-1 sintered at 1200° C.
Figure 9:
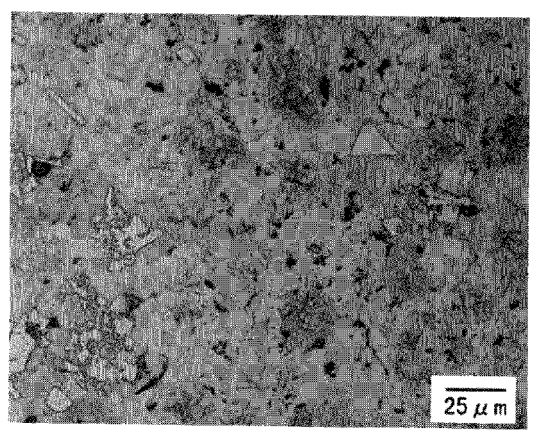
FIG. 9 is a photograph showing a sintered structure of B16 alloy shown in Table 3-1 sintered at 1200° C.

FIGS. 8 and 9 are photographs showing structures of B15 and B16 alloys sintered at 1200° C. respectively.

The photographs shows that Mo which hardly reacts with Cu alloy liquid phase generated at sintering is dispersed as Mo phase and, in a case of a multiple addition of Ni—Mo, Ni and Mo are preferentially alloyed to be dispersed as a Ni—Mo based intermetallic compound. Accordingly, in a ferrous sintered sliding material in which a ferrous alloy powder containing Cu in an amount of a solid solubility limit or more is blended with Mo, Mo is effectively used as a solid lubricant. A multiple addition such as Ni—Mo can disperse a Mo based intermetallic compound which is expected to improve seizing resistance and abrasion resistance.

Figure 10:
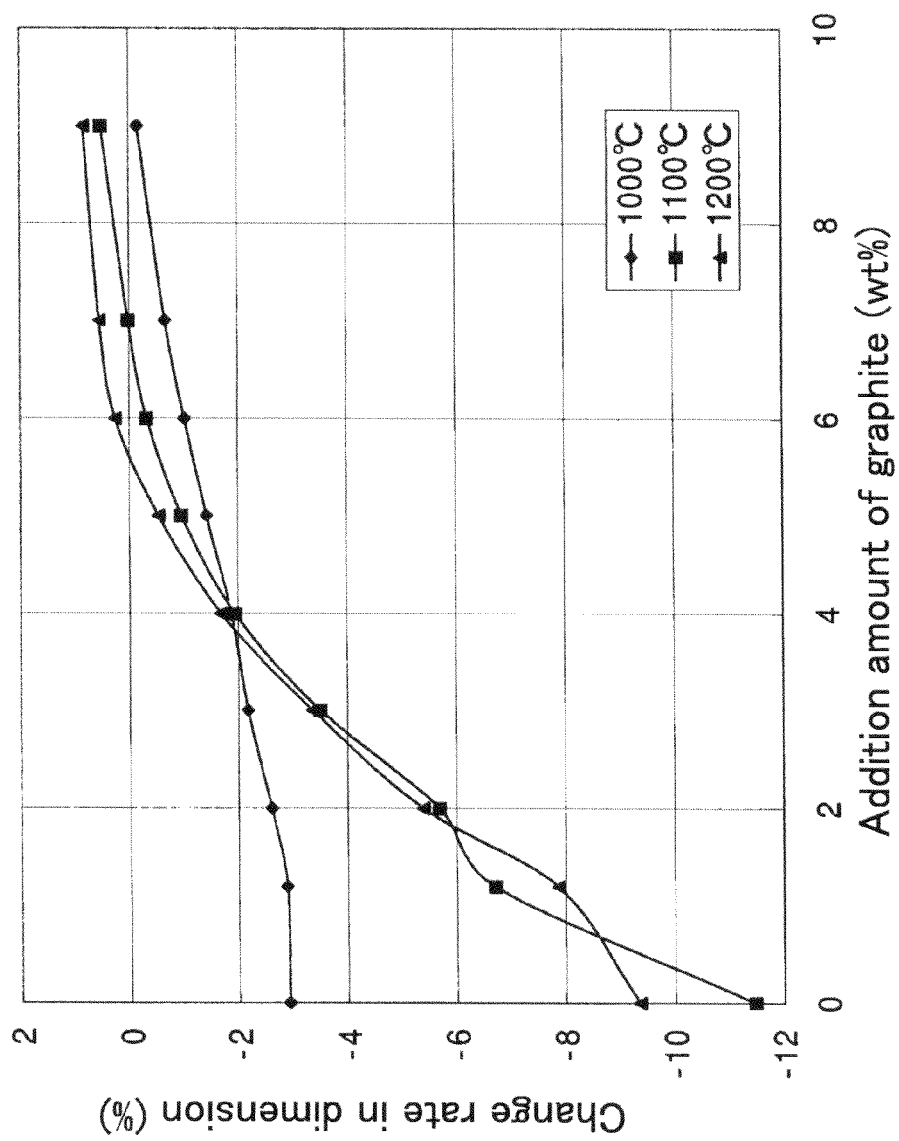
FIG. 10 is a graph showing a relation between an addition amount of graphite and a change rate in dimension of a Fe16Al25Cu+15Cu alloy.
Figure 11:
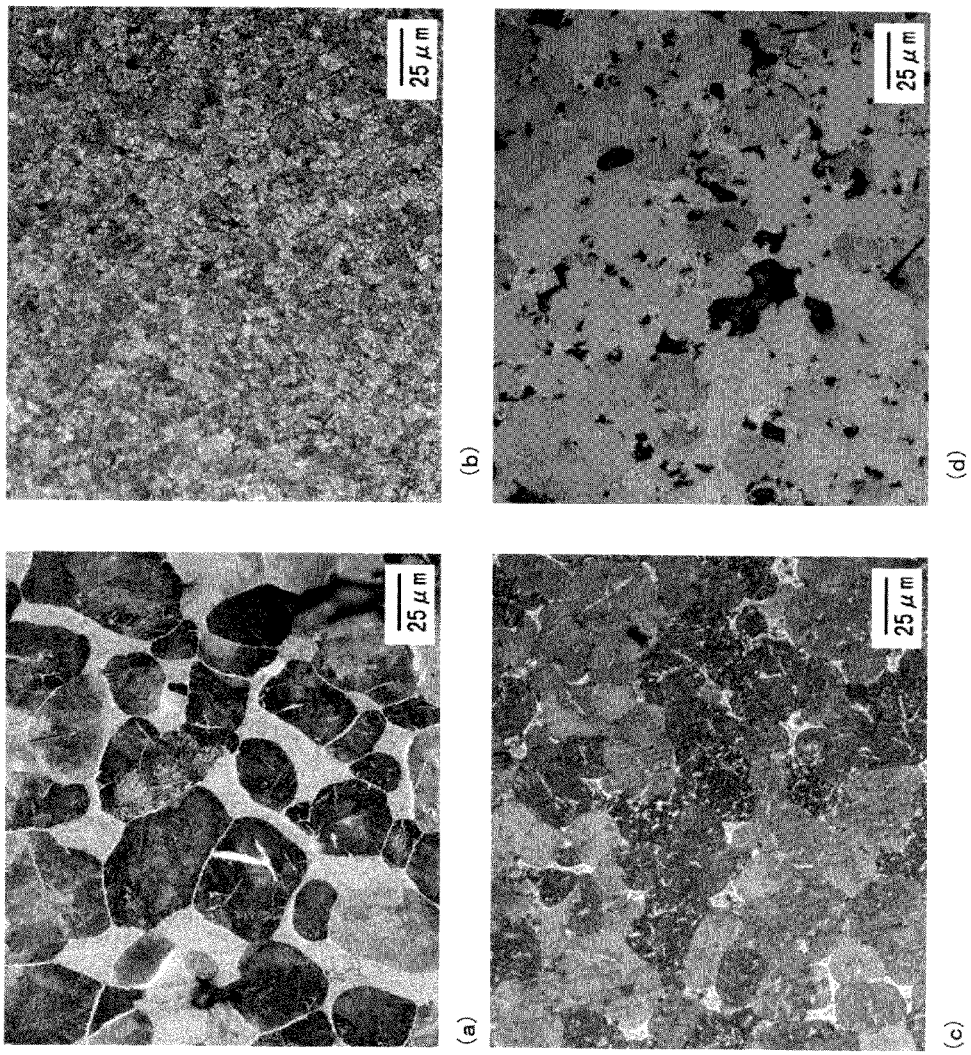
FIG. 11A is a photograph showing a sintered structure of B7 alloy shown in Table 3-1 sintered at 1200° C.
FIG. 11B is a photograph showing a sintered structure of B11 alloy shown in Table 3-1 sintered at 1200° C.
FIG. 11C is a photograph showing a sintered structure of B13 alloy shown in Table 3-1 sintered at 1200° C.
FIG. 11D is a photograph showing a sintered structure of B20 alloy shown in Table 3-1 sintered at 1200° C.
Figure 12:
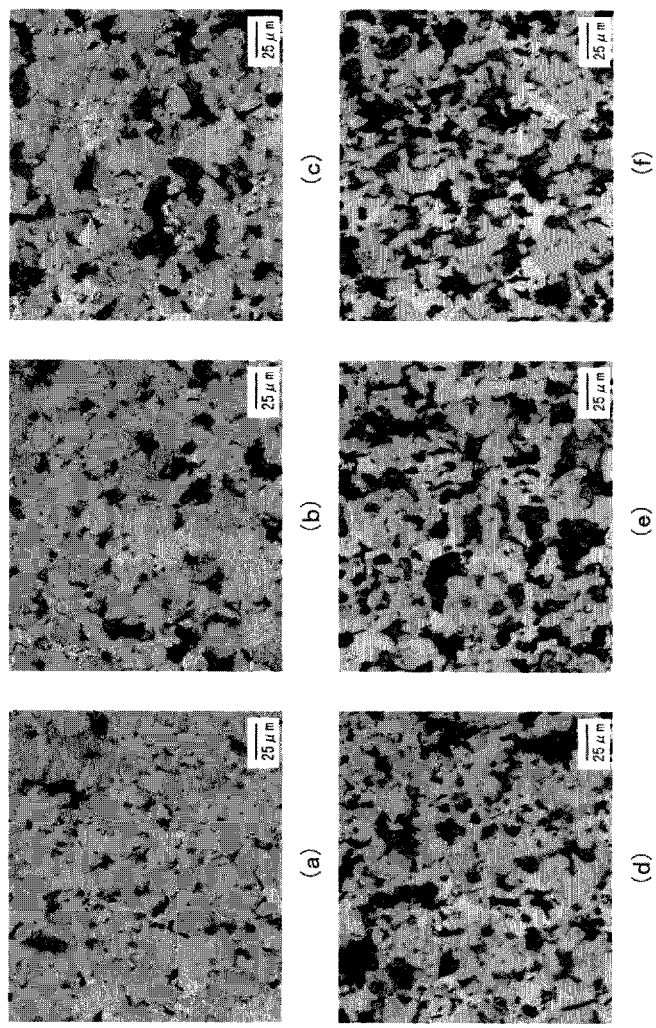
FIG. 12A is a photograph showing a sintered structure of B21 alloy shown in Table 3-1 sintered at 1200° C.
FIG. 12B is a photograph showing a sintered structure of B22 alloy shown in Table 3-1 sintered at 1200° C.
FIG. 12C is a photograph showing a sintered structure of B23 alloy shown in Table 3-1 sintered at 1200° C.
FIG. 12D is a photograph showing a sintered structure of B24 alloy shown in Table 3-1 sintered at 1200° C.
FIG. 12E is a photograph showing a sintered structure of B25 alloy shown in Table 3-1 sintered at 1200° C.
FIG. 12F is a photograph showing a sintered structure of B26 alloy shown in Table 3-1 sintered at 1200° C.
Figure 13:
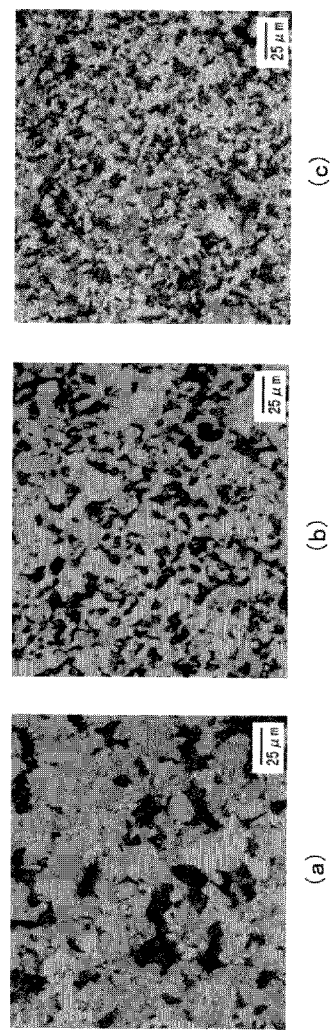
FIG. 13A is a photograph showing a sintered structure of B23 alloy shown in Table 3-1 sintered at 1200° C.
FIG. 13B is a photograph showing a sintered structure of B23 alloy shown in Table 3-1 sintered at 1100° C.
FIG. 13C is a photograph showing a sintered structure of B23 alloy shown in Table 3-1 sintered at 1000° C.

FIG. 10 is a graph showing a change rate in dimension of B14 and B20 to B27 alloys after sintering.

As described bellow, it is shown that dispersion of blended graphite in the sintered body inhibits densification by sintering. At 1000° C., a solid phase sintering in which a liquid phase of Cu based alloy is not generated is caused. At 1100° C., a liquid phase sintering in which Cu is completely transformed into a liquid phase is caused. At 1200° C., in the alloys containing graphite of at least 2 wt %, a liquid phase of Fe—C based alloy begins to be generated, and in the alloys containing graphite of 4 wt %, although the temperature is a temperature at which a Fe—C based alloy are completely transformed into a liquid phase, erosion does not occur. As described below, the reason is that an alloying reaction of blended graphite powder and ferrous alloy is inhibited by a Cu alloy based liquid phase generated by Cu contained in ferrous alloy powder previously in an amount of a solid solubility or more inhibits.

FIGS. 11A to 11D are photographs showing structures of B7, B11, B13 and B20 alloys sintered at 1200° C.

The photographs shows the following.

[1] In B7 alloy, the blended graphite of 1.2 wt % forms a solid solution with ferrous powder and white cementite carbide is partially precipitated.

[2] In B13 alloy, an addition of Cu of 10 wt % generates a larger amount of liquid phase at sintering than B11 alloy and the liquid phase grows into a large crystal grain.

[3] In B20 alloy, the blended fine graphite does not form a solid solution with the Fe-16 wt % Al-25 wt % Cu alloy powder but is finely dispersed with aggregation. This inhibits growing of crystal grain of Fe-16 wt % Al-25 wt % Cu alloy phase.

FIGS. 12A to 12F are photographs showing structures of B21 to B26 alloys sintered at 1200° C.

The photographs show that fine graphite particles (an average grain size of 6 μm) are substantially uniformly dispersed on grain boundary in high concentration with aggregation.

FIGS. 14A to 14C shows that by lowering the sintering temperature (1200 to 1000° C.), the dispersed graphite particles are formed into a fine grain-size structure. It is also shown that by use of ferrous alloy powder containing Cu in an amount of solid solubility limit or more previously, a ferrous sintered sliding material in which the blended graphite powder does not form a solid solution with ferrous alloy but the fine blended graphite is suitably aggregated and dispersed gives excellent sliding ability due to self-lubricating property and porosity of the dispersed graphite.

Figure 14:
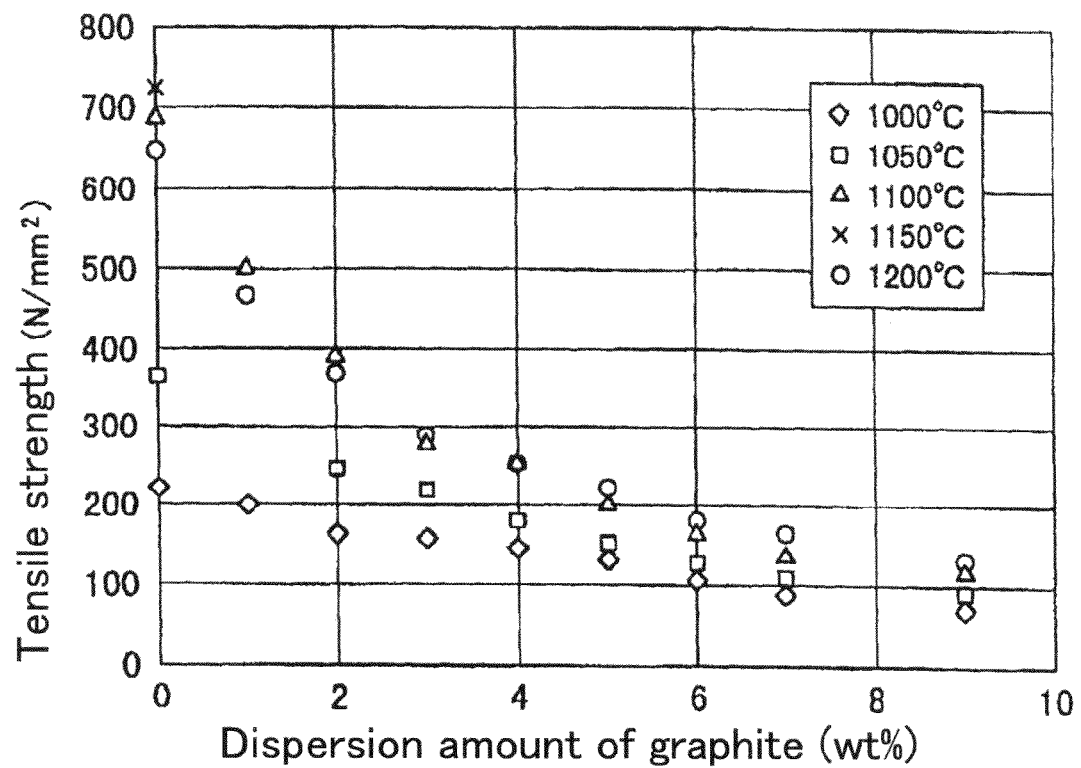
FIG. 14 is a graph showing a relation between a dispersion amount of graphite and a tensile strength of Example 2.

FIG. 14 is a graph showing a relation between a dispersion amount of graphite and tensile strength.

Referring to a conventionally used oil retained bearing having radial crushing strength of 20 kgf/mm$^2$ or more (tensile strength of about 100N/mm$^2$ or more), in the ferrous sintered sliding material according to the embodiment, it is permitted to add graphite of a maximum amount of 9 wt %. When used under a high bearing stress of 500 kgf/cm$^2$ or higher, a preferable tensile strength is 150N/mm$^2$ or more which is three times of the bearing stress. So, an addition amount of graphite is preferably set to 7 wt % or less. In order to strengthen the ferrous alloy phase and improve abrasion resistance, it is desirable to add a suitable amount of carbon as the ferrous alloy powder in addition to Cu of a solid solubility limit or more and to apply a heat treatment such as quench hardening after sintering.

Figure 15:
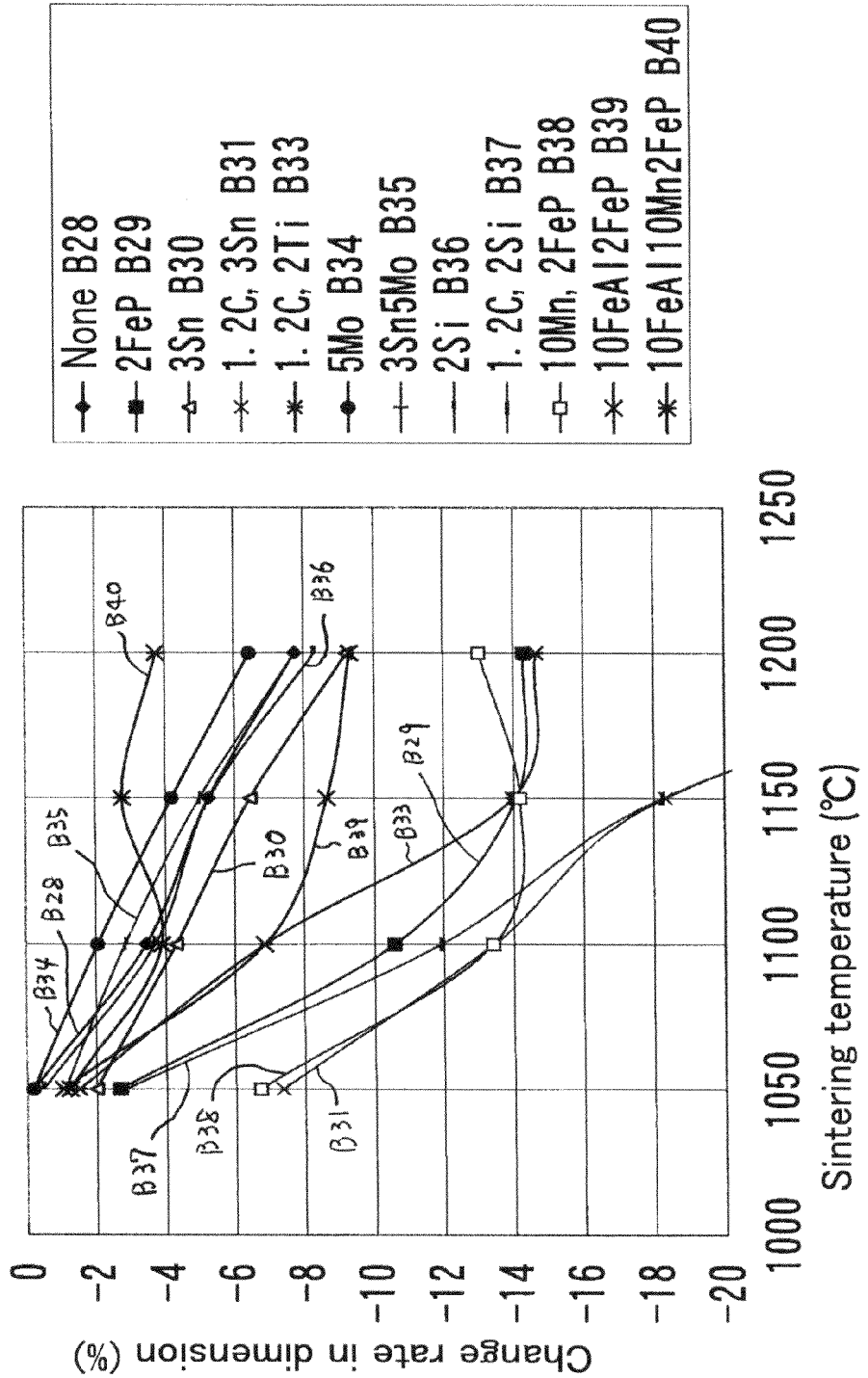
FIG. 15 is a graph showing a relation between a sintering temperature and a change rate in dimension of B28 to B40 alloys shown in Table 3-2.

FIG. 15 is a graph showing a change rate in dimension of each of B28 to 40 alloys mainly composed of the M2 specific steel powder shown in Table 3-2 after sintering.

Figure 16:
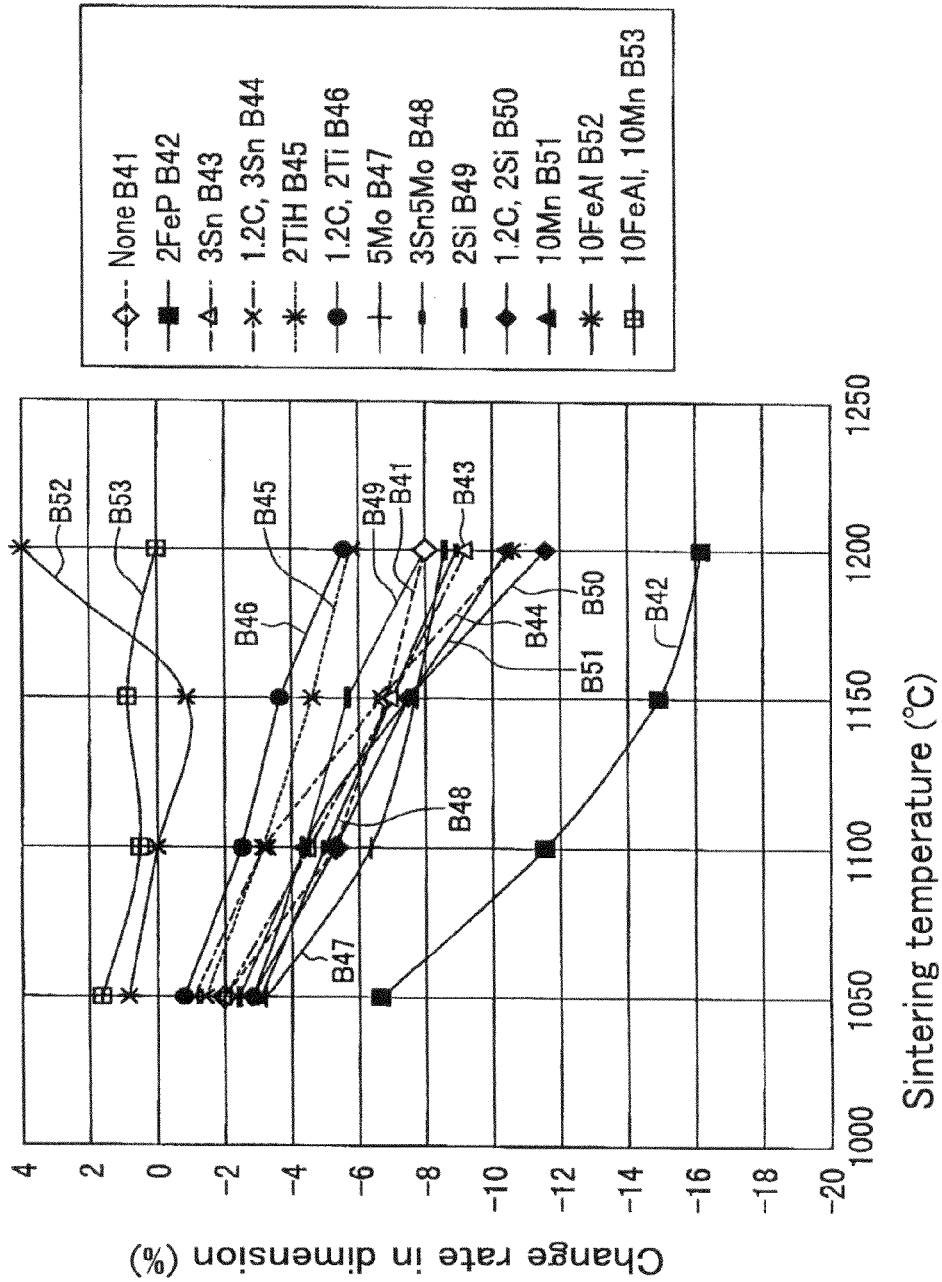
FIG. 16 is a graph showing a relation between a sintering temperature and a change rate in dimension of B41 to B53 alloys shown in Table 3-2.

FIG. 16 is a graph showing a change rate in dimension of each of B41 to B53 alloys mainly composed of SUS440C powder after sintering.

The results of B28 and B41 alloys shows that, in a sintered body comprising ferrous alloy powder containing carbon previously and Cu powder, expansion due to an addition of Cu powder, which is observed in B2 to B5 alloys, is not observed.

By comparison of B28 alloy with B29 to B40 alloys in a change rate in dimension, the following found.

[1] Phosphor iron alloy (Fe-25 wt % P) improves sintering ability and causes high density (B29).

[2] An addition of Sn and Si improves sintering ability slightly (B30, B36).

[3] An addition of Mo slightly inhibits densification.

[4] An addition of graphite promotes sintering ability to densify the sintered body (B31, B37). A sintered body added with Ti and graphite and dispersed with TiC therein is also densified.

[5] An addition of Mn improves sintering ability at the lower temperature range and the densification begins from the lower temperature (B38).

[6] An addition of Al by Fe-50% Al mother alloy by Fe-50 wt % Al mother alloy shows remarkable expansion (B39, B40).

Especially, P and C (Mn) are important elements for controlling densification at sintering. An addition of B similar to that is preferable.

By comparison of B41 alloy with B42 to B53 alloys in a change rate in dimension, it is shown that, in a high-Cr steel based sintered body containing $Cr_7C_3$ type carbide precipitated and dispersed therein, as with the M2 specific steel based sintered body, an addition of phosphor iron, graphite and Mn promotes sintering ability and an addition of Fe-50 wt % Al mother alloy shows remarkable expansion. It is also shown that an addition P shows a most remarkable function for promoting sintering. So, it is important to be added with at least one or more elements of P, graphite and B.

Figure 17:
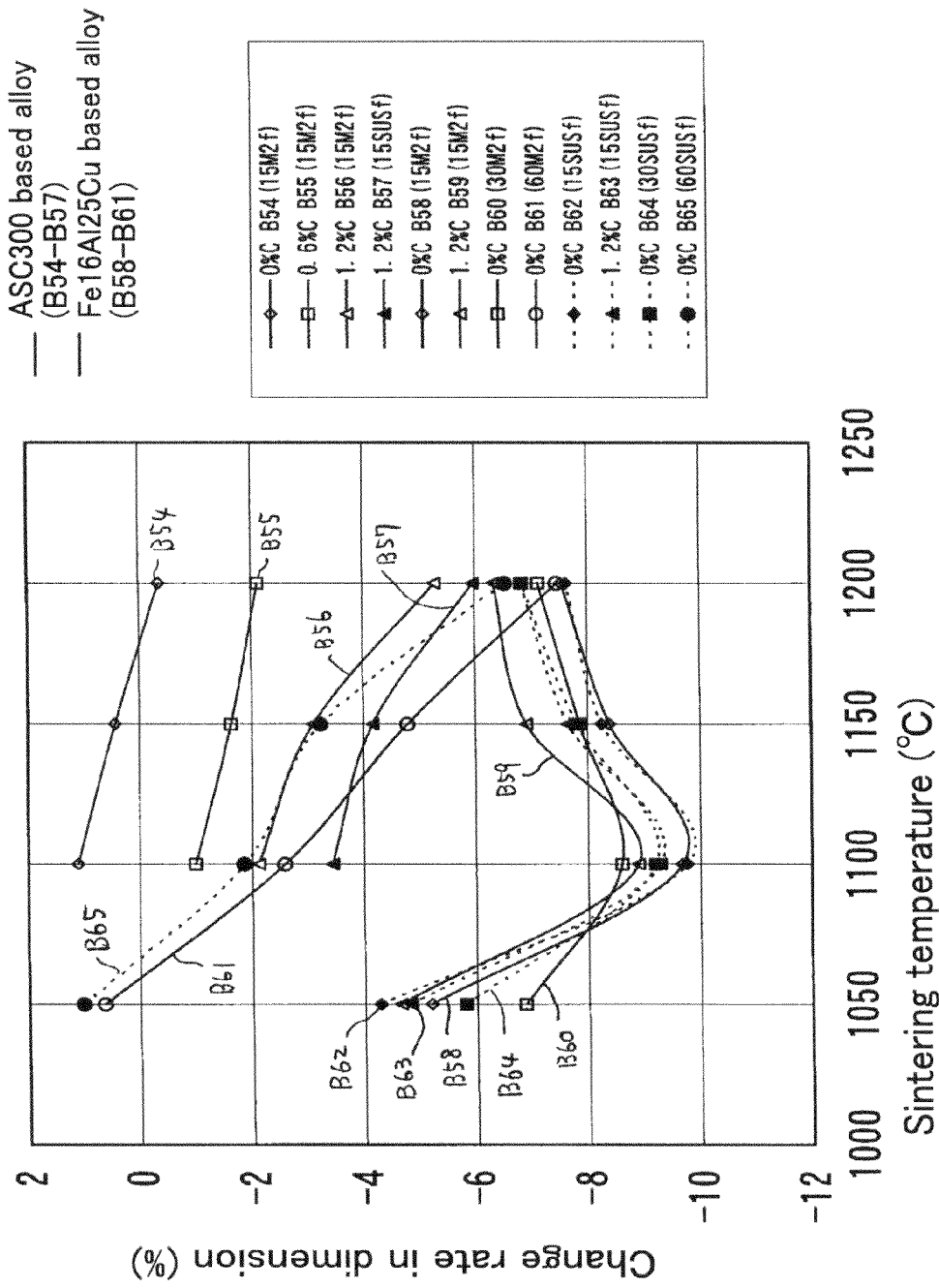
FIG. 17 is a graph showing a relation between a sintering temperature and a change rate in dimension of B54 to B65 alloys shown in Table 3-2.

FIG. 17 is a graph showing a change rate in sintering dimension of each of B54 to B65 alloys.

The graph shows that, in B54 to B57 alloys in which ferrous powder (ASC300) is mixed with M2 or SUS440C are mixed, expansion resulted from mixing of the Cu powder is not observed because of an addition of graphite powder. It is also shown that the shrink property demonstrably increases compared with B7 alloy in FIG. 6 because an addition of M2 and SUS440C containing carbon previously. However, it is not sufficient for achieving densification.

In B58 to B60 and B62 to B64 alloys in which Fe-16 wt % Al-25 wt % Cu alloy powder (a solid solution limit of Cu: about 20 wt %) containing Cu previously is mixed with M2 or SUS440C, remarkable sintering shrink property is shown.

In B61 and B65 alloys, since an amount of Fe-16 wt % Al-25 wt % Cu alloy powder which contains Cu previously and generates a Cu alloy liquid phase at sintering is small, the shrink property at sintering lowers to be close that of B56 and B57 alloys with which graphite is mixed. An addition amount of M2 and SUS440C of about 50 wt % at maximum is expected to cause densification.

As a high-speed steel powder such as M2 and SUS440C excellent in sintering ability, it is preferable to add Cu in an amount of a solid solubility limit or more previously as with Fe-16 wt % Al-25 wt % Cu alloy powder (a solution limit of Cu: about 20 wt %).

Example 3

(Method for Producing a Ferrous Sintered Roll-Formed Bushing 1)

Table 4 shows compositions of alloys of ferrous sintered sliding materials used in the Example.

These sliding materials were prepared in composition by using raw material powders used in Examples 1 and 2. Each mixed powder was dispersed on a SPCC steel plate 4 mm in thickness to have a thickness of 1.4 mm. Then, after preliminary sintering at 900° C. for 15 minutes, the about 50% sintered layer was reduced by a reduction machine and then preliminarily sintered again at 900° C. for 15 minutes. After cooling, it was finally sintered at various temperatures within 1000 to 1200° C. for 30 minutes. Then, it was rapidly cooled using $N_2$ gas of 600 torr from the sintering temperatures. The sintered body was observed and examined in sintering ability of the alloys and a lower limit of sintering temperature at which a sufficient bonding strength between each alloy and the back metal steel can be obtained.

FIGS. 18A to 18F are photographs showing sectional structures of sintered layers of C6 and C8 alloys after preliminary sintering (900° C.) and after final sintering at 1000 and 1050° C. and then cooling under $N_2$ gas.

These photographs shows that the final sintering at 1000° C. forms a diffusion layer of PX16 at the bonding boundary between the back metal steel and the sintered layer and a specific boundary structure in which Cu alloy phase particle extending in the diffusion direction are dispersed. In order to obtain a multilayer member having high bonding strength, it is necessary that the final sintering be carried out at 1000° C. or higher, more preferably 1050° C. or higher at which the sintered layer is more densified.

FIGS. 19A to 19D are photographs showing a relation between the structures of sintered layers of C9 and C10 alloys and final sintering temperatures.

These photographs show that a temperature range within 1050 to 1170° C. gives a sintering structure having high density. It is also shown that by the final sintering at 1200° C., the present alloys enter an over sintering state and begin to be porous.

FIGS. 20A and 20B are photographs showing sectional structures of sintered layers of C12 and C14 alloys after final sintering at 1130° C. for 30 minutes and then cooling under $N_2$ gas without the rolling after the preliminary sintering.

Figure 19:
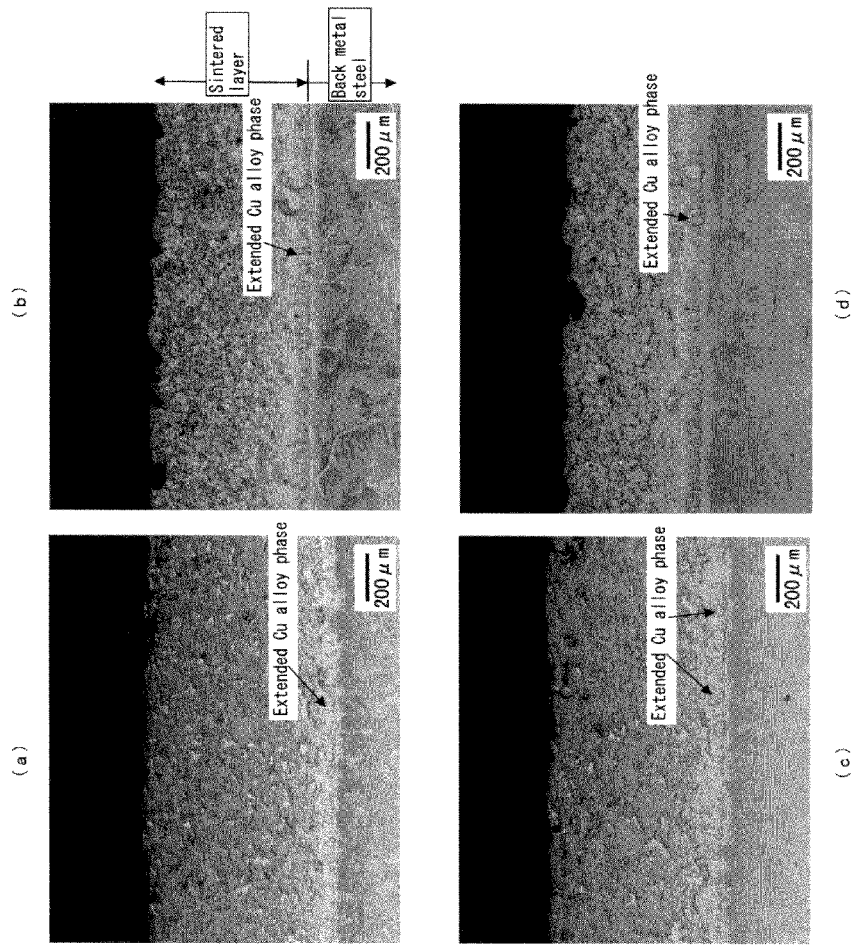
FIGS. 19A to 19B are photographs showing a surrounding structure of boundary between the back metal steel and the sintered layer of C9 alloy shown in Table 4 which is finally sintered at each temperature of 1050° C. and 1170° C.
FIGS. 19C to 19D are photographs showing a surrounding structure of boundary between the back metal steel and the sintered layer of C10 alloy shown in Table 4 which is finally sintered at each temperature of 1050° C. and 1170° C.

These photographs shows that porous structure suitable for oil retained sintered sliding material is obtained compared than each structure shown in FIG. 19.

TABLE 4

Formulated composition of ferrous sintered alloy for roll-formed bushing (wt %)

| Reference number | PX16 | KM15 | KS6Cu Graphite (KS6) | ①Cumixed powder | FeP | 50% First rolling | 50% Second roilling | 55~60% 55~67% Second rolling |
|---|---|---|---|---|---|---|---|---|
| C1 | Bal. | | | 8 | 2 | Δ○ | X | |
| C2 | Bal. | | 0.5 | 13 | 4 | ◉ | ◉ | Δ |
| C3 | Bal. | | 0.5 | 17.5 | 4 | ◉ | ◉ | Δ |
| C4 | Bal. | | | 23 | 4 | ◉ | ◉ | ◉ |
| C5 | Bal. | | 0.5 | 23 | 4 | ◉ | ◉ | ◉ |
| C6 | Bal. | | | 28.5 | 2 | ◉ | ◉ | ◉ |
| C7 | Bal. | | | 28.5 | 4 | ◉ | ◉ | ◉ |
| C8 | Bal. | | | 34 | 2 | ◉ | ◉ | ◉ |
| C9 | Bal. | | 1 | 28.5 | 2 | ◉ | ◉ | ◉ |
| C10 | Bal. | | 1 | 34 | 2 | ◉ | ◉ | ◉ |
| C11 | Bal. | | 0.5 | 28.5 | 4 | ◉ | ◉ | ◉ |
| C12 | | Bal. | 1.2 | 28.5 | 2 | ◉ | ◉ | ○ |
| C13 | | Bal. | 2.3 | 27 | 2 | ◉ | ◉ | ○ |
| C14 | | Bal. | 1.2 | 34 | 2 | ◉ | ◉ | ○ |
| C15 | | Bal. | 2.2 | 34 | 2 | ◉ | ◉ | ○ |
| C16 | | Bal. | | 28.5 | 2 | ◉ | ◉ | ○ |
| C17 | | Bal. | 1.95 | 27 | 4 | ◉ | ◉ | ○ |
| C18 | | Bal. | | 34 | 2 | ◉ | ◉ | ◉ |
| C19 | | Bal. | 1.95 | 33 | 4 | ◉ | ◉ | ◉ |

Composition of Cu mixed powder

| | –#350 Cu | –#350 Cu33Sn |
|---|---|---|
| ① | 75.8 | 18.2 |

Example 4

(Method for Producing a Ferrous Sintered Roll-Formed Bushing 2)

Table 4 shows compositions of alloys of ferrous sintered sliding materials used in the Example.

These sliding materials were prepared in composition by using raw material powders used in Examples 1 and 2. Each mixed powder was dispersed on a SPCC steel plate 4 mm in thickness to have a thickness of 1.4 mm. Then, after preliminary sintering at 900° C. for 15 minutes, the about 50% sintered layer was reduced by a reduction machine, preliminarily sintered again at 900° C. for 15 minutes. After cooling, it was mechanically reduced at a reduction rate of each of 0% and 55% by a reduction machine and then finally sintered at 1100° C. for 30 minutes. And, it was rapidly cooled using $N_2$ gas of 600 torr from the sintering temperatures. The sintered body was observed and examined in sintering ability of the alloys. The reduction rate is defined by dividing an amount of change in thickness of the multilayer member at before and after the rolling by a thickness of the sintered layer. In this case, the thickness of the sintered layer is defined as a difference in thickness between the multilayer member and the back metal steel on the assumption that the thickness of the back metal steel is not changed. The reduction rate indicates the rolling reduction rate of sintered layer with accuracy within a range in which the multilayer member does not extend so much by the rolling. However, when subjected to a strong rolling, since the back metal steel is also reduced, the reduction rate is a conventional value.

In the right column of the Table 4, a rolling ability of the sintered layer rolled at about 50% after the preliminary sintering bonding is shown.

Under a standard of alloy, as an alloy capable of rolling without occurrence of peeling the sintered layer from the back metal steel and cracks on the sintered layer and also reducing the sintered layer sufficiently by the first rolling while keeping the preliminary sintering bonding ability, it is necessary to add Cu—Sn based mixed powder in an amount of 8 wt % or more, more preferably 10 wt % or more.

In the rightmost column of Table 4, a rolling ability of the sintered layer preliminary sintered at 900° C. and then rolled at a reduction rate of about 55 to 67% is shown. It is found that, in C1 alloy, a number of fine cracks occur and, in C2 and C3 alloys, fine cracks occur a little.

Figure 21:
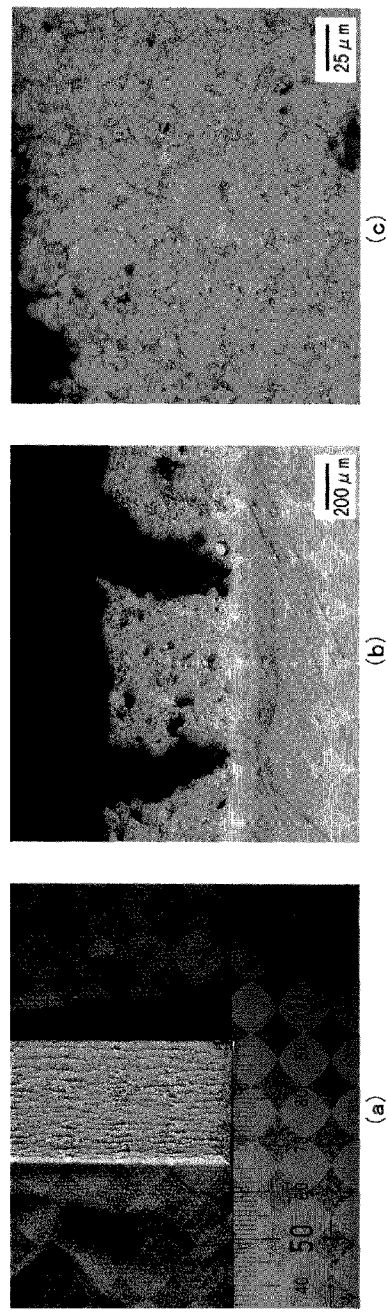
FIGS. 21A to 21C are photographs showing an appearance and sectional structure of an alloy in which a preliminary sintering layer of C2 alloy is rolled at a rolling reduction of 60%, finally sintered at 1100° C. for minutes and then cooled under $N_2$ gas from the sintering temperature.

FIGS. 21A to 21C are photographs showing an appearance and sectional surface structure in which the preliminary sintered layer of C2 alloy is rolled at a reduction rate of 60%, finally sintered at 1100° C. for 30 minutes and then cooled under $N_2$ gas from the final sintering temperature.

It is found that by the primal sintering, the fine cracks generated at the rolling forms into wave-like grooves. From the sectional structure, it is shown that the groove grows to have a width of about 200 μm or more. It is also shown that crack which deteriorates the bonding strength of the back metal steel is not generated. And, it is also shown that on the bonding boundary, PX16 in the sintered sliding material and the back metal steel are sufficiently diffused to be integrated and the Cu alloy phase extending in the diffusion direction is dispersed at the vicinity of the boundary to form a rigid bonding boundary. These crack grooves are usefully acted as oil grooves and oil holes on the sliding surface.

From FIG. 21C showing an enlarged sliding material portion, it is shown that Cu alloy phase exists in such a degree that they are interspersed in a granular form in the sliding material. The sliding material has substantial the same property as the sintered high-speed steel of PX16, and has excellent abrasion resistance, seizing resistance, temper softening resistance and also low coefficient of friction.

FIGS. 22A to 22E are photographs showing sectional surface structures in which the preliminary sintered layers of C3 to C5, C7 and C11 alloys are rolled at a reduction rate of about 60%, finally sintered and then cooled under $N_2$ gas.

By comparison of C3 to C5 alloys, C7 and C11 alloys, it is shown that the sintered layers containing graphite of 0.5 wt % or more blended therewith are sintered with higher density. As shown in FIG. 22B (C4 alloy), since the pores is coarse, it is preferable to add a small amount of graphite which promotes leakage of gas generated at the final sintering from the sintered layer.

In Table 4, the rolling rate of C12 to C19 alloys examined in the above described way are shown. In C12 to C17 alloys, rolling at excessive reduction rates causes fine crakes a little.

Figure 23:
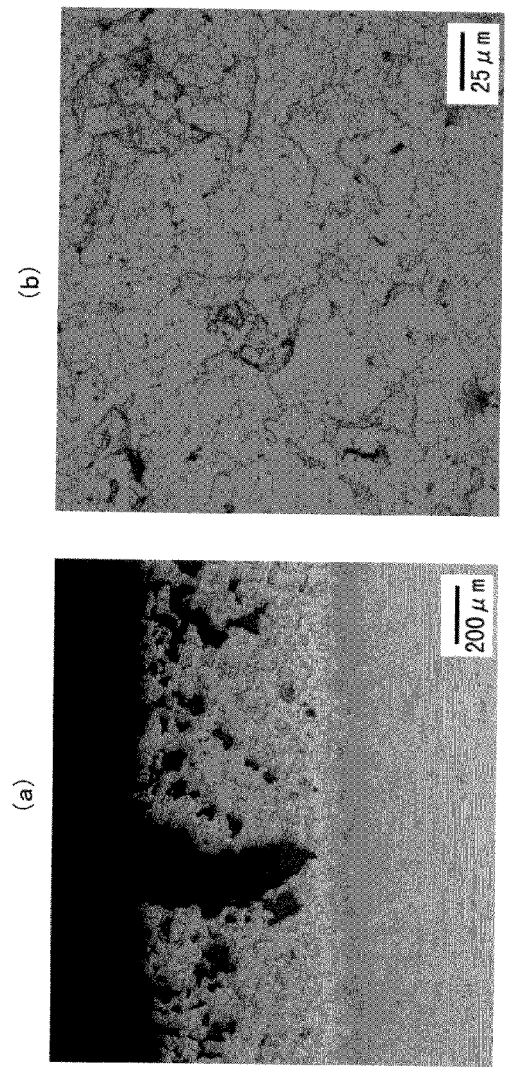
FIGS. 23A and 23B are photographs showing sectional structures of C13 alloy finally sintered at 1100° C.
Figure 24:
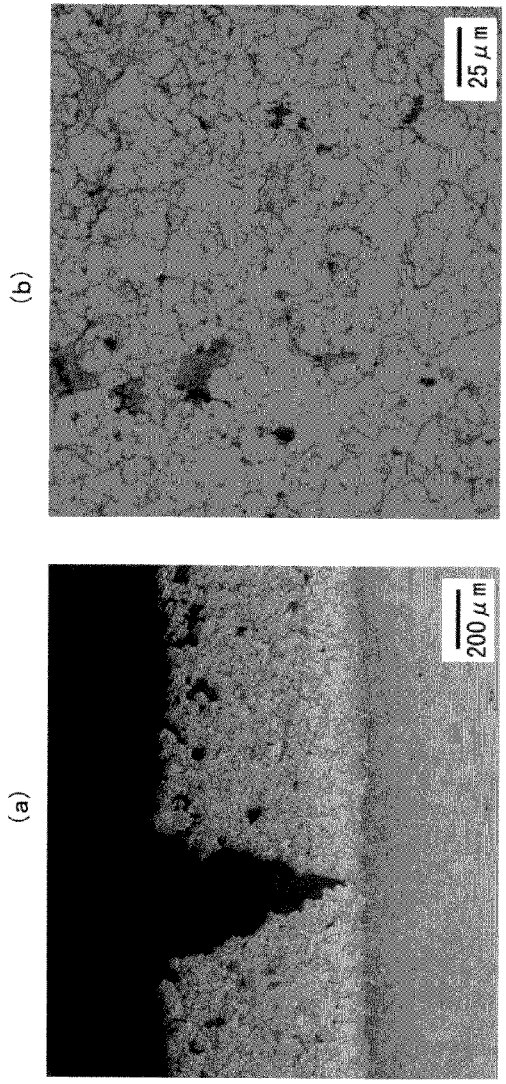
FIGS. 24A and 24B are photographs showing sectional structures of C15 alloy finally sintered at 1100° C.
Figure 25:
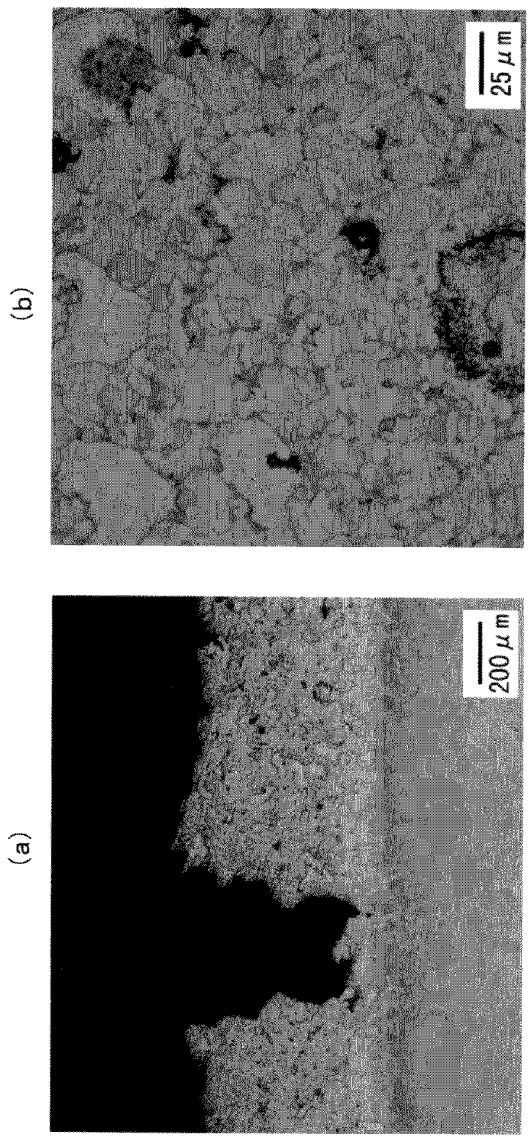
FIGS. 25A and 25B are photographs showing sectional structures of C17 alloy finally sintered at 1100° C.
Figure 26:
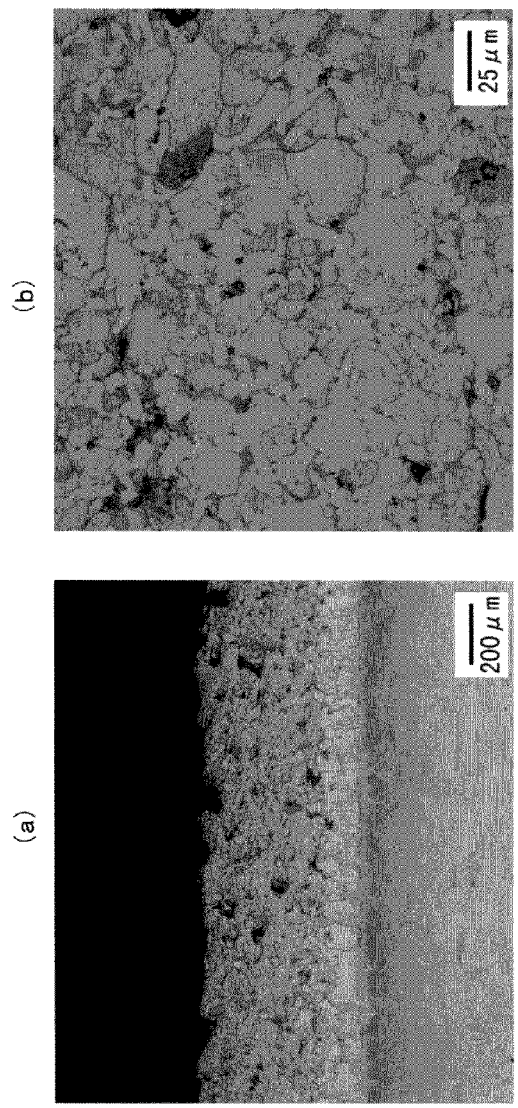
FIGS. 26A and 26B are photographs showing sectional structures of C19 alloy finally sintered at 1100° C.

FIGS. 23A and 23B; FIGS. 24A and 24B; FIGS. 25A and 25B; and FIGS. 26A and 26B are photographs showing sectional structures of C13, C15, C17 and C19 alloys after final sintering at 1100° C.

The sintered sliding materials are sintered with a high density as with the case in which P16 specific steel powder is used.

Figure 18:
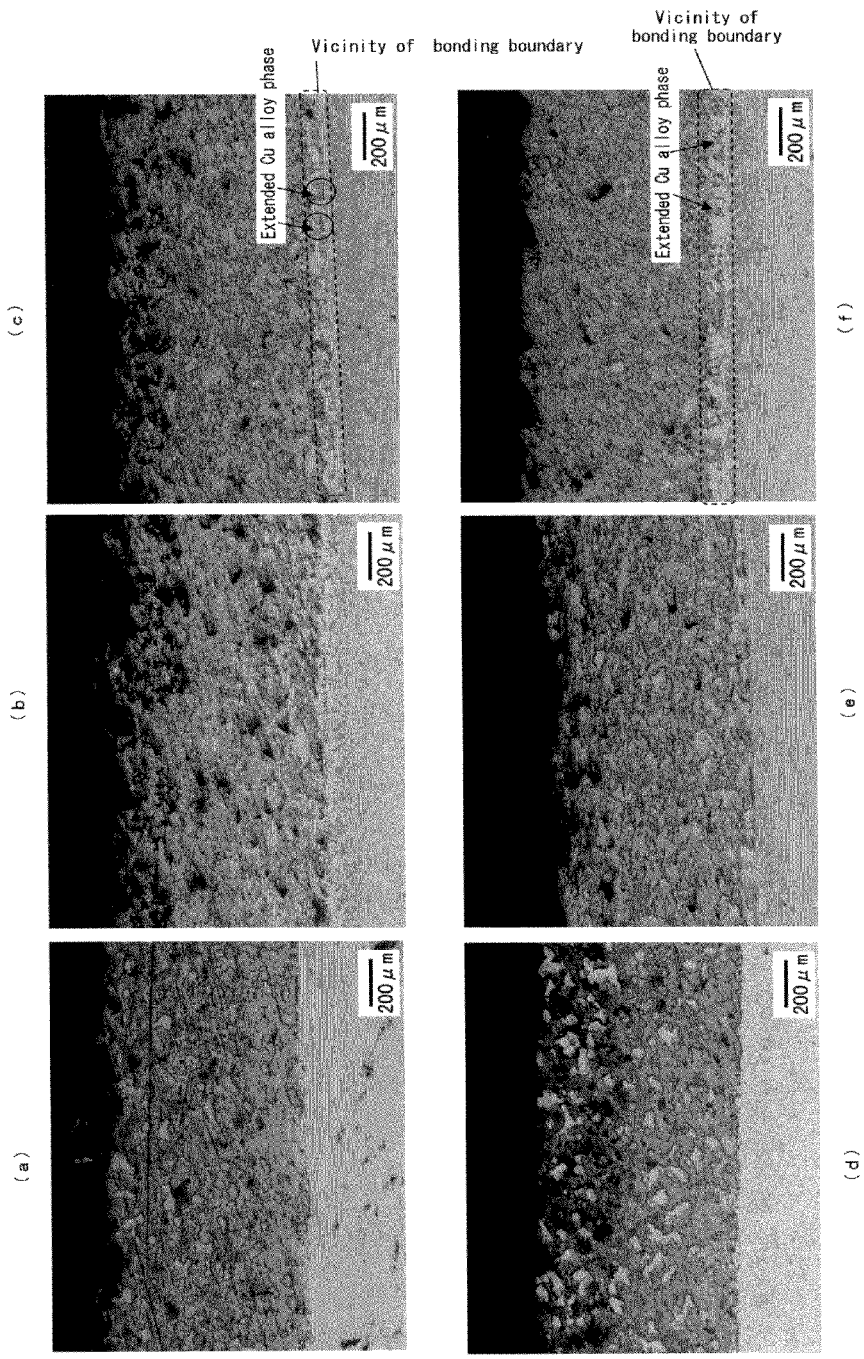
FIGS. 18A to 18C are photographs showing a surrounding structure of boundary between the back metal steel and the sintered layer of C6 alloy shown in Table 4 which is preliminarily sintered at a temperature of 900° C., 1000° C. and 1050° C. respectively.
FIGS. 18D to 18F are photographs showing a surrounding structure of boundary between the back metal steel and the sintered layer of C8 alloy shown in Table 4 which is preliminarily sintered at a temperature of 900° C., 1000° C. and 1050° C. respectively.
Figure 27:
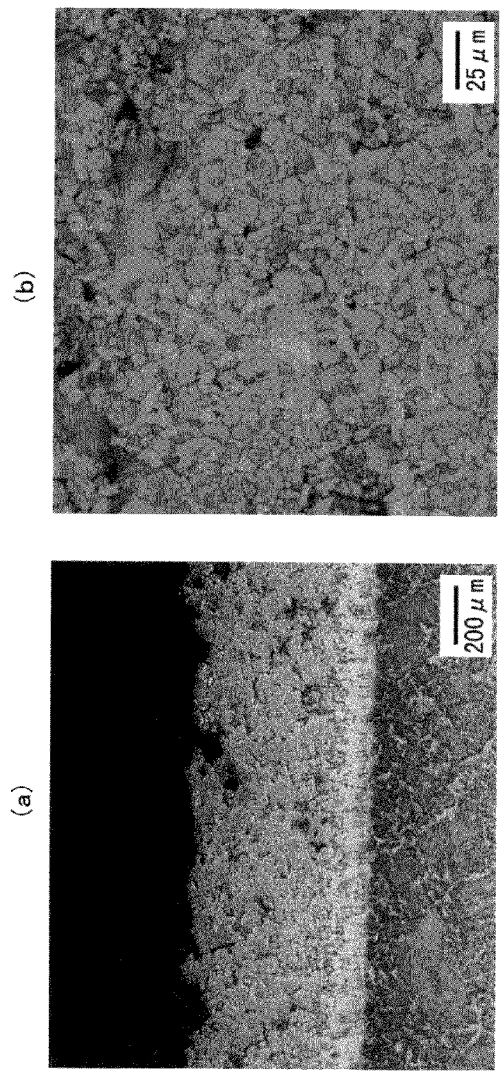
FIGS. 27A to 27B are photographs showing sectional structures of an alloy in which C13 alloy is preliminarily sintered, fine Cu-10 wt % Sn alloy powder is thinly dispersed on the surface of the preliminarily sintered alloy, rolled at a rolling reduction of about 65%, finally sintered and then cooled under $N_2$ gas.
Figure 28:
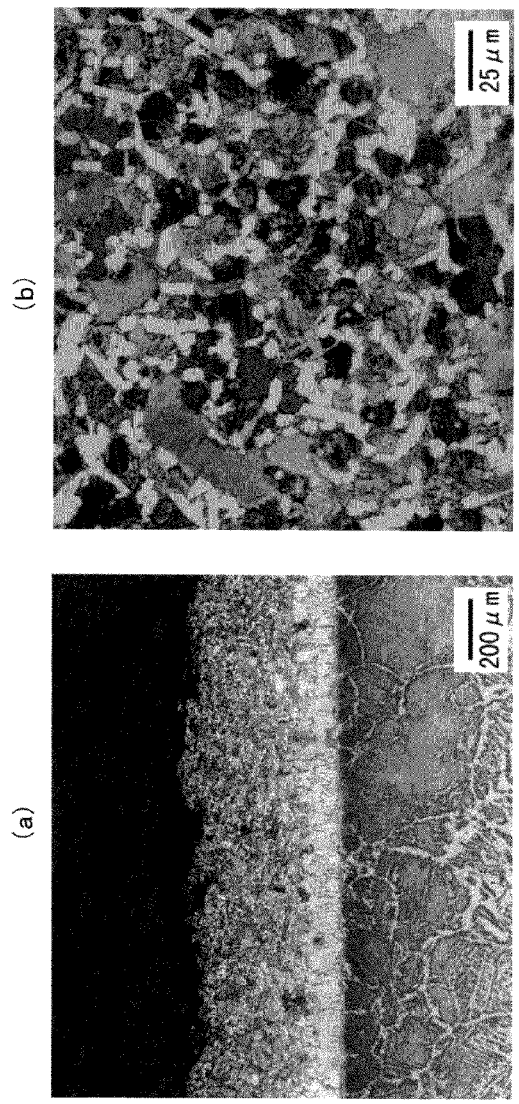
FIGS. 28A to 28B are photographs showing sectional structures of an alloy in which C17 alloy is preliminarily sintered, fine Cu-10 wt % Sn alloy powder is thinly dispersed on the surface of the preliminarily sintered alloy, rolled at a rolling reduction of about 65%, finally sintered and then cooled under $N_2$ gas.

From FIG. 27 and FIG. 18 showing enlarged sectional structure of C19 alloy, $Cr_7C_3$ carbide are dispersed in KM15 in the sintered sliding material with a high density and Cu alloy phase are dispersed in a granular form.

FIGS. 27A and 27B and FIGS. 28A and 28B are photographs showing sectional surface structures of C13 and C17 alloys which are preliminarily sintered, dispersed with fine Cu-10 wt % Sn alloy powder of 350 mesh or less on the surface thinly, reduced at a reduction rate of about 65%, finally sintered and then cooled under $N_2$ gas.

It is shown that the dispersion of soft Cu-10 wt % Sn alloy inhibits occurrence of cracks at strong rolling and the produced sintered layer has a high density.

The mechanical reduction such as rolling after the preliminary sintering provides a high density sintered structure shown in FIGS. 23 to 26, FIG. 27 and FIG. 28 compared with porous structures suitable for the oil retained sintered sliding material shown in FIGS. 20A and 20B.

Example 5

(Method for Producing a Ferrous Sintered Roll-Formed Bushing 3)

C4, C6, C8 and C9 alloys as with Examples 3 and 4 were preliminarily sintered at 820° C., rolled at various reduction ratios of 20 to 100% and then finally sintered at 1100° C. for 30 minutes. The results show that the rolling after the preliminary sintering at 820° C. provides significantly excellent rolling ability and the rolling at a reduction ratio of 100% does not cause fine cracks in all of the alloys. So, it is found that the preliminary sintering bonding and the preliminary sintering temperature have much effect on rolling ability after the preliminary sintering.

The reason is, as examined in Example 1, that it is important that the very soft Cu—Sn alloy phase in the sintered material has sufficient sintering ability and sintering of ferrous powders is not promoted. From the results of Example 1 shown in FIG. 4, a preliminary sintering temperature may be 770° C. A lower limit of preliminary sintering temperature is set to 750° C., more preferably 770° C.

The upper limit of preliminary sintering temperature is set to 1000° C. from the results of FIG. 4 and rolling ability obtained in Example 4, more preferably 950° C. or 900° C.

Example 6

(Bearing Sliding Experiment)

Table 5 shows compositions of sintered alloys used in the Example. D1 to D8 alloys are prepared by using C2, C6, C9, C11, C12, C13, C16 and C19 alloys shown in Table 4. D11 to D13 alloys comprises carbon and Fe—C—Cu based alloy powder shown in Table 6.

TABLE 5

Formulated composition of ferrous sintered alloy used in Example 6 (wt %)

| | Reference number | PX16 | KM15 | A300M | Fe10CuA | Fe5Al Bal. | Fe7Cu4KS8 C | Fe7Cu4KS8 Graphite (KS6) | ①Cu mixed powder | FeP | Cu | Porous Coefficient of friction |
|---|---|---|---|---|---|---|---|---|---|---|---|---|
| C2 | D1 | Bal. | | | | | 0.5 | | 13 | 4 | | 0.12 |
| C6 | D2 | Bal. | | | | | | | 28.5 | 2 | | 0.13 |
| C9 | D3 | Bal. | | | | | 1 | | 28.5 | 2 | | 0.12 |
| C11 | D4 | Bal. | | | | | 0.5 | | 28.5 | 4 | | 0.1 |
| C12 | D5 | | Bal. | | | | 1.2 | | 28.5 | 2 | | 0.11 |
| C13 | D6 | | Bal. | | | | 2.3 | | 27 | 2 | | 0.12 |
| C16 | D7 | | Bal. | | | | | | 28.5 | 2 | | 0.18 |
| C19 | D8 | | Bal. | | | | 1.95 | | 33 | 4 | | 0.12 |
| | D9 | | | 30 | Bal. | | 1 | | 28.5 | 2 | | 0.19 |
| | D10 | | | 60 | Bal. | | 1 | | 28.5 | 2 | | 0.13 |
| | D11 | | | | Bal. | | | 4 | 17 | | | 0.09 |
| | D12 | | | | | Bal. | | 4 | 17 | | | 0.08 |
| | D13 | | | | | | Bal. | 4 | 17 | | | 0.06 |
| | D14 | Bal. | | | | | 0.5 | | 13 | 4 | | 0.15 |
| | D15 | Bal. | | | | | 0.5 | | 13 | 4 | | 0.15 |
| | Comparative example 1 | 30 | | | Bal. | | 0.8 | | | | 20 | 0.23 |
| | Comparative example 2 | Induction hardened SCM420 steel pipe bushing with oil groove (area ratio of grooves: 10%) | | | | | | | | | | |
| | Comparative example 3 | Induction hardened SCM420 steel pipe bushing with oil groove (area ratio of grooves: 35%) | | | | | | | | | | |

| | Reference number | Porous Coefficient of friction | High density Coefficient of friction | Coefficient of friction | High density and oil grooves Coefficient of friction | Coefficient of friction |
|---|---|---|---|---|---|---|
| C2 | D1 | 1200 | 0.09 | 850 | 0.07 | 1100 |
| C6 | D2 | 1100 | 0.09 | 800 | | |
| C9 | D3 | | 0.07 | 700 | 0.06 | 850 (Working) |
| C11 | D4 | 1150 | 0.07 | 800 | | |
| C12 | D5 | 950 | 0.09 | 650 | 0.09 | 900 |
| C13 | D6 | 1250 | 0.07 | 850 | | |
| C16 | D7 | 550 | 0.15 | 500 | | |
| C19 | D8 | 1150 | 0.07 | 950 | | |
| | D9 | 550 | 0.14 | 450 | | |
| | D10 | 850 | 0.1 | 750 | 0.09 | 850 (Working) |
| | D11 | 1050 | | | | |
| | D12 | 1800 | | | | |
| | D13 | 1800 | | | | |
| | D14 | 900 | | | | |
| | D15 | 950 | | | | |
| | Comparative example 1 | 450 | | | | |
| | Comparative example 2 | | | | 0.18 | 350 |
| | Comparative example 3 | | | | 0.2 | 450 |

TABLE 6

Composition of Fe—C—Cu based alloy powder for bearing test (wt %)

| | C | Cu | Al | Si | Mn | Ni | Cr | Mo | W | V |
|---|---|---|---|---|---|---|---|---|---|---|
| A | 0.69 | 11.4 | — | 0.06 | 0.25 | 2.86 | 0.22 | 0.81 | — | |
| B | 0.72 | 16.1 | 5.18 | 0.09 | 0.22 | — | — | 0.52 | | |
| C | 1.09 | 7.11 | 0.029 | 0.49 | 0.32 | | 4.26 | 5.02 | 6.02 | 1.98 |

As comparative example 1, a porous oil retained sintered bushing was used. As comparative examples 2 and 3, carburized bushings were used which were produced in such a manner that a spiral groove about 2 mm in width was formed on an inner surface of a SCM420 carbon steel pipe at an area ratio of 10% and 35% respectively.

According to the method shown in Examples 2 and 3, the multilayer member after the preliminary sintering or after the preliminary sintering and then rolling was bent into a roll using a roll bender and then pressed to have an inner diameter of 70 mm. And then, both end of a back metal steel were TIG welded and then the multilayer member was finally sintered (1100 to 1170° C.) to the back metal steel into a roll-formed bushing. After cooling under $N_2$ gas, it was worked into a shape of a bushing for bearing test shown in FIG. 29A. Then, after vacuum retaining engine oil W30, it was used for the bearing test. D1 to D4 alloys were tempered at 550° C. for one hour and D5 to D12 alloys were tempered at 200° C. for one hour.

The bearing test apparatus was schematically shown in FIG. 29B. As the counterpart member to the bushing, a shaft was used which was produced in such a manner that S53C material was mechanically worked, induction hardened and then tempered at 180° C. for one hour. As for D1 and D5 alloys, the bushings formed with the crack groove were also examined. As for D3 and D10 alloys, the bushings which were mechanically worked to form a spiral groove at an area ratio of 30% were examined.

D11 to D13 alloys in which a large amount of porous graphite particles were dispersed were porous sintered sliding materials.

In the test, a bearing stress increased by 50 kgf/cm$^2$ every 1000 times of oscillation at intervals of 1 Hz with an oscillating angle of 5°. And, a bearing stress at which abnormal coefficient of friction (0.25 or higher) or seizing occurred, and coefficient of friction before occurrence of seizing or at a bearing stress of 400 kgf/cm$^2$ were measured. The results are shown in Table 5. The bearing test apparatus can receive a bearing stress of 1800 kgf/cm$^2$ at maximum.

By comparison D1 to D4 alloys shown in Table 5 with the comparative examples 1 to 3, it is shown that, in D1 to D4 alloys in which a large amount (10% by volume or more) of $M_6C$ type carbide and $Mo_2C$ type carbide are dispersed, one modified to be porous is more excellent in seizing resistance, one modified to have a high density becomes to have a low coefficient of friction and a high-density one formed with the oil groove provides both low coefficient of friction and excellent seizing resistance. Especially, wavelike crack grooves formed by forceful rolling after the preliminary sintering effectively serves as oil grooves without occurrence of peeling of the sintered layer.

By comparison of D1 to D4 alloy with D9 and D10 alloys, it is shown that as an amount of ferrous powder shown by A300M is increased, seizing resistance deteriorates and coefficient of friction increases. It is preferable to adjust an addition amount of each A300M powder and specific steel powder as following. An addition amount of A300M powder/an addition amount of the specific steel powder$\leq$1.

More preferably, the value in the left side of the equation is preferably adjusted to 0.5 or less As comparison of D5 to D8 alloys, it is shown that except for D7 alloy not containing $Cr_7C_3$ type carbide precipitated and dispersed therein, the same excellent sliding performance as the D1 to D4 alloy are shown. Therefore, it is effective to disperse $Cr_7C_3$ type carbide in an amount of 10% by volume or more (D5 alloy) for improvement in seizing performance.

D11 to D13 alloys contains blended graphite dispersed therein by using Fe—C—Cu based steel powder containing carbon and Cu. A solid lubricant action of the graphite lowers coefficient of friction and improves seizing resistance.

D14 and D15 alloys are porous one of D1 alloy after cooling under $N_2$ gas and after tempering at 200° C. for one hour respectively. There is no significant difference in seizing resistance. However, by comparison with C1 alloy, increasing of coefficient of friction and deteriorating of seizing resistance are shown. It is desirable that an amount of retained austenite phase in the sintered layer is set to 20% by volume or less.

What is claimed is:

1. A ferrous sintered multilayer roll-formed bushing having a ferrous sintered sliding material layer which is sinter-bonded to a back metal steel,
    wherein said ferrous sintered sliding material layer is produced in such a manner that a Fe—C—Cu—Sn based sintered sliding material mixed powder containing at least carbon of 0.40 to 5 wt %, Cu of 13 to 40 wt % and Sn of 0.5 to 10 wt % is preliminarily sinter-bonded to said back metal steel and then finally sinter-bonded by a liquid-phase sintering at high temperatures higher than 1000° C. after bending into a roll,
    said ferrous sintered sliding material layer has a liquid phase sintering structure having a solid phase state Fe—C based alloy phase containing carbon of 0.45 wt % or more and a liquid phase state Cu—Sn alloy phase dispersed therein, and
    said solid phase state Fe—C based alloy phase contains one or more specific carbides of $Cr_7C_3$, $M_6C$, $M_2C$ and MC type specific carbides dispersed therein.

2. The ferrous sintered multilayer roll-formed bushing according to claim 1,
    wherein said ferrous sintered sliding material layer contains carbide dispersed therein,
    said ferrous sintered sliding material layer is sinter-bonded to said back metal steel via a diffusion layer or an intermediate ferrous sintered layer,
    said diffusion layer is formed at the vicinity of bonding boundary between said ferrous sintered sliding material layer and said back metal steel and has a ferrous alloy phase not containing said carbide and a Cu alloy phase extending in a direction of said sinter-bonded sintered layer side, and
    said intermediate ferrous sintered layer does not contain said carbide or contains carbon in an amount smaller than that of said ferrous sintered sliding material layer.

3. The ferrous sintered multilayer roll-formed bushing according to claim 2,
    wherein said intermediate ferrous sintered layer is a ferrous sintered material layer containing at least Cu of 10 to 40 wt %, Sn of 0.5 to 10 wt % and C of 0 to 0.8 wt %, and
    said ferrous sintered material layer is prepared such that a base material structure of a ferrous alloy phase in said intermediate ferrous sintered layer has a structure comprising one or more elements of ferrite, perlite and bainite, as a main constituent, and also a martensite structure of less than 50% by volume,
    said prepared ferrous sintered material layer is sinter-bonded to said back metal steel, and
    said ferrous sintered sliding material layer is sinter-bonded to a sliding surface of said back metal steel via said intermediate ferrous sintered layer.

4. The ferrous sintered multilayer roll-formed bushing according to claim 1,
    wherein said Fe—C based alloy phase in said ferrous sintered sliding material layer is quench hardened and a matrix phase has a structure mainly consisting of martensite or tempered martensite.

5. The ferrous sintered multilayer roll-formed bushing according to claim 1,
    wherein in said Fe—C—Cu—Sn base sintered sliding material mixed powder, a Fe—C based alloy powder containing carbon of 0.45 wt % or more; one or more elements of Cr of 5 to 25 wt %, Mo of 3 to 20 wt % and V of 0.5 to 7 wt %; and one or more carbides of $Cr_7C_3$, $M_6C$, MC and $M_2C$ type carbides dispersed therein in a total amount of 5 to 60 wt % constitutes 50 to 100% by volume of said ferrous powder.

6. The ferrous sintered multilayer roll-formed bushing according to claim 5,
    wherein the specific carbide precipitated and dispersed in a particle or a grain boundary of said Fe—C based alloy powder is formed into a fine structure having an average grain size of 10 μm or less.

7. The ferrous sintered multilayer roll-formed bushing according to claim 1, wherein the ferrous sintered sliding material has a surface layer with a depth of 0.1 mm from a surface of the ferrous sintered sliding material, and wherein the surface layer contains a Cu alloy phase having excellent sliding performance at a higher content ratio than the inside layer of said ferrous sintered sliding material layer.

8. The ferrous sintered multilayer roll-formed bushing according to claim 1, wherein the ferrous sintered sliding material has a surface layer with a depth of 0.1 mm from a surface of the ferrous sintered sliding material, and wherein the surface layer has a finer ferrous alloy particle formed therein than the inside layer.

9. The ferrous sintered multilayer roll-formed bushing according to claim 1, wherein said ferrous sintered sliding material layer is formed with wavelike cracks opened by said final sintering extending in a direction substantially perpendicular to a circumferential direction.

10. The ferrous sintered multilayer roll-formed bushing according to claim 1, wherein said ferrous sintered sliding material layer has a porosity of 10 to 30% by volume, and the sintered pores are filled with lubricating oil or lubricating compound.

11. The ferrous sintered multilayer roll-formed bushing according to claim 1, wherein said ferrous sintered sliding material layer is formed with recesses served as oil grooves and oil holes and said recesses are filled with solid lubricant or resin having $MoS_2$ or graphite.

12. The ferrous sintered multilayer roll-formed bushing according to claim 1, wherein said Fe—C—Cu—Sn based sintered sliding material mixed powder is added with one or more elements of P of 0.1 to 1.5 wt %; B of 0.05 to 1.5 wt %; C of 0.1 to 3.0 wt %; Ni of 10 wt % or less; Al of 1 to 10 wt %; Si of 0.5 to 3 wt %; Mn of 1 to 20 wt %; Ti of 0.1 to 2 wt % and Mo of 0.1 to 10 wt %.

13. The ferrous sintered multilayer roll-formed bushing according to claim 1 provided with a collar.

14. A connecting device having the ferrous sintered multilayer roll-formed bushing according to claim 1, wherein said back metal steel contains carbon of 0.3 to 0.6 wt %, and said back metal steel is quench hardened at portions at both end surfaces of said ferrous sintered multilayer roll-formed bushing and a lip seal or dust seal is arranged on the quench hardened portions.

15. A ferrous sintered multilayer roll-formed bushing having a ferrous sintered sliding material layer which is sinter-bonded to a back metal steel, wherein said ferrous sintered sliding material layer contains at least carbon of 0.4 to 15 wt %, Cu of 13 to 40 wt % and Sn of 0.5 to 10 wt % and is produced in such a manner that a Fe—C—Cu—Sn based sintered sliding material mixed powder is preliminarily sinter-bonded to said back metal steel and then finally sinter-bonded by a liquid-phase sintering at high temperatures higher than 1000° C. after bending into a roll, a ferrous alloy powder to be contained in said Fe—C—Cu—Sn based sintered sliding material mixed powder contains Cu of a solid solubility limit or more and at least 2 wt % or more to 40 wt % or less and carbon of 0.2 wt % or more, said ferrous sintered sliding material layer has a liquid phase sintering structure having a solid phase state Fe—C based alloy phase containing carbon of 0.2 wt % or more and a liquid phase state Cu—Sn alloy phase dispersed therein, and said ferrous sintered sliding material layer contains one or more powder particles of metal powder of Cr, Co, Mo and W which have significantly small solid solubility with Cu; alloy powder of NiMo, CoMo and FeMo which contain Mo intermetallic compound; solid lubricant powder of graphite, BN and $CaF_2$; and powders of specific carbide, nitride and oxide mainly consisting of an alloy element of Cr, Mo, W, V, Ti and Zr dispersed therein.

16. The ferrous sintered multilayer roll-formed bushing according to claim 15, wherein the powder of metal powder of Cr, Co, Mo and W; alloy powder of NiMo, CoMo and FeMo which contain Mo intermetallic compound; solid lubricant powder of graphite, BN and $CaF_2$; and powder of specific carbide, nitride and oxide mainly consisting of one or more alloy elements of Cr, Mo, W, V, Ti and Zr dispersed in said ferrous sintered sliding material layer has an average grain size of 1 to 50 μm, and said powder is dispersed in said ferrous sintered sliding material layer in an amount of 3 to 30% by volume.

17. The ferrous sintered multilayer roll-formed bushing according to claim 16, wherein said graphite powder has an average grain size of 1 μm or larger to 50 μm or smaller, and said powder is dispersed in said ferrous sintered sliding material layer in an amount of 3 to 30% by volume.

18. A ferrous sintered multilayer roll-formed bushing having a ferrous sintered sliding material layer which is sinter-bonded to a back metal steel, wherein said ferrous sintered sliding material layer contains at least carbon of 0.4 to 15 wt %, Cu of 13 to 40 wt % and Sn of 0.5 to 10 wt % and is produced in such a manner that a Fe—C—Cu—Sn based sintered sliding material mixed powder is preliminarily sinter-bonded to said back metal steel and then finally sinter-bonded by a liquid-phase sintering at temperatures of 1000° C. or higher, which is higher than a preliminary sintering temperature, after bending into a roll, a ferrous alloy powder to be contained in said Fe—C—Cu—Sn based sintered sliding material mixed powder contains Cu of a solid solubility limit or more and at least 2 wt % or more to 40 wt % or less and carbon of 0.2 wt % or more, said ferrous sintered sliding material layer has a liquid phase sintering structure having a solid phase state Fe—C based alloy phase containing carbon of 0.45 wt % or more and a liquid phase state Cu—Sn alloy phase dispersed therein, said solid phase state Fe—C based alloy phase contains one or more carbides of $Cr_7C_3$, $M_6C$, $M_2C$ and MC type carbides dispersed therein, and said ferrous sintered sliding material layer contains one or more powder particles of solid lubricant powders of Cr, Co, Mo, W, NiMo, CoMo, FeMo, graphite, BN and $CaF_2$; and powders of nitride and oxide mainly consisting of one or more alloy elements of Cr, Mo, W, V, Ti and Zr dispersed therein.

19. A method of producing a ferrous sintered multilayer roll-formed bushing, the method comprising:

preliminarily sintering bonding a Fe—C—Cu—Sn based sintered sliding material mixed powder to a back metal steel at a temperature range of 750 to 950° C. to form a preliminary sintered layer on said back metal steel;

mechanically rolling said preliminary sintered layer;

bending said preliminary sintered layer and said back metal steel into a roll; and finally sintering said preliminary sintered layer at temperatures of 1000° C. or higher, which is higher than the preliminary sintering temperature, to form a ferrous sintered sliding material layer on said back metal steel, wherein said Fe—C—Cu—Sn based sintered sliding material mixed powder contains at least C of 0.4 to 5 wt %; Cu of 13 to 40 wt %; and Sn of 0.5 to 10 wt %, said ferrous sintered sliding material layer after said final sintering has a liquid phase sintering structure having a solid phase state Fe—C based alloy phase containing carbon of 0.45 wt % or more and a liquid phase state Cu—Sn alloy phase dispersed therein, and said solid phase state Fe—C based alloy phase contains one or more carbides of $Cr_7C_3$, $M_6C$, $M_2C$ and MC type carbides dispersed therein.

20. The method of claim 19,
wherein said ferrous sintered sliding material layer after said final sintering is sinter-bonded to said back metal steel via a diffusion layer or intermediate ferrous sintered layer, said diffusion layer has a ferrous alloy phase, formed with contacting said back metal steel and also not containing said carbide, and a Cu alloy phase extending in a direction of said sintered layer sinter-bonded by said final sintering, and said intermediate ferrous sintered layer contains carbon in an amount smaller than that of said ferrous sintered sliding material layer.

21. The method of claim 20,
wherein said intermediate ferrous sintered layer containing at least Cu of 10 to 40 wt %; Sn of 0.5 to 10 wt % and C of 0 to 8 wt % is preliminarily sintered to the sliding surface of said back metal steel and said ferrous sintered sliding material layer is sinter-bonded via said intermediate ferrous sintered layer.

22. The method of claim 19,
wherein said final sintering includes rapidly cooling after said final sintering to quench harden or quench temper said Fe—C based alloy phase to harden the Fe—C based alloy phase in said ferrous sintered sliding material layer to have a hardness of Hv500 or more.

23. The method of claim 19,
wherein said Fe—C—Cu—Sn based sintered sliding material mixed powder is a mixed powder of ferrous alloy powder, Cu powder and at least one powder of Sn powder and CuSn alloy powder or a mixed powder of the former mixed powder and graphite powder.

24. The method of claim 23,
wherein said ferrous alloy powder contains specific steel powder in an amount of 50 to 100 wt %, said specific steel powder contains carbon of 0.45 wt % or more; one or more elements of Cr of 5 to 25 wt %; Mo of 3 to 20 wt %; W of 3 to 20 wt % and V of 0.5 to 7 wt %; and one or more carbides of cementite, $Cr_7C_3$, $M_6C$, MC and $M_2C$ type carbides precipitated and dispersed in an amount of 5 to 60% by volume.

25. The method of claim 24,
wherein the specific carbide precipitated and dispersed in a particle and a grain boundary of said Fe—C based alloy phase is formed into a fine structure having an average grain size of 10 μm or less.

26. The method of claim 19, further comprising:
dispersing or spraying a Cu alloy powder containing at least Sn of 2 wt % or more on the surface of said preliminary sintered layer between said forming the preliminary sintered layer and said mechanically rolling.

27. The method of claim 19, further comprising:
dispersing or spraying a Fe—C—Cu—Sn based sintered sliding material mixed powder of –#250 mesh or less on the surface of said preliminary sintered layer between said forming the preliminary sintered layer and said mechanically rolling.

28. The method of claim 19,
wherein said mechanically rolling forms cracks on said preliminary sintered layer and then said final sintering grows the cracks into said ferrous sintered sliding material layer so as to serve as oil grooves and oil holes.

29. The method of claim 19,
wherein said ferrous sintered sliding material layer has a porosity of 10 to 30% by volume.

30. The method of claim 19,
wherein said ferrous sintered sliding material layer is formed with recesses served as oil grooves and oil holes and said recesses are filled with solid lubricant or resin containing $MoS_2$ or graphite.

31. The method of claim 19,
wherein said Fe—C—Cu—Sn based sintered sliding material mixed powder is added with one or more elements of P of 0.1 to 1.5 wt %; B of 0.05 to 1.5 wt %; C of 0.1 to 3.0 wt %; Ni of 10 wt % or less; Al of 1 to 10 wt %; Si of 0.5 to 3 wt %; Mn of 1 to 20 wt %; Ti of 0.1 to 2 wt %; and Mo of 0.1 to 10 wt %.

32. A method of producing of a ferrous sintered multilayer roll-formed bushing, the method comprising:
preliminarily sintering bonding a Fe—C—Cu—Sn based sintered sliding material mixed powder to a back metal steel at a temperature range of 750 to 950° C. to form a preliminary sintered layer on said back metal steel;

mechanically rolling said preliminary sintered layer;

bending said preliminary sintered layer and said back metal steel into a roll; and finally sintering said preliminary sintered layer at 1000° C. or higher, which is higher than a preliminary sintering temperature, to form a ferrous sintered sliding material layer on said back metal steel, wherein said Fe—C—Cu—Sn based sintered sliding material mixed powder contains at least C of 0.2 to 15 wt % or 0.2 to 9 wt %; Cu of 13 to 40 wt %; and Sn of 0.5 to 10 wt %, a ferrous alloy powder to be contained in said Fe—C—Cu—Sn based sintered sliding material mixed powder contains Cu of a solid solubility limit or more and at least 2 wt % or more to 40 wt % or less and carbon of 0.2 wt % or more, said ferrous sintered sliding material layer after said final sintering has a liquid phase sintering structure having a solid phase state Fe—C based alloy phase containing carbon of 0.2 wt % or more and a liquid phase state Cu—Sn alloy phase dispersed therein, and said ferrous sintered sliding material layer contains one or more powder particles of metal powder of Co, Cr, Mo and W; alloy powder of NiMo, CoMo and FeMo which contain Mo intermetallic compound; solid lubricant powder of graphite, BN and CaF2; and powder of specific carbide, nitride and oxide which mainly consist of one or more alloy elements of Cr, Mo, W, Ti, Zr and Nb dispersed therein.

33. The method of claim 32,
wherein the powder of metal powder of Cr, Co, Mo and W; alloy powder of NiMo, CoMo and FeMo which contain Mo intermetallic compound; solid lubricant powder of graphite, BN and $CaF_2$; and powder of specific carbide, nitride and oxide mainly consisting of one or more alloy elements of Cr, Mo, W, V, Ti and Zr dispersed in said ferrous sintered sliding material layer has an average grain size of 1 to 50 μm, and said powder is dispersed in said ferrous sintered sliding material layer in an amount of 3 to 30% by volume.

34. The method of claim 33, wherein said graphite powder has an average grain size of 1 μm or larger to 20 μm or smaller, and said powder is dispersed in said ferrous sintered sliding material layer in an amount of 3 to 30% by volume.

35. A method of producing a ferrous sintered multilayer roll-formed bushing, the method comprising:

preliminarily sintering bonding a Fe—C—Cu—Sn based sintered sliding material mixed powder to a back metal steel at a temperature range of 750 to 950° C. to forms a preliminary sintered layer on said back metal steel;

mechanically rolling said preliminary sintered layer;

bending said preliminary sintered layer and said back metal steel into a roll; and finally sintering said preliminary sintered layer at 1000° C. or higher, which is higher than a preliminary sintering temperature, to form a ferrous sintered sliding material layer on said back metal steel, wherein said Fe—C—Cu—Sn based sintered sliding material mixed powder contains at least C of 0.4 to 5 wt %; Cu of 13 to 40 wt %; and Sn of 0.5 to 10 wt %, a ferrous alloy powder to be contained in said Fe—C—Cu—Sn based sintered sliding material mixed powder contains Cu of a solid solubility limit or more and at least 2 wt % or more to 40 wt % or less and carbon of 0.45 wt % or more, said ferrous sintered sliding material layer after said final sintering has a liquid phase sintering structure having a solid phase state Fe—C based alloy phase containing carbon of 0.45 wt % or more and a liquid phase state Cu—Sn alloy phase dispersed therein, and said ferrous sintered sliding material layer contains one or more powder particles of metal powder of Co, Cr, Mo and W; alloy powder of NiMo, CoMo and FeMo which contain Mo intermetallic compound; solid lubricant powder of graphite, BN and $CaF_2$; and powder of nitride and oxide which mainly consisting of one or more alloy elements of Cr, Mo, W, Ti, Zr and Nb dispersed therein.

* * * * *